United States Patent [19]
Guilfoyle et al.

[11] Patent Number: 5,164,913
[45] Date of Patent: Nov. 17, 1992

[54] GENERAL PURPOSE OPTICAL COMPUTER

[75] Inventors: Peter S. Guilfoyle, Zephyr Cove, Nev.; Frederick F. Zeise, Milpitas, Calif.

[73] Assignee: OptiComp Corporation, Zephyr Cove, Nev.

[21] Appl. No.: 639,284

[22] Filed: Jan. 10, 1991

Related U.S. Application Data

[63] Continuation of Ser. No. 226,907, Nov. 3, 1988, abandoned, which is a continuation-in-part of Ser. No. 31,431, Mar. 27, 1987, Pat. No. 4,864,524.

[51] Int. Cl.[5] .............................................. G06E 1/04
[52] U.S. Cl. ..................................................... 364/713
[58] Field of Search ........................................ 364/713

[56] References Cited

U.S. PATENT DOCUMENTS

| | | | |
|---|---|---|---|
| 3,270,187 | 8/1966 | Fomenko | 364/713 |
| 3,680,080 | 7/1972 | Maure | 364/713 |
| 3,903,400 | 9/1975 | Nisenson | 364/713 |
| 3,996,455 | 12/1976 | Schaefer | 364/713 |
| 4,667,300 | 5/1987 | Gilfoyle | 364/713 |
| 4,729,111 | 3/1988 | Arrathoon et al. | 364/713 |
| 4,764,889 | 8/1988 | Hinton et al. | 364/713 |
| 4,764,890 | 8/1988 | Hinton | 364/713 |
| 4,764,891 | 8/1988 | Grinberg et al. | 364/713 |
| 4,824,192 | 4/1989 | Roberts | 364/713 |

Primary Examiner—David H. Malzahn
Attorney, Agent, or Firm—Limbach & Limbach

[57] ABSTRACT

A general purpose optical computer in which bits of a control vectors are optically ANDed with bits of a data vector in a vector-vector operation, and in which the results of the optical AND operations are ORed by way of threshold detectors to form combinatorial functionals and combinatorial summations, where the combinatorial functionals and combinatorial summations generated implement a user designated instruction. In the preferred embodiment of the present invention, a plurality of detectors are provided, and a plurality of control words are input to the control operator means for form a control mask which operates upon the input bits provided to the light source means. Each control word interacts with the input bits and the result of such interaction is focused on a different detector. In this manner a substantial number of functionals and/or summations can be formed in parallel and operating upon very wide input words.

18 Claims, 55 Drawing Sheets $E = \overline{\overline{A_1}B_1 + A_1\overline{B_1} + \overline{A_2}B_2 + A_2\overline{B_2} + \cdots + \overline{A_n}B_n + A_n\overline{B_n}}$

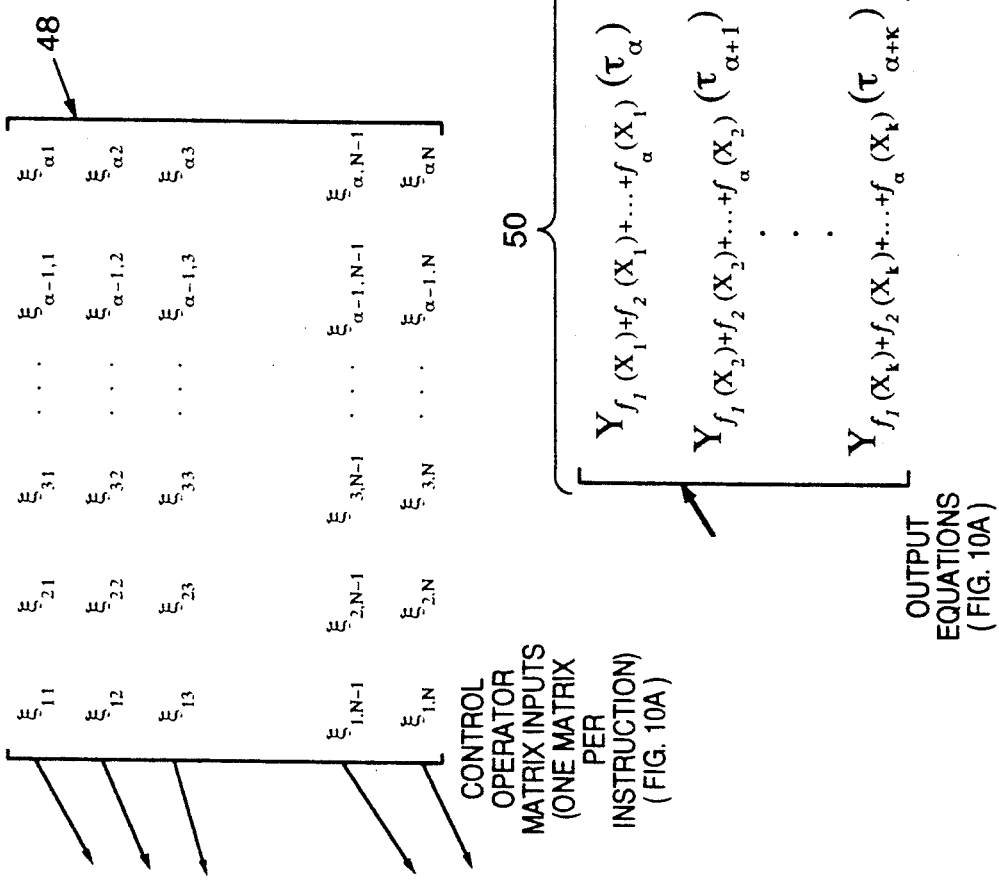
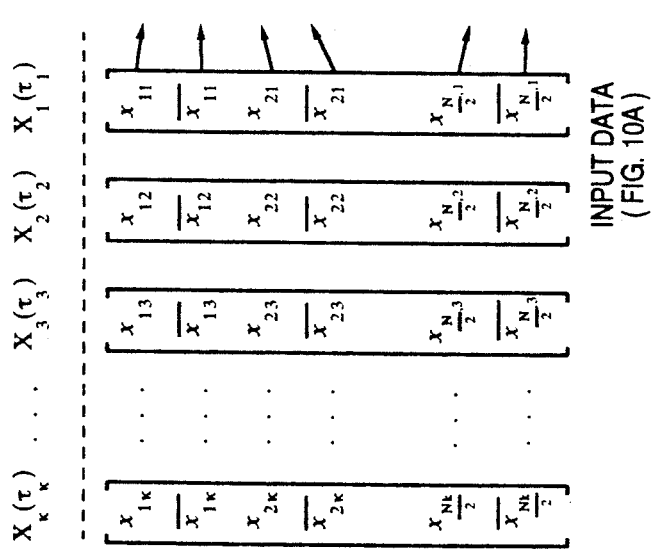
FIG. 10B

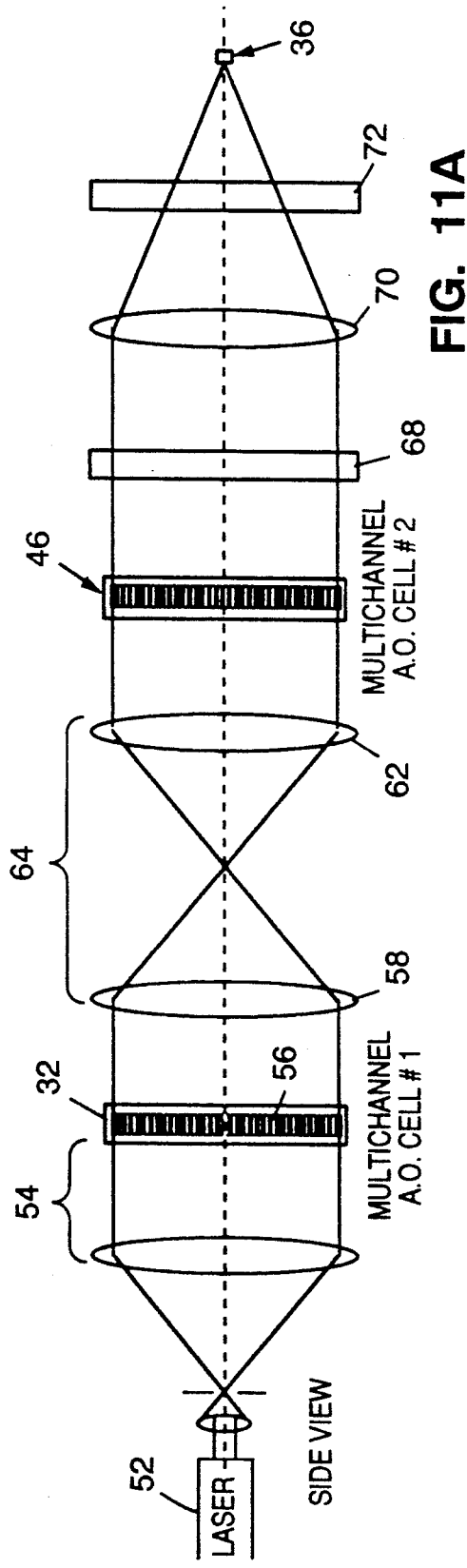
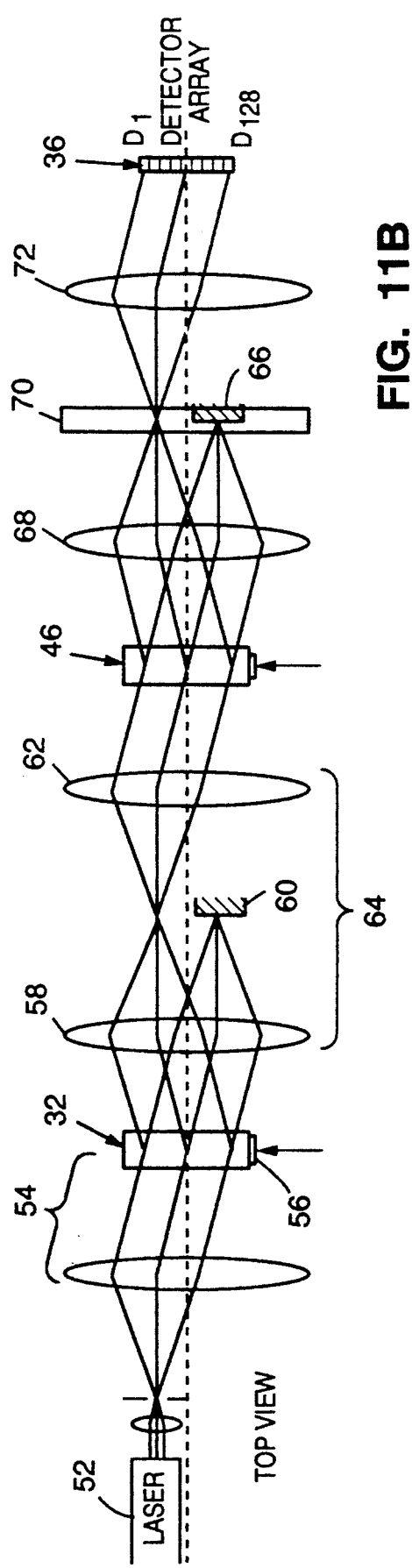

A16B16O16Cin (ADD CARRY CALC)

| | | |
|---|---|---|
| A07 | A00 B15/B07 | B00 O15/O07 → O00 Cin |
| A15 | A08 B15 | B08 O15 → O08 C07 |
| A23 | A16 B31/B23 | B16 O31/O23 → O16 C15 |
| A31 | A23 B31 | B24 O31 → O24 C23 |

$\overline{A16B16O16Cin}$ (SUBTRACT BORROW CALC)

| | | |
|---|---|---|
| $\overline{A07}$ | $\overline{A00}$ B15/B07 | B00 O15/O07 → O00 Cin |
| $\overline{A15}$ | $\overline{A08}$ B15 | B08 O15 → O08 C07 |
| $\overline{A23}$ | $\overline{A16}$ B31/B23 | B16 O31/O23 → O16 C15 |
| $\overline{A31}$ | $\overline{A24}$ B31 | B24 O31 → O24 C23 |

$\overline{A8A8B8\overline{B8}C8\overline{C8}}$ (ADD AND SUBTRACT USING CARRY/BORROW)

| | | | | |
|---|---|---|---|---|
| A07 | A00 A07 | $\overline{A00}$ B07 | B00 $\overline{B07}$ | B00 C07 → $\overline{C00}$ |
| A15 | A08 A15 | $\overline{A08}$ B15 | B08 $\overline{B15}$ | $\overline{B08}$ C15 → $\overline{C08}$ |
| A23 | A16 A23 | $\overline{A16}$ B23 | B16 $\overline{B23}$ | $\overline{B16}$ C23 → $\overline{C16}$ |
| A31 | A24 A31 | $\overline{A24}$ B31 | B24 $\overline{B31}$ | $\overline{B24}$ C31 → $\overline{C24}$ |

| | | | | | | | | | | | | | | | | | HIGH FIELD | LOW FIELD |
|---|---|---|---|---|---|---|---|---|---|---|---|---|---|---|---|---|---|---|
| B0 | B1 | B2 | B3 | B4 | B5 | B6 | B7 | B8 | B9 | B10 | B11 | B12 | B13 | B14 | B15 | | D16 | D00 |
| B0 | B1 | B2 | B3 | B4 | B5 | B6 | B7 | B8 | B9 | B10 | B11 | B12 | B13 | B14 | B15 | | D17 | D01 |
| B0 | B1 | B2 | B3 | B4 | B5 | B6 | B7 | B8 | B9 | B10 | B11 | B12 | B13 | B14 | B15 | | | |
| B0 | B1 | B2 | B3 | B4 | B5 | B6 | B7 | B8 | B9 | B10 | B11 | B12 | B13 | B14 | B15 | | D19 | D03 |
| B0 | B1 | B2 | B3 | B4 | B5 | B6 | B7 | B8 | B9 | B10 | B11 | B12 | B13 | B14 | B15 | | | |
| B0 | B1 | B2 | B3 | B4 | B5 | B6 | B7 | B8 | B9 | B10 | B11 | B12 | B13 | B14 | B15 | | D21 | D05 |
| B0 | B1 | B2 | B3 | B4 | B5 | B6 | B7 | B8 | B9 | B10 | B11 | B12 | B13 | B14 | B15 | | | |
| B0 | B1 | B2 | B3 | B4 | B5 | B6 | B7 | B8 | B9 | B10 | B11 | B12 | B13 | B14 | B15 | | D23 | D07 |
| B0 | B1 | B2 | B3 | B4 | B5 | B6 | B7 | B8 | B9 | B10 | B11 | B12 | B13 | B14 | B15 | | | |
| B0 | B1 | B2 | B3 | B4 | B5 | B6 | B7 | B8 | B9 | B10 | B11 | B12 | B13 | B14 | B15 | | D25 | D09 |
| B0 | B1 | B2 | B3 | B4 | B5 | B6 | B7 | B8 | B9 | B10 | B11 | B12 | B13 | B14 | B15 | | | |
| B0 | B1 | B2 | B3 | B4 | B5 | B6 | B7 | B8 | B9 | B10 | B11 | B12 | B13 | B14 | B15 | | D27 | D11 |
| B0 | B1 | B2 | B3 | B4 | B5 | B6 | B7 | B8 | B9 | B10 | B11 | B12 | B13 | B14 | B15 | | | |
| B0 | B1 | B2 | B3 | B4 | B5 | B6 | B7 | B8 | B9 | B10 | B11 | B12 | B13 | B14 | B15 | | D29 | D13 |
| B0 | B1 | B2 | B3 | B4 | B5 | B6 | B7 | B8 | B9 | B10 | B11 | B12 | B13 | B14 | B15 | | | |
| B0 | B1 | B2 | B3 | B4 | B5 | B6 | B7 | B8 | B9 | B10 | B11 | B12 | B13 | B14 | B15 | | D31 | D15 |

$X6 = A6 \cdot \overline{B6} + \overline{A6} \cdot B6$ $X4 = A4 \cdot \overline{B4} + \overline{A4} \cdot B4$ $X2 = A2 \cdot \overline{B2} + \overline{A2} \cdot B2$ $X0 = A0 \cdot \overline{B0} + \overline{A0} \cdot B0$ (TO FIG. 15A-1)

| P.SEL | P. SEL BYTE 0 [00-07] | P. SEL BYTE 1 [08-15] | P. SEL BYTE 2 [16-23] | P. SEL BYTE 3 [24-31] | P. SEL BYTE 4 [32-39] | P. SEL BYTE 5 [40-47] | CENABLE C C̄ |
|---|---|---|---|---|---|---|---|
| 0000 | NO - LIGHT | NO - LIGHT | NO - LIGHT | NO - LIGHT | NO - LIGHT | NO - LIGHT | NO - LIGHT |
| 0001 | U00 - U07 | U08 - U15 | U16 - U23 | U24 - U31 | U32 - U39 | U40 - U47 | CONEONE |
| 0010 | T00 - T07 | T08 - T15 | T16 - T23 | T24 - T31 | T32 - T39 | T40 - T47 | CMASCMA̅S̅ |
| 0011 | | | A16 - A23 | A24 - A31 | | | C07.C0̅7̅ |
| 0100 | A00 - A07 | A00 - A07 | B00 - B07 | B00 - B07 | FB00 - FB07 | FB00 - FB07 | C15.C1̅5̅ |
| 0101 | A08 - A15 | A08 - A15 | B08 - B15 | B08 - B15 | FB08 - FB15 | FB08 - FB15 | C23.C2̅3̅ |
| 0110 | A16 - A23 | A16 - A23 | B16 - B23 | B16 - B23 | FB16 - FB23 | FB16 - FB23 | C31.C3̅1̅ |
| 0111 | A24 - A31 | A24 - A31 | B24 - B31 | B24 - B31 | FB24 - FB31 | FB24 - FB31 | |
| 1000 | B0ONES | B1ONES | B2ONES | B3ONES | B4ONES | B5ONES | |
| 1001 | U̅0̅0̅ - U̅0̅7̅ | U̅0̅8̅ - U̅1̅5̅ | U̅1̅6̅ - U̅2̅3̅ | U̅2̅4̅ - U̅3̅1̅ | U̅3̅2̅ - U̅3̅9̅ | U̅4̅0̅ - U̅4̅7̅ | |
| 1010 | T̅0̅0̅ - T̅0̅7̅ | T̅0̅8̅ - T̅1̅5̅ | T̅1̅6̅ - T̅2̅3̅ | T̅2̅4̅ - T̅3̅1̅ | T̅3̅2̅ - T̅3̅9̅ | T̅4̅0̅ - T̅4̅7̅ | |
| 1011 | | | A̅1̅6̅ - A̅2̅3̅ | A̅2̅4̅ - A̅3̅1̅ | | | |
| 1100 | A̅0̅0̅ - A̅0̅7̅ | A̅0̅0̅ - A̅0̅7̅ | B̅0̅0̅ - B̅0̅7̅ | B̅0̅0̅ - B̅0̅7̅ | F̅B̅0̅0̅ - F̅B̅0̅7̅ | F̅B̅0̅0̅ - F̅B̅0̅7̅ | |
| 1101 | A̅0̅8̅ - A̅1̅5̅ | A̅0̅8̅ - A̅1̅5̅ | B̅0̅8̅ - B̅1̅5̅ | B̅0̅8̅ - B̅1̅5̅ | F̅B̅0̅8̅ - F̅B̅1̅5̅ | F̅B̅0̅8̅ - F̅B̅1̅5̅ | |
| 1110 | A̅1̅6̅ - A̅2̅3̅ | A̅1̅6̅ - A̅2̅3̅ | B̅1̅6̅ - B̅2̅3̅ | B̅1̅6̅ - B̅2̅3̅ | F̅B̅1̅6̅ - F̅B̅2̅3̅ | F̅B̅1̅6̅ - F̅B̅2̅3̅ | |
| 1111 | A̅2̅4̅ - A̅3̅1̅ | A̅2̅4̅ - A̅3̅1̅ | B̅2̅4̅ - B̅3̅1̅ | B̅2̅4̅ - B̅3̅1̅ | F̅B̅2̅4̅ - F̅B̅3̅1̅ | F̅B̅2̅4̅ - F̅B̅3̅1̅ | |

FIG. 27

| SEL | 0BYTE | 1BYTE | 2BYTE | 3BYTE | 4BYTE | 5BYTE |
|---|---|---|---|---|---|---|
| 0. | NO LIGHT | NO LIGHT | NO LIGHT | NO LIGHT | NO LIGHT | NO LIGHT |
| 1. | U0-7 | U8-15 | U16-23 | U24-31 | U32-39 | U40-47 |
| 2. | T0-7 | T8-15 | T16-23 | T24-31 | T32-39 | T40-47 |
| 3. | | | A16-23 | A24-31 | | |
| 4. | A0-7 | A0-7 | B0-7 | B0-7 | FB0-7 | FB0-7 |
| 5. | A8-15 | A8-15 | B8-15 | B8-15 | FB8-15 | FB8-15 |
| 6. | A16-23 | A16-23 | B16-23 | B16-23 | FB16-23 | FB16-23 |
| 7. | A24-31 | A24-31 | B24-31 | B24-31 | FB24-31 | FB24-31 |

FIG. 28B

Combinatorial Explosion.
Total Number of possible interactions is calculated as $3^{2n}-1$ where n is the index for words A and B

| Number of bits | Combinations req. |
|---|---|
| 1 | 8 |
| 2 | 80 |
| 3 | 728 |
| 4 | 6,560 |
| 5 | 59,048 |
| 6 | 531,440 |
| 7 | 4,782,968 |
| 8 | 43,046,720 |
| 9 | 387,420,488 |
| 10 | 3,486,784,400 |
| 11 | 31,381,059,608 |
| 12 | 282,429,536,480 |
| sum for all 12 | 317,733,228,528 |

FIG. 30

DeMorgan's Law $$\overline{\prod_{i=1}^{n} X_i} = \sum_{i=1}^{n} \overline{X_i}$$

$$\overline{\sum_{i=1}^{n} X_i} = \prod_{i=1}^{n} \overline{X_i}$$

AND $\quad XY = \overline{\overline{X} + \overline{Y}}$

OR $\quad X + Y = \overline{\overline{X}\,\overline{Y}}$

NAND $\quad \overline{XY} = \overline{X} + \overline{Y}$

NOR $\quad \overline{X + Y} = \overline{X}\,\overline{Y}$

FIG. 31

| INPUT CONTROL OPERATOR | | | | | | | | OUTPUT |
| --- | --- | --- | --- | --- | --- | --- | --- | --- |
| ξ1 | ξ2 | ξ3 | ξ4 | ξ5 | ξ6 | ξ7 | ξ8 | |
|  | X |  |  |  |  |  |  | a1 |
|  | X |  | X |  |  |  |  | a1a2 |
|  |  |  |  |  | X |  |  | b1 |
|  |  |  |  |  | X |  | X | b1b2 |
|  | X |  |  |  | X |  |  | a1b1 |
| X |  |  |  |  | X |  |  | $\overline{a1}\,b1$ |
|  | X |  |  | X |  |  |  | $a1\overline{b1}$ |
| X |  |  |  | X |  |  |  | $\overline{a1}\,\overline{b1}$ |
|  | X |  | X |  | X |  |  | a1 a2 b1 |
| X |  |  | X |  | X |  |  | $\overline{a1}$ a2 b1 |
| X |  | X |  |  | X |  |  | a1 $\overline{a2}$ b1 |
|  | X |  | X | X |  |  |  | a1 a2 $\overline{b1}$ |
| X |  | X |  |  | X |  |  | $\overline{a1}\,\overline{a2}$ b1 |
| X |  |  | X | X |  |  |  | $\overline{a1}$ a2 $\overline{b1}$ |
|  | X | X |  | X |  |  |  | a1 $\overline{a2}\,\overline{b1}$ |
| X |  | X |  | X |  |  |  | $\overline{a1}\,\overline{a2}\,\overline{b1}$ |
|  | X |  | X |  | X |  | X | a1 a2 b1 b2 |
| X |  |  | X |  | X |  | X | $\overline{a1}$ a2 b1 b2 |
| X |  | X |  |  | X |  | X | $\overline{a1}\,\overline{a2}$ b1 b2 |
| X |  |  | X | X |  |  | X | $\overline{a1}$ a2 $\overline{b1}$ b2 |
| X |  | X |  | X |  |  | X | $\overline{a1}\,\overline{a2}\,\overline{b1}$ b2 |
| X |  | X |  | X |  | X |  | $\overline{a1}\,\overline{a2}\,\overline{b1}\,\overline{b2}$ |

FIG. 32A

| INPUT CONTROL OPERATOR | | | | | | | | OUTPUT |
|---|---|---|---|---|---|---|---|---|
| ξ1 | ξ2 | ξ3 | ξ4 | ξ5 | ξ6 | ξ7 | ξ8 | |
|  |  |  | X |  |  |  |  | $a2$ |
| X |  |  | X |  |  |  |  | $\overline{a1}\,a2$ |
|  |  |  |  |  |  |  | X | $b2$ |
|  |  |  |  | X |  |  | X | $\overline{b1}\,b2$ |
|  | X |  |  |  |  |  | X | $a1b2$ |
| X |  |  |  |  |  |  | X | $\overline{a1}\,b2$ |
|  | X |  |  |  |  | X |  | $a1\,\overline{b2}$ |
| X |  |  |  |  |  | X |  | $\overline{a1}\,\overline{b2}$ |
|  | X |  | X |  |  |  | X | $a1\,a2\,b2$ |
| X |  |  | X |  |  |  | X | $\overline{a1}\,a2\,b2$ |
|  | X | X |  |  |  |  | X | $a1\,\overline{a2}\,b2$ |
|  | X |  | X |  |  | X |  | $a1\,a2\,\overline{b2}$ |
| X |  | X |  |  |  |  | X | $\overline{a1}\,\overline{a2}\,b2$ |
| X |  |  | X |  |  | X |  | $\overline{a1}\,a2\,\overline{b2}$ |
|  | X | X |  |  |  | X |  | $a1\,\overline{a2}\,\overline{b2}$ |
| X |  | X |  |  |  | X |  | $\overline{a1}\,\overline{a2}\,\overline{b2}$ |
|  | X | X |  |  | X |  | X | $a1\,\overline{a2}\,b1\,b2$ |
|  | X | X |  | X |  |  | X | $a1\,\overline{a2}\,\overline{b1}\,b2$ |
|  | X | X |  |  | X | X |  | $a1\,\overline{a2}\,b1\,\overline{b2}$ |
|  | X | X |  | X |  | X |  | $a1\,\overline{a2}\,\overline{b1}\,\overline{b2}$ |

FIG. 32B

| INPUT CONTROL OPERATOR | | | | | | | | OUTPUT |
|---|---|---|---|---|---|---|---|---|
| ξ1 | ξ2 | ξ3 | ξ4 | ξ5 | ξ6 | ξ7 | ξ8 | |
| X  |    |    |    |    |    |    |    | $\overline{a1}$ |
|    | X  | X  |    |    |    |    |    | $a1\,\overline{a2}$ |
|    |    |    |    | X  |    |    |    | $\overline{b1}$ |
|    |    |    |    |    | X  | X  |    | $b1\,\overline{b2}$ |
|    |    |    | X  |    | X  |    |    | $a2\,b1$ |
|    |    | X  |    |    | X  |    |    | $\overline{a2}\,b1$ |
|    |    |    | X  | X  |    |    |    | $a2\,\overline{b1}$ |
|    |    | X  |    | X  |    |    |    | $\overline{a2}\,\overline{b1}$ |
|    | X  |    |    |    | X  |    | X  | $a1\,b1\,b2$ |
| X  |    |    |    |    | X  |    | X  | $\overline{a1}\,b1\,b2$ |
|    | X  |    |    | X  |    |    | X  | $a1\,\overline{b1}\,b2$ |
|    | X  |    |    |    | X  | X  |    | $a1\,b1\,\overline{b2}$ |
| X  | X  |    |    | X  |    |    | X  | $\overline{a1}\,\overline{b1}\,b2$ |
| X  |    |    |    |    | X  | X  |    | $\overline{a1}\,b1\,\overline{b2}$ |
|    | X  |    |    | X  |    | X  |    | $a1\,\overline{b1}\,\overline{b2}$ |
|    | X  |    |    | X  |    | X  |    | $\overline{a1}\,\overline{b1}\,\overline{b2}$ |
|    | X  |    | X  | X  |    | X  |    | $a1\,a2\,\overline{b1}\,b2$ |
|    | X  |    | X  | X  |    | X  |    | $a1\,a2\,\overline{b1}\,\overline{b2}$ |
| X  |    |    | X  | X  |    | X  |    | $\overline{a1}\,a2\,\overline{b1}\,\overline{b2}$ |

FIG. 32C

| INPUT CONTROL OPERATOR | | | | | | | | OUTPUT |
|---|---|---|---|---|---|---|---|---|
| ξ1 | ξ2 | ξ3 | ξ4 | ξ5 | ξ6 | ξ7 | ξ8 | |
|  |  | X |  |  |  |  |  | $\overline{a2}$ |
| X |  | X |  |  |  |  |  | $\overline{a1}\,\overline{a2}$ |
|  |  |  |  |  |  | X |  | $\overline{b2}$ |
|  |  |  |  | X |  | X |  | $\overline{b1}\,\overline{b2}$ |
|  |  |  | X |  |  |  | X | a2 b2 |
|  |  | X |  |  |  |  | X | $\overline{a2}$ b2 |
|  |  |  | X |  |  | X |  | a2 $\overline{b2}$ |
|  |  | X |  |  |  | X |  | $\overline{a2}\,\overline{b2}$ |
|  |  |  | X |  | X |  | X | a2 b1 b2 |
|  |  | X |  |  | X |  | X | $\overline{a2}$ b1 b2 |
|  |  |  | X | X |  |  | X | a2 $\overline{b1}$ b2 |
|  |  |  | X |  | X | X |  | a2 b1 $\overline{b2}$ |
|  |  | X |  | X |  |  | X | $\overline{a2}\,\overline{b1}$ b2 |
|  |  | X |  |  | X | X |  | $\overline{a2}$ b1 $\overline{b2}$ |
|  |  |  | X | X |  | X |  | a2 $\overline{b1}\,\overline{b2}$ |
|  |  | X |  | X |  | X |  | $\overline{a2}\,\overline{b1}\,\overline{b2}$ |
|  | X |  | X |  | X | X |  | a1 a2 b1 $\overline{b2}$ |
| X |  |  | X |  | X | X |  | $\overline{a1}$ a2 b1 $\overline{b2}$ |
| X |  | X |  |  | X | X |  | $\overline{a1}\,\overline{a2}$ b1 $\overline{b2}$ |

FIG. 32D

| Data Selection Primitives | |
|---|---|
| A32 | ALL 32 BITS OF A OPERAND (USED FOR SHIFTING) |
| $\overline{A32}$ | NEGATED 32 BITS OF A (NEGATION 1'S COMP) |
| A16[ ]B16[00,16] | 16 BITS OF A OPERAND, 16 BITS OF B OPERAND STARTING AT HIGH HALF WORD OR LOW HALFWORD. USED BY AND, OR OPERATIONS. |
| A16[ ]$\overline{B16}$[00,16] | SAME AS ABOVE EXCEPT B INPUT IS COMPLEMENTED. USED BY ANDN, ORN OPERATIONS. |
| $\overline{A8}$[ ]A8[ ]B8[ ]$\overline{B8}$[0, 8, 16, 24] | DATA IS SELECTED FROM 1 OF 4 STARTING POSITIONS. S. SELECTS EACH BYTE OF 32 BIT WORD. USED FOR XOR, XORN OPERATIONS |
| A8[ ]B8[ ]O8[ ]Cin[00, 08, 16, 24 ] | USED FOR ADD CARRY CALCULATION. |
| $\overline{A8}$[ ]B8[ ]O8[ ]Cin[00, 08, 16, 24 ] | USED FOR SUB BORROW CALCULATION. |
| A8[ ]$\overline{A8}$[ ]B8[ ]$\overline{B8}$[00, 08, 16, 24 ]<br>*C8[ ]$\overline{C8}$[00, 08, 16, 24 ] | USED FOR ADD AND SUB OUTPUT CALCULATIONS THERE IS A ONE BIT SHIFT IN THE C DATA ROUTING RELATIVE TO THE CARRY LOOKAHEAD CALCULATION ABOVE. |

FIG. 33

NOT

| LOGICAL FUNCTION | OPTICAL PRIMITIVES SEQUENCE | DESCRIPTION: |
|---|---|---|
| $O = \overline{A}$ | $O[0:31] = \overline{A}[0:31]$ | SELECT 32 BITS OF NEGATED INPUT IN ONE FLASH. |

AND

| LOGICAL FUNCTION | OPTICAL PRIMITIVES SEQUENCE | DESCRIPTION: |
|---|---|---|
| $O = A \& B$ | 1. Inputs: A[00:15], B[00:15]<br>Compute: AND $O[n] = A_n \& B_n$ for n=0:15<br>2. Inputs: A16 : A31, B16 : B31<br>Compute: AND $[16\text{-}31] = A_n \& B_n$ and store in O[16:31] | THE AND FUNCTION IS CALCULATED IN TWO STEPS SINCE THE 64 INPUTS REQUIRED EXCEEDS THE AVAILABLE NUMBER. |

OR

| LOGICAL FUNCTION | OPTICAL PRIMITIVES SEQUENCE | DESCRIPTION: |
|---|---|---|
| $O_n = A_n$ or $B_n$ | 1. Inputs are A[0:15], B[0:15]<br>Compute O[0:15] = A[0:15] or B[0:15]<br>2. Inputs are A[16:31], B[16:31]<br>Compute O[16:31] = A[16:31] or B[16:31] | BITWISE LOGICAL OR OVER 32 BITS. |

FIG. 34

XOR

| LOGICAL FUNCTION | OPTICAL PRIMITIVES SEQUENCE | DESCRIPTION: |
|---|---|---|
| $O[\ ] = A[\ ] \text{ XOR } B[\ ]$<br>$= A \cdot \bar{B} + \bar{A} \cdot B$ | 1) Inputs are   $A[00:07], \overline{A[00:07]},$<br>                  $B[00:07], \overline{B[00:07]}$<br>Compute   $\text{XOR}(00\text{-}07) =$<br>                  $\overline{A[00:07]\ \&\ \overline{B[00:07]}} +$<br>                  $\overline{\overline{A[00:07]}\ \&\ B[00:07]}$<br>Store in $T[00:15]$<br><br>2) Inputs are $A[08:15], \overline{A[08:15]},$<br>                  $B[08:15], \overline{B[08:15]}$<br>Compute   $\text{XOR}(08\text{-}15) =$<br>                  $\overline{A[08:15]\ \&\ \overline{B[08:15]}} +$<br>                  $\overline{\overline{A[08:15]}\ \&\ B[08:15]}$<br>Store in $T[16:31]$<br><br>3) Inputs are $T[00:31]$<br>Compute $O_n = T_{2n} + T_{2n+1}$   $n=0:15$<br><br>4) Inputs are   $A[16:23], \overline{A[16:23]},$<br>                  $B[16:23], \overline{B[16:23]}$<br>Compute   $\text{XOR}(16\text{-}23) =$<br>                  $\overline{A[16:23]\ \&\ \overline{B[16:23]}} +$<br>                  $\overline{\overline{A[16:23]}\ \&\ B[16:23]}$<br>Store in $T[00:15]$<br><br>5) Inputs are   $A[24:31], \overline{A[24:31]},$<br>                  $B[24:31], \overline{B[24:31]}$<br>Compute   $\text{XOR}(24\text{-}31) =$<br>                  $\overline{A[24:31]\ \&\ \overline{B[24:31]}} +$<br>                  $\overline{\overline{A[24:31]}\ \&\ B[24:31]}$<br>Store in $T[16:31]$<br><br>6) Inputs are $T[00:31]$<br>Compute $O_n = T_{2n-32} + T_{2n-31}$   $n=16:31$ | XOR IS COMPUTED IN 4 STEPS OF 8 BITS OF EVALUATION EACH WITH 2 TERMS EVALUATED FOR EACH OUTPUT BIT. TWO ADDITIONAL STEPS ARE REQUIRED TO DO THE DETECTOR ORING IN OPTICS AS THE LOW TRUE AND OUTPUT OF EACH PAIR OF DETECTORS MUST BE INVERTED (1 = LIGHT) AND ORED PAIRWISE TO PRODUCE AN XOR OUTPUT BIT. A 32 BIT XOR REQUIRES 64 TERMS TO COMPUTE WHICH EXCEEDS THE 49 AVAILABLE CHANNELS: THUS TWO 32 BIT PASSES ARE REQUIRED TO PRODUCE THE 32 BIT OUTPUT WORD. |

FIG. 35

GENERAL PURPOSE OPTICAL COMPUTER

This invention was made with Government support under contract number N00014-87-C-0077 awarded by the Department of the Navy. The Government has certain rights in the invention.

This is a continuation of U.S. patent application Ser. No. 266,907, filed Nov. 3, 1988, now abandoned, which was a continuation-in-part of U.S. patent application Ser. No. 031,431, filed Mar. 27, 1987, now U.S. Pat. No. 4,864,524, issued Sep. 5, 1989.

TECHNICAL FIELD OF THE INVENTION

The present invention is directed, generally, to computing apparatus, and more particularly to a general purpose optical computer

BACKGROUND ART

While there are numerous examples of existing optical computing apparatus, it is believed that all of such apparatus are lacking in simplicity and generality. As such, is difficult to characterize such apparatus as general purpose optical computers.

For example, the approach taken in the optical computing apparatus of the above identified copending application relies heavily upon preconditioning of the input bits prior to processing the preconditioned bits with an AND-OR or AND-OR-INVERT optical operation. The more complex the operation sought to be implemented, the more complex the preconditioning that was required Another example of an optical computing apparatus is disclosed in U.S. Pat. No. 3,680,080, issued Jul. 25, 1972 to Maure, in which a dual rail input, dual rail switch interconnect is employed. A clear disadvantage of this approach is the complexity of the fixed interconnect scheme and the limiting effect that the dual rail interconnect scheme has upon the kinds of functions that can be implemented.

In the past, computer architects have driven their systems in parallel configurations to achieve speed and avoid bus interface bottlenecks. Historically, the first parallel machines were MIMD machines, Multiple Instruction Multiple Data path. This was effectively the placement of many processors on the same bus. This resulted in shared memory and a MIMD compiler which in itself presented extreme software inefficiencies that ultimately severely limited their performance. The next generation of parallel machinery were the SIMD, Single Instruction Multiple Data path machines, and systolic machines. These machines implement parallelism at the DO loop level, most typically for multiply/accumulate intensive problems such as linear algebra problems, FFTs, $N^3$ and above problem classes. These machines require "vectorizing" and/or "matrisizing" compilers. Depending on the degree of parallel compilation, the efficiency of these machines could be improved.

Most all code that exists today is Von Neuman in nature, i.e. single instruction sequential. What is desired is a fast Von Neuman machine without I/O bottlenecks.

The architecture described in the subject application provides a solution. Parallelism is identified by the compiler and exploited at the microcode level. That is, each instruction can be written as parallel combinatorial functionals. Data reuse is achieved by operating on the data several times within one instruction thereby avoiding the I/O bottleneck.

SUMMARY OF THE INVENTION

The above problems and disadvantages are overcome by the present invention of a general purpose optical computer for operating upon input data words in accordance with instructions specified by a user, wherein each of the input data words have a predetermined plurality of bits and the specified instructions are implementable by first forming combinatorial functionals of the bits of the input data words and then forming combinatorial summations of the combinatorial functionals. In accordance with the invention, the general purpose optical computer comprises light source means responsive to a predetermined number of input bits, for providing a plurality of rays of light of predetermined width which propagate along a plurality of associated optical paths, wherein each of the predetermined number of input bits is associated with a different one of the plurality of rays of light, and further wherein the intensity of each of the plurality of rays of light is determined as a function of the logical state of the associated input data bit; detector means positioned in the plurality of optical paths for focusing light which is propagating in each of the plurality of optical paths onto a predetermined point and for detecting the presence or absence of light at the predetermined point, wherein the detector means provide inverted and noninverted outputs of the detected result; control operator means positioned in the optical paths between the light source means and the detector means, and responsive to control words, for controlling the propagation of light along each of the plurality of optical paths as a function of the control words, wherein each control word has a plurality of bits at least as great in number as the number of input bits being operated upon in the light source means and each bit of any particular control word controls a different one of the plurality of optical paths; and controller means responsive to the specified instructions for applying the bits of the input data words to the light source means as the input bits thereto, and for providing functional control words as the control words to the control operator means to form combinatorial functionals of the bits of the input data words for the specified instruction, and thereafter for applying the selected ones of the formed combinatorial functionals as the input bits to the light source means and applying the summation control words to the operator means as the control words thereto to form the combinatorial summations for the specified instruction at the non-inverted output of the detector means; wherein the functional control words cause selected bits of the input data words to be logically ORed with one another, the result of which is detected by the detector means, inverted and provided as an inverted output of the detector means, to represent the logical AND of the complement of the selected bits of the input data words to thereby provide the combinatorial functionals for the specified instruction, and further wherein the summation control words cause selected ones of the combinatorial functionals to be logically ORed with one another, the result of which is detected by the detector means and provided as an output of the detector means to represent the result of the specified instruction.

The light source means, the detector means, and the control operator means perform and AND-OR logical operation on the bits of the input data word that are applied to the light source means and the control words that are applied to the control operator means, in a vector-vector fashion. This permits the formation of combinatorial functionals and combinatorial summations. The controller means evaluates the instruction specified by the user to determine what combinatorial functionals and combinatorial summations are needed to implement the desired instruction. The controller then causes the appropriate control words and appropriate states of the appropriate bits of the input data word or previously formed combinatorial functionals to be applied to the control operator means and to the light source means to execute the desired instruction.

The controller can take the form of the combination of a general purpose host computer and dedicated hardware, where different degrees of control can be distributed between the host and dedicated hardware.

In the preferred embodiment of the present invention, a plurality of detectors are provided, and a plurality of control words are input to the control operator means to form a control mask which operates upon the input bits provided to the light source means. Each control word interacts with the input bits and the result of such interaction is focused on a different detector. In this manner a substantial number of functionals and/or summations can be formed in parallel and operating upon very wide input words.

In accordance with the present invention complex instructions can operate upon very wide input words in a straight forward manner using multiple passes through the light source-control operator-detector combination.

From another viewpoint, the present invention provides a general purpose optical computer in which bits of a control vector are optically ANDed with bits of a data vector in a vector-vector operation, and in which the results of the optical AND operations are ORed by way of threshold detectors to form combinatorial functionals and combinatorial summations, where the combinatorial functionals and combinatorial summations generated implement a user designated instruction.

Also disclosed as a part of the present invention is a unique optical architecture for implementing the AND-OR optical structure.

It is therefore an object of the present invention to provide a general purpose optical computer.

It is another object of the present invention to provide a general purpose optical computer in which a plurality of vector-vector operations are carried out in parallel on a data vector and a plurality of control vectors in order to form combinatorial functionals and combinatorial summations which implement user specified instructions.

These and other objectives, features and advantages of the present invention will be more readily understood upon consideration of the following detailed description of the invention and accompanying drawings.

BRIEF DESCRIPTION OF THE FIGURES

FIGS. 11A and 11B illustrate the side and top views of a optical hardware architecture implementation of FIG. 10.

FIG. 14 illustrates a control mask in accordance with the present invention which can be used in conjuction with an OR or and AND operation.

FIGS. 15A-1 and 15A-2 (collectively "15A") and 15B-1 and 15B-2 (collectively "15B") illustrate a control mask for forming the combinatorial functionals and for forming combinatorial summations for an XOR operation in accordance with the present invention.

FIGS. 17A-1 and 17A-2 (collectively "17A") and 17B-1 and 17B-2 (collectively "17B") illustrate control masks for and ADD-CARRY operation for forming the combinatorial functionals and the combinatorial summations, respectively.

FIGS. 18A-1 and 18A-2 (collectively "18A") and 18B-1 and 18B-2 (collectively "18B") illustrate control masks for and ADDITION-SUBTRACTION operation for forming the combinatorial functionals and the combinatorial summations, respectively.

FIG. 27 illustrates data selection primitives used in embodiment II of the present invention.

FIG. 30 shows the total number of combinations that could possibly be generated as a function of n, where n is the index or word length for input words A and B.

FIG. 31 shows DeMorgan's laws and indicates that the inverted OR sum of complemented binary variables is equal to their non-complemented AND product.

FIGS. 32A, 32B, 32C, and 32D show how the optical configuration of FIG. 5 can be configured using eight input transducers and eight control lines to generate all eighty terms for the two bit ALU without the need to store all 80 combinatorial functionals as a lookup table.

FIG. 33 lists the terminology for the source data selection primitives used to rout data to the photodiode array of FIG. 12A. The left column of the figure names the primitive and format used, while the right column provides a brief description of the primitive.

FIG. 34 shows the optical primitive sequences for the logical functions NOT, AND and OR, where the logical function is named in the left most column, the sequence of optical primitives is listed in the center column, and a short description of the primitive is provided in the right most column.

FIG. 35 shows the optical primitive sequence for the XOR function, using the same format as used in FIG. 34.

DETAILED DESCRIPTION OF THE INVENTION

In the above referenced parent application, an optical computing approach was disclosed which employed the Boolean AND-OR nature of optical systems as an optical primitive for computing more complex operations. The approach included the use of first and second acousto-optic devices, each of which received preconditioned data, and each of which were arranged in an optical path in a logical AND fashion so as to modulate light propagating along the optical path. The modulated light emerging from the second acousto-optic was then ORed via a lens system onto an optical detector. The output of the optical detector was used as is or inverted.

The invention of the above referenced parent application was explained in further detail by way of example. First a one bit (or single bit) equality detection circuit was illustrated. The fundamental building block of this circuit is the "exclusive nor". This circuit comprises two "AND" gates, one "OR" gate and an inverter gate. Examination of most digital integrated circuits reveals that much, if not all, circuitry is comprised of combinations of this AND-OR building block. Given two input bits $A_n$ and $B_n$, the output of the equality detector is 1 if $A_n = B_n$.

Figure 1A:
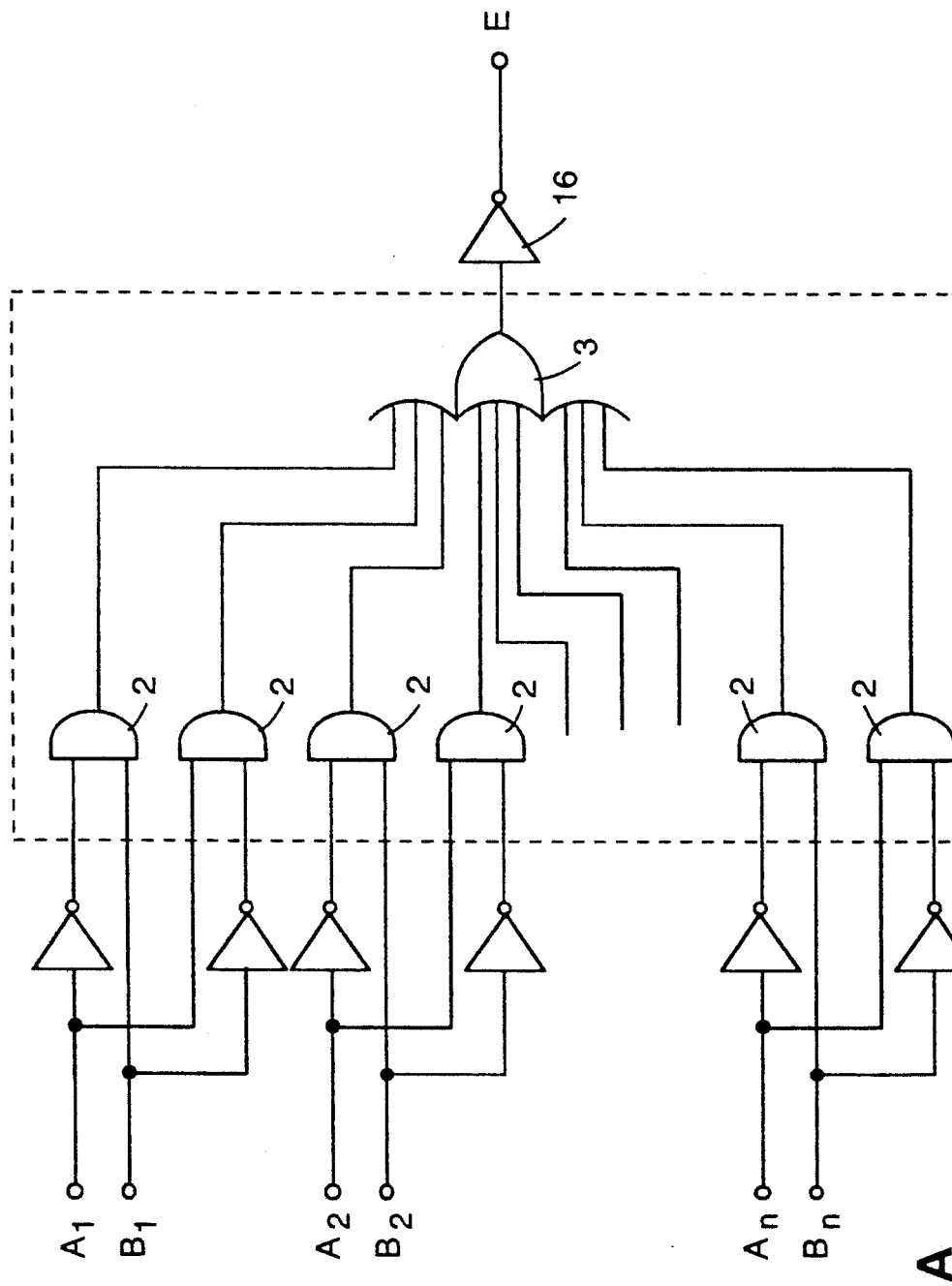
FIGS. 1A and 1B illustrate the AND-OR optical building block which is the subject of the present invention.

To enable the comparison of two digital words a circuit as shown in FIG. 1A can be used. The output of the circuit is one if both input words are equal, i.e., $A(1,2...n) = B(1,2...n)$. This is a very useful function in pattern, text and symbolic recognition. In the word equality detection circuit of FIG. 1A notice that 2n "AND" gates 2 are used and one massive 2n-input "OR" gate 3 is used.

Figure 1B:
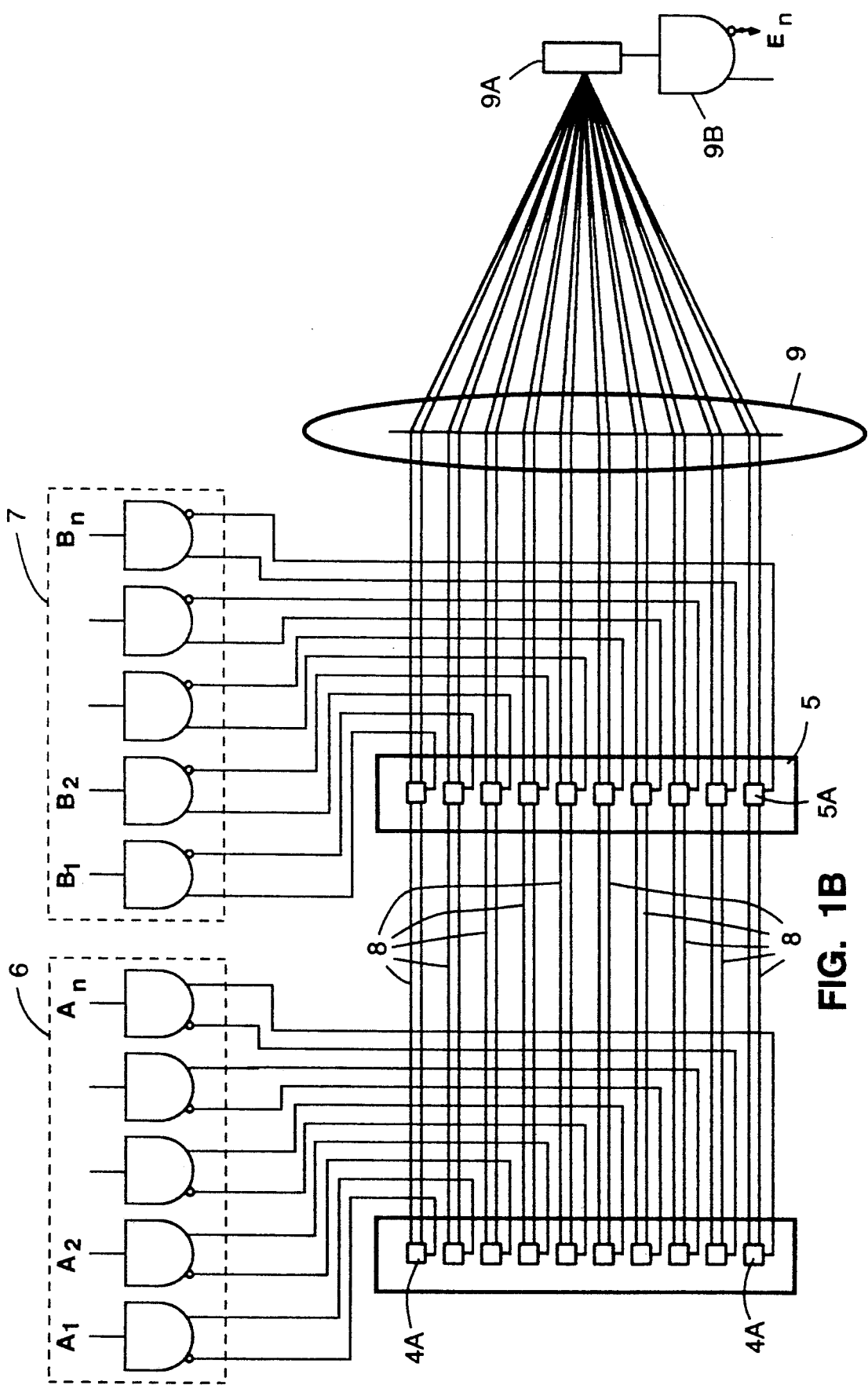

Several key concepts are demonstrated in FIG. 1B which illustrates an optical implementation of FIG. 1A in accordance with the invention described in the above referenced parent application. First and second acousto-optic cells 4 and 5, respectively, receive binary bits from conditioning circuits 6, for word A, and from conditioning circuits 7, for word B. Light propagates along parallel optical paths 8 and is modulated by the bits propagating through the first and second acousto-optic cells 4 and 5. Lens 9 focuses the modulated light onto detector 9A and inverter 9B inverts the output state of detector 9A.

In the embodiment shown in FIG. 1B, the acousto-optic cells 4 and 5 each have a plurality of electrodes 4A and 5A. Each electrode 4A and 5A receives a bit of data which modulates the transmissiveness of the portion of the acousto-optic cell beneath the electrode as a function of the logic state of the bit. The acousto-optic cells 4 and 5 are positioned with respect to one another so that each electrode 4A in cell 4 controls a portion of the cell which modulates light propagating along an optical path that passes through the portion of acousto-optic cell 5 that is controlled by a counterpart electrode 5A.

When the acousto-optic cell has a depth dimension, into the page, the transmissiveness modulation due to the bit of data can be said to propagate through the cell, along the depth dimension. The propagation of these optical representations of the bits of data can be controlled in time so that the optical representation of a data bit from an electrode 4A of acousto-optic cell 4 modulates the beam of light propagating along the same optical path that is being modulated by a corresponding optical representation of a data bit from an electrode 5A of a acousto-optic cell 5. Reference is made to U.S. patent application Ser. No. 517,771, filed Jul. 27, 1983, now U.S. Pat. No. 4,667,300, issued May 19, 1987, incorporated herein by reference, and assigned to the assignee of the present application, where a more detailed description of such propagation is described.

The first and most important concept was that the machine is designed with the intention of using the detector 9A as an OR gate. Unlike most optical computers where the detector either sums many rays, time integrates (again summing), or sees a threshold level such as in the many threshold logic proposals, the detector 9A employed in the invention described in the above referenced parent application merely wants to know if there is light or no light. The only instance where the output is high is if there is no light. It is not acting as a threshold device but merely as a detector.

The second important observation about this circuit was the input of both a bit and its complement for each bit of each word. In most cases, having the complement bit in the optical system enables a most general implementation of various circuits. The complement inputs are generated in a preprocessing combinatorial logic conditioner.

Recognition that any optical system is a natural "AND-OR-INVERT" circuit, was another key concept which was recognized as exploitable in an optical implementation of binary circuits such as that of FIG. 1A. With the "AND-OR-INVERT" building block most any circuit combination can be designed.

One limiting feature of the optical system of the invention described in the above referenced parent application was a limitation on the number of bits which could be ANDed together through any one channel 8 of the optics. To overcome this, preprocessing of the inputs to the optics was relied upon heavily.

In accordance with the present invention it has been discovered that if instead of using the acousto-optic cell 5 as a data input device, it is used as a data control or selection device of data input by way of the acousto-optic cell 4, and if De Morgan's law is utilized, a much more powerful and versatile optical computing apparatus will be provided.

Shannon's expansion theorem, as described in *Switching and Finite Automata Theory* by Kohavi, (McGraw Hill, 1970), on general purpose digital computation, states that all digital logic functions can be represented by two sets of equations. These equations are discussed in Morozov, *Optoelectronic Switching Systems in Telecommunications and Computers*, Maarcel Dekker, Inc. 1984, part II, page 185, in connection with optical computing systems. In his book in section 6.2, Morozov also discusses the use of control operators to select combinations of data in order to form these equations.

The first set of equations (1) takes the input data vector represented by bits $x_1$ through $x_n$ and combines the bits in such a way to produce k output combinatorial functionals—$f_1$ through $f_k$. Note that $f_1$ through $f_k$ represent the logical/Boolean "multiplication" or "AND"-'ing of any combination of $x_1$ through $x_n$. These inputs, $x_1$ through $x_n$, are represented in "dual rail" format, i.e. both $x_i$ and its complement (shown with a bar over them) are available. This first step shall be referred to as the combinational "AND"ing of the arbitrary input data vectors.

$$\begin{aligned} f_1 &= x_1 x_2 \ldots x_i \ldots x_{n-1} x_n \\ f_2 &= \overline{x_1} x_2 \ldots x_i \ldots x_{n-1} x_n \\ f_3 &= x_1 \overline{x_2} \ldots x_i \ldots x_{n-1} x_n \\ &\vdots \\ f_k &= \overline{x_1 x_2} \ldots \overline{x_i} \ldots \overline{x_{n-1} x_n} \end{aligned} \quad [1]$$

The second step in Shannon's generalized formulation, as shown in equations (2) is to take these arbitrary combinational functionals and produce arbitrary combinational summations as shown in the second set of equations below. Inputs to the second step are the outputs from the first step above, i.e., the combinational "AND" products $f_1$ through $f_k$. These are then "OR"ed or Boolean summed as shown in arbitrary dual rail form. The equivalent function of $f_n$ can be realized at worst as a sum of only $f_m$ (high true) functionals.

$$\begin{aligned} y_1 &= f_1 + f_2 + \ldots + f_i + \ldots + f_{n-1} + f_n \\ y_2 &= \overline{f_1} + \overline{f_2} + \ldots + f_i + \ldots + f_{n-1} + f_n \\ y_3 &= \overline{f_1} + f_2 + \ldots + f_i + \ldots + f_{n-1} + f_n \\ &\vdots \\ y_k &= \overline{f_1} + \overline{f_2} + \ldots + \overline{f_i} + \ldots + \overline{f_{n-1}} + \overline{f_n} \end{aligned} \quad [2]$$

To illustrate these principles take for example the ALU operation for a two bit multiplication. Equation set (3) depicts the four Boolean combinatorial equations required for two bit multiplication. Here two words are input to the ALU—A(a0,a1) and B(b0,b1). Here a0 and a1 represent the least significant bit and most significant bit, respectively, of the input word A and likewise for B. Of course a two bit binary multiplication will produce four outputs and thus four separate equations are required as shown in equation set 3.

$$\begin{aligned} O_1 &= a_0 b_0 \\ O_2 &= a_0 \overline{a_1} b_1 + a_0 \overline{b_0} b_1 + \overline{a_0} a_1 b_0 + a_1 b_0 \overline{b_1} \\ O_3 &= a_1 \overline{b_0} b_1 + \overline{a_0} a_1 b_1 \\ O_4 &= a_0 a_1 b_0 b_1 \end{aligned} \quad [3]$$

This equation set consists of eight AND products and four OR summations. The AND products correspond to the first step in Shannon's expansion and the OR summations correspond to the second step. Notice in addition the use of dual-rail logic and the depth of the AND gate. The gate can often be as wide as the number of bits in the word. This would normally cause difficulty in a previous, more traditional optical system, such as the optical system disclosed in the above reference parent application, where gates are formed by the cascading of several spatial light modulators.

Look up tables could be used to generate the multiple input AND products. This solution might be acceptable for small word lengths, however to obtain a complete logic, the system must be capable of storing every Boolean combination of the bits and their complements in memory (optical or other).

Equation set 4 demonstrates how the lookup table approach can get rapidly undesirable. For 2-bit ALU functionality, a total of eighty combinations must be available for subsequent OR interaction. Notice as shown in equation set 4, of the eighty terms, for two bit multiplication only eight are used. The eight terms circled correspond to the desired terms to produce equation set 3.

$$O(AB) = a_0 + a_1 + \overline{a_0} + \overline{a_1} + \qquad (4)$$
$$a_0 a_1 + \overline{a_0 a_1} + a_0 \overline{a_1} + \overline{a_0} a_1 +$$

$$b_0 + b_1 + \overline{b_0} + \overline{b_1} +$$
$$b_0 b_1 + \overline{b_0} b_1 + b_0 \overline{b_1} + \overline{b_0 b_1} +$$

Data used for output $O_1$ $$\boxed{a_0 b_0} + a_0 b_1 + a_1 b_0 + a_1 b_1 +$$
$$\overline{a_0} b_0 + \overline{a_0} b_1 + \overline{a_1} b_0 + \overline{a_1} b_1 +$$
$$a_0 \overline{b_0} + a_0 \overline{b_1} + a_1 \overline{b_0} + a_1 \overline{b_1} +$$
$$\overline{a_0} \overline{b_0} + \overline{a_0} \overline{b_1} + \overline{a_1} \overline{b_0} + \overline{a_1} \overline{b_1} +$$

Data used for output $O_3$ $$a_0 a_1 b_0 + a_0 a_1 b_1 + a_0 b_0 b_1 + a_1 b_0 b_1 +$$
$$\overline{a_0 a_1} b_0 + \overline{a_0 a_1} b_1 + \overline{a_0} b_0 b_1 + \overline{a_1} b_0 b_1 +$$
$$a_0 \overline{a_1} b_0 + a_0 \overline{a_1} b_1 + a_0 \overline{b_0} b_1 + a_1 \overline{b_0} b_1 +$$
$$\overline{a_0} a_1 b_0 + \overline{a_0} a_1 b_1 + a_0 b_0 \overline{b_1} + a_1 b_0 \overline{b_1} +$$

Data used for output $O_2$ $$\overline{a_0 a_1 b_0} + \overline{a_0 a_1 b_1} + \overline{a_0 b_0 b_1} + \overline{a_1 b_0 b_1} +$$
$$a_0 \overline{a_1 b_0} + a_0 \overline{a_1 b_1} + a_0 \overline{b_0 b_1} + a_1 \overline{b_0 b_1} +$$
$$\overline{a_0} a_1 \overline{b_0} + \overline{a_0} a_1 \overline{b_1} + \overline{a_0} b_0 \overline{b_1} + \overline{a_1} b_0 \overline{b_1} +$$
$$\overline{a_0} \overline{a_1} b_0 + \overline{a_0} \overline{a_1} b_1 + \overline{a_0} b_0 b_1 + \overline{a_1} b_0 b_1 +$$

-continued

Data used for output $O_4$ $\boxed{\overline{a_0a_1b_0b_1}}$
$\overline{a_0\overline{a_1}b_0b_1} + a_0\overline{a_1}b_0b_1 + a_0a_1\overline{b_0}b_1 + a_0a_1b_0\overline{b_1} +$
$\overline{a_0}a_1\overline{b_0}b_1 + \overline{a_0}a_1b_0\overline{b_1} + a_0\overline{a_1}\overline{b_0}b_1 + a_0\overline{a_1}b_0\overline{b_1} +$
$\overline{a_0}\overline{a_1}b_0\overline{b_1} + a_0\overline{a_1}b_0\overline{b_1} +$
$\overline{a_0a_1\overline{b_0}b_1} + \overline{a_0a_1b_0\overline{b_1}} + \overline{\overline{a_0}a_1\overline{b_0}b_1} + \overline{\overline{a_0}a_1b_0\overline{b_1}} +$
$\overline{a_0a_1b_0b_1}$ In general the number of total combinations that could possibly be generated can be calculated as $3^{2n}-1$ where n is the index or word length for input words A and B. FIG. 30 shows how this exponential growth makes any look-up scheme quite unreasonable. Notice in FIG. 1, for a 12-bit machine 317 billion combinations would be required. This would be a large hologram.

What is desired is a machine that can produce selectively all possible state combinations of the inputs A and B, including the don't care states. In addition it is desired to do this under program control.

Figure 2:
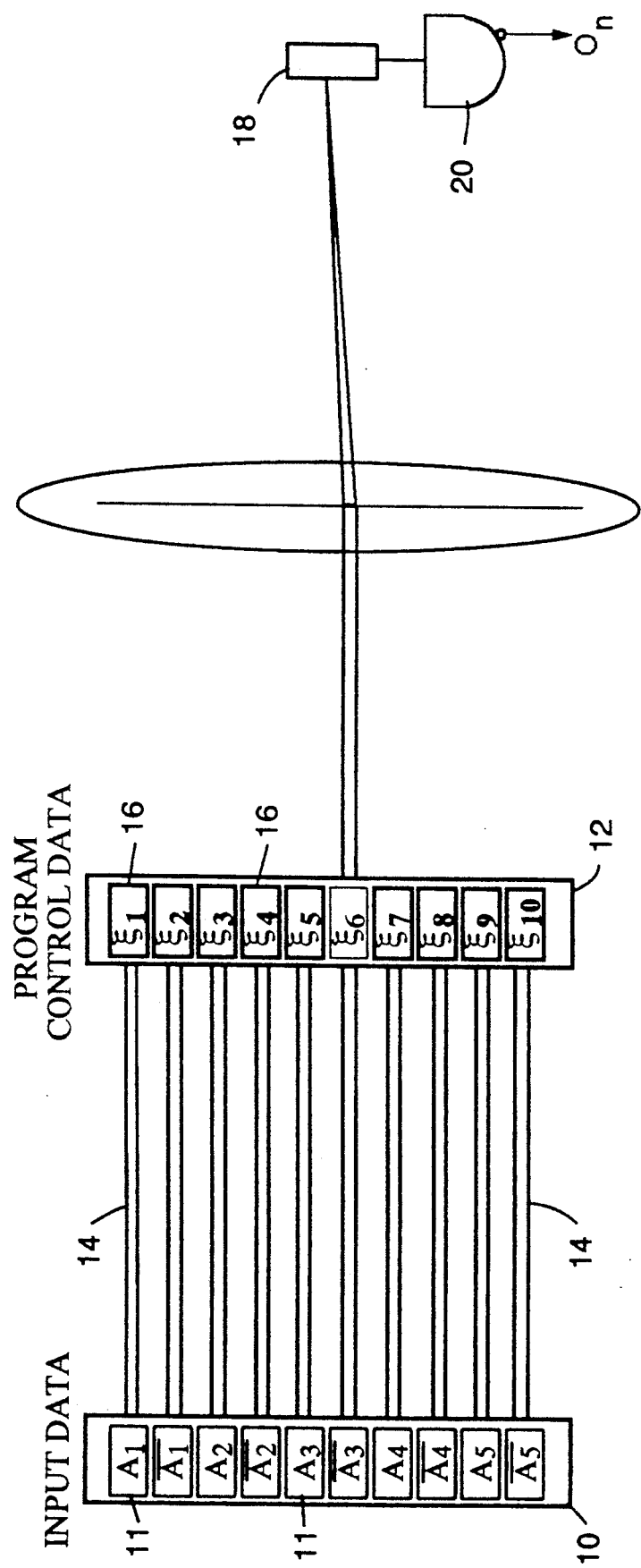
FIG. 2 is illustrates how the configuration of FIG. 1B can be utilized to perform a simple programmable operation upon data in a vector-vector per detector format.

Consider for the moment a very simple optical arrangement as shown in FIG. 2. Here the simple arrangement consists of four optical elements. The first element 10, as shown, is an ten input optical modulator. This can be built with a ten input multichannel acousto-optic device where only the very first "pixel" of the device is used in the crystal, i.e., the region directly next to the transducer. It would in this fashion behave as an array of ten, point-source modulators. The first element 10 as shown can also be built using other electro-optic devices such as a magneto-optic spatial light modulator, an array of non-linear optical bistable devices, liquid crystal gates, etc. The data modulation characteristics are such that the transducers or electrodes need only be driven with binary data, i.e. 0 or 1.

As shown in FIG. 2, a 5-bit word is fed to the first element 10 in dual-rail format, and therefore ten (10) transducers 11 are used. This 5-bit word represents the Input Data, or the $X_n$ values given in equation set [1], input in dual rail format. The combinatorial functionals of equation set [1] are consequently formed by operating upon this data to form multiple input, programmed AND products.

The output of the first element or device 10 is imaged onto an identical second device 12. This imaging is represented schematically in FIG. 2 where straight optical rays 14 are shown traveling from the first device 10 to the corresponding transducer 16 on the second device 12. Effectively this pair of devices could be represented as ten (10) parallel 2-input AND gates.

The key to the operation of this simple optical system is the Program Control Data, shown supplied to second device 12 as $\xi_1$ through $\xi_{10}$. The data which is fed into the second device or modulator 12 is control data from the user's source code.

For example, assume that the user desired to select from the input data a simple function $A_3$. To do so, all that is required is that the downloaded program control data, $\xi_1$ through &86 $_{10}$, be all zeros with the exception of program control data bit $\xi_6$. If $\xi_6$ is a 1 then only the Input Data bit $\overline{A_3}$ is permitted to pass on through to the detector 18. The lens 20 serves to focus ten possible interactions (between each of the ten rays 14 and control data bits $\xi_1$ through $\xi_{10}$) onto the detector 18. In the case illustrated in FIG. 2 only one ray 14 is allowed to pass. After detection the signal is inverted by way of inverter 20, as shown. Given, if only $A_3$ is required as an output, this could be achieved by simply activating control bit $\xi_5$ alone without an inversion, however, as will be seen later, in the general case the inverter 20 will always be used on the first pass. Consequently the user is able to program the machine to produce $A_3$ using the appropriate control bit and the inverter 20.

Figure 3:
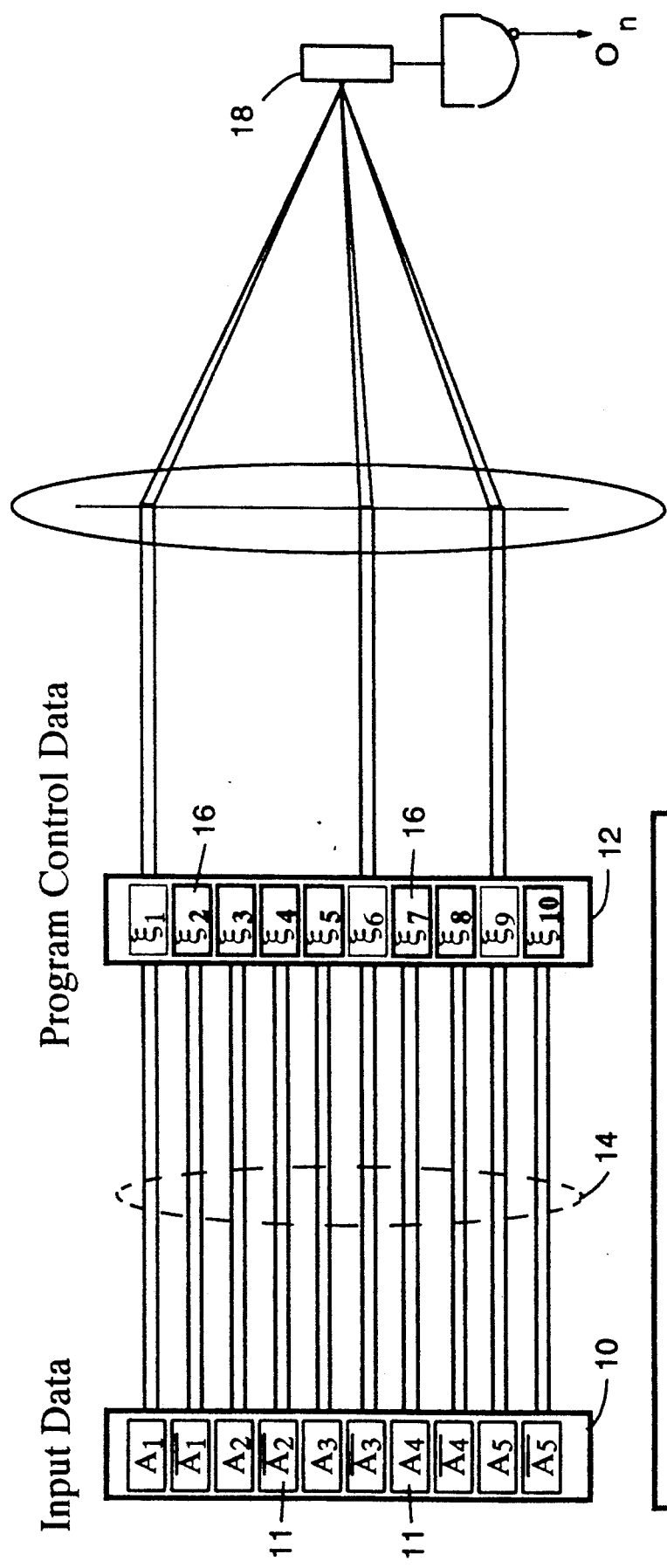
FIG. 3 is a more complex example of the programmable nature of the present invention.

The situation becomes more interesting when a multiple input AND product is required. For example, assume for the moment that the user source code requires a three product functional on the 5-bit input word as some part of an overall instruction. More specifically, assume that the user requires the functional $\overline{A}_1A_3\overline{A}_5$. As shown in FIG. 3, this can be easily achieved by software control through appropriate application of the program control data.

The downloaded program control data sets $\xi_1$, $\xi_6$ and $\xi_9$ to a "1" and the rest to "0". Now the system is acting as three 2-input AND gates allowing the input variables $A_1$, $\overline{A}_3$, and A5 to pass through to the detector 18. If the detector 18 is configured in 0,1 threshold mode only, then the detector 18 behaves as a 3-input OR gate. This point is significant because by DeMorgan's Laws, shown in FIG. 31, the inverted OR sum of complemented binary variables is equal to their non-complemented AND product. Consequently, the desired output functional, $\overline{A}_1A_3\overline{A}_5$, is obtained without the need for more than a 2-series cascade of spatial light modulators.

Figure 4:
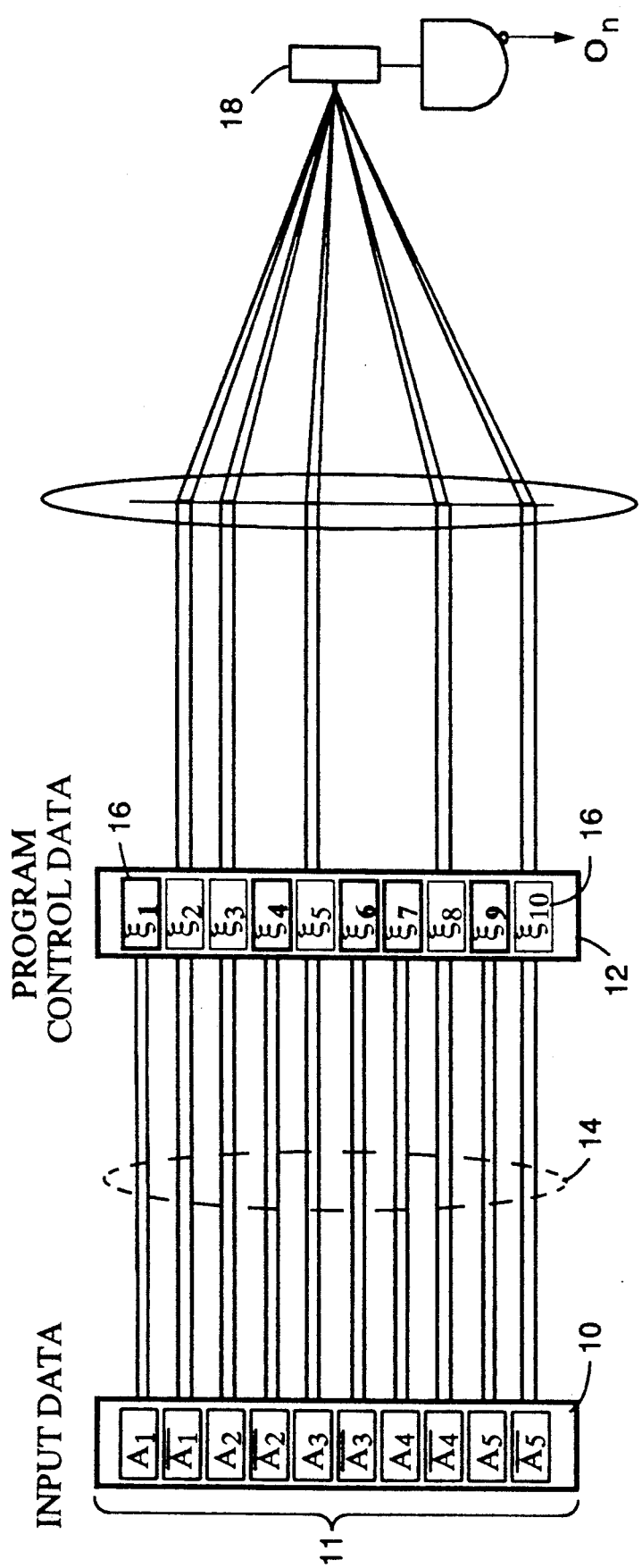
FIG. 4 is a further example of a simple optical configuration to generate a specific logical operation on five-bit wide input data selectively under program control.

The final example illustrates a 5-bit wide input AND gate equivalent. As shown in FIG. 4, suppose the user wishes to produce the functional $A_1\overline{A}_2\overline{A}_3A_4A_5$ from the 5-bit input word. For this case, the 5-bit product can be obtained under software program control by downloading the control code such that control bits $\xi_2$, $\xi_3$, $\xi_5$, $\xi_8$, and $\xi_{10}$ are set to a "1" and the rest "0".

This sets up effectively five, 2-input AND gates followed by a 5-input OR gate. The detector 18 is now ORing the input data variables $\overline{A}_1$, $A_2$, $A_3$, $\overline{A}_4$, and $\overline{A}_5$ by way of lens system 22. By DeMorgan's law, this produces the correct result, after output inversion.

In summary, to facilitate the selection of the appropriate terms in both sets of equations [1] and [2], control selection logic is used on the dual rail input data before either of Shannon's equations can be realized.

Figure 5:
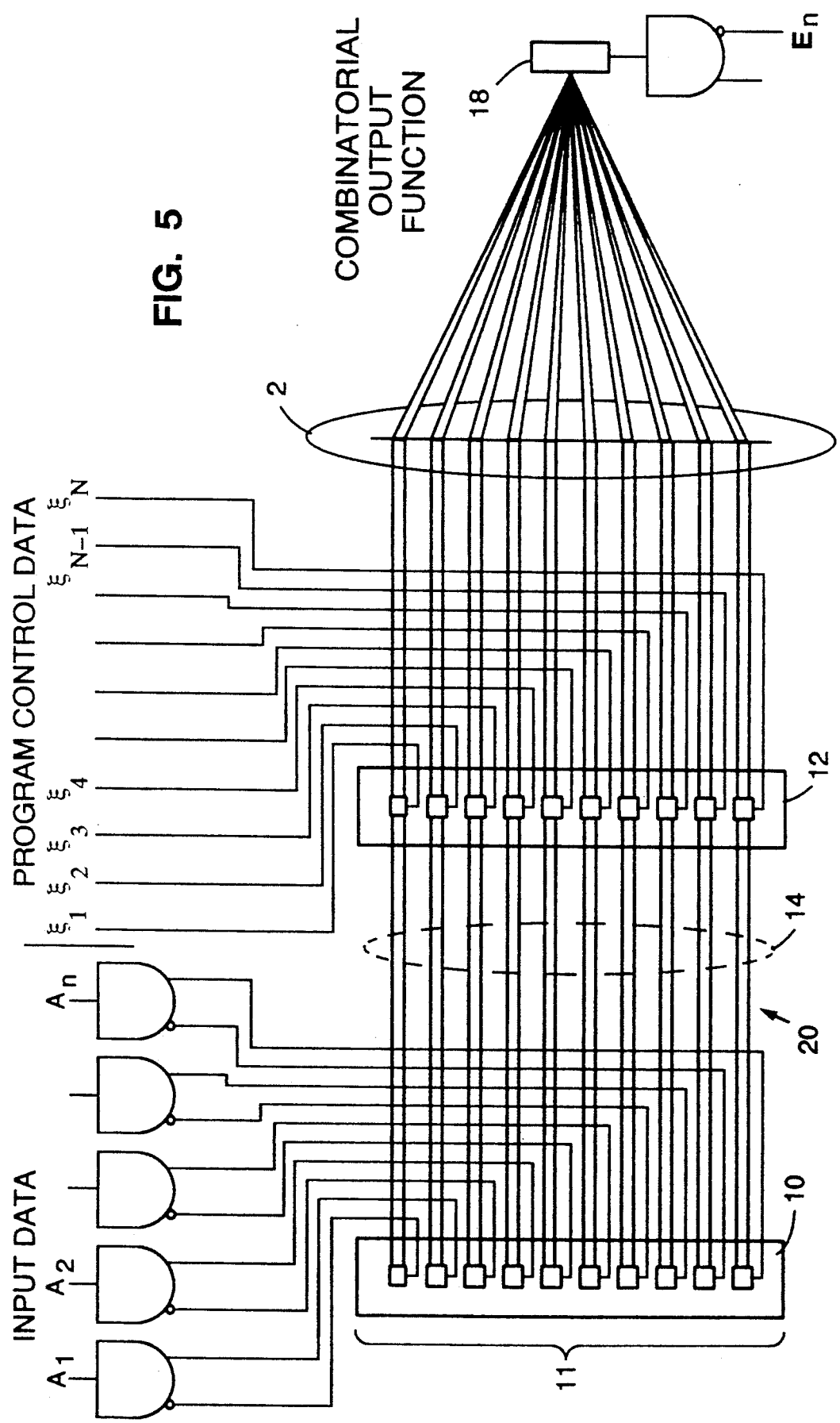
FIG. 5 is an illustration of a simple optical configuration to generate arbitrary combinatorial output functionals from an N-bit wide input data word, selectively under program control in accordance with the present invention.

FIG. 5 summarizes the generic architecture as implemented on a simple optical computer. Input data is fed from the data bus (not shown) in dual rail format to a set of electro-optic transducers 11 to produce the rays 14 as a function of the input data logic states. Given n input data bits, 2n transducers are used. Consequently a 16-bit machine would only use 32 input transducers and a 32-bit machine, 64 transducers. This is certainly Well Within state-of-the-art hardware.

At the same time control logic is sent to a second set of input transducers 16 on device 12. The optical system 20 images the first set of transducers 11 onto the second set 16. The resultant products, n two-input "AND" gates, are then "OR"ed on the detector 18 through lens system 22. The benefit of this is that the detector 18 need only detect the presence or absence of light. Fan-in on the detector can be quite high as the "off" state is the required information state, i.e. a dark system. Only multiplicative modulation efficiencies of the devices determine the leakage or fan-in limitation as compared to summing or threshold logic schemes described in the parent application referred to above.

FIGS. 32A, 32B, 32C and 32D show that if the system were configured for eight input transducers and eight control lines then all eighty terms for the two bit ALU can be selectively obtained without the need to store 80 combinatorial functionals as a lookup table. Obviously, for a 12-bit machine it is considerably simpler to program the machine to selectively produce the required functional through the use of two spatial light modulators of complexity 24 and a single detector, than to store 300+ billion functionals.

The optical computer of the present invention actually computes the correct answer by way of generating functionals under program control. These functionals are then used to generate composite answers for a complete instruction.

The output of the detector from FIG. 5 can be written as shown in equation 5:

$$E_N = \overline{A_1\xi_1 + \overline{A_1}\xi_2 + A_2\xi_3 + \overline{A_2}\xi_4 + \ldots + A_N\xi_{2N-1} + \overline{A_N}\xi_{2N}} \quad [5]$$

This represents 2N "AND" gates "OR"ed together. This allows one to rewrite the output $E_N$ from DeMorgan's Laws as an N bit Boolean "AND" product as shown in equation 6:

$$E_N = \overline{A_1\xi_1} \cdot \overline{\overline{A_1}\xi_2} \cdot \overline{A_2\xi_3} \cdot \overline{\overline{A_2}\xi_4} \cdot \ldots \cdot \overline{A_N\xi_{2N-1}} \cdot \overline{\overline{A_N}\xi_{2N}} \quad [6]$$

This again states simply that by producing the required control bits (microcode), $\xi_1$ through $\xi_{2N}$, it is possible to arbitrarily program the present invention to produce any sequence of combinatorial multiplications of arbitrary bit length. Without the application of DeMorgan's law, a sequential stack of spatial light modulators of stack height N would be required and therefore impractical. The outputs $E_N$ now represent Shannon's combinatorial output functionals $f_1$ through $f_k$ given a sequence of k control vectors of length 2N.

These combinatorial output functionals can be "OR"ed to produce Shannon's second set of equations [2] by (1) passing the functionals back through the optical system, (2) supplying the correct microcode for the second set of equations, and (3) ignoring DeMorgan's law, i.e. do not take the inverted output. This now represents what is commonly referred to as an instruction. It is thus possible by downloading the correct microcode stored in a memory subsystem, to program the machine of the present invention to perform instructions. Different microcoded sequences will act on the data in different fashions thereby providing the user access to a microcode instruction set. If this instruction set comprises a complete set of operations, a compiler code generator can be Written for any desired higher level language. A fully general purpose optical computer can thus be realized.

The optical architecture as shown in FIG. 2, is not believed to represent a competitive interconnect configuration which will allow optics to perform within its optimal characteristics. However, through the use of parallel optical implementations of microcode, massive computations are possible.

Figure 6:
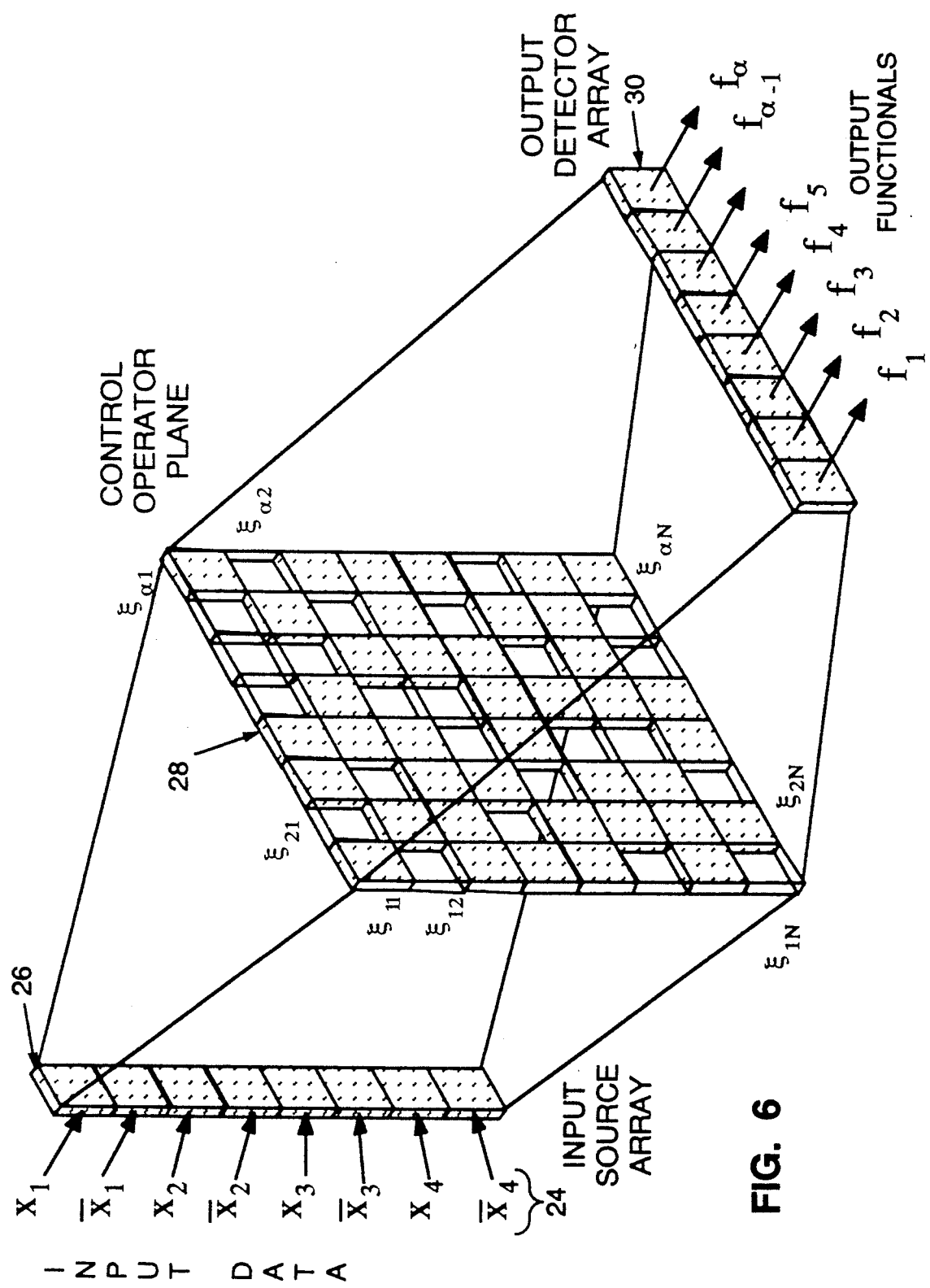
FIG. 6 is an illustration of the present invention in which the input data vector is operated upon by a plurality of control words with the result of each input data vector/control word interaction being detected by an associated detector.

Consider the optical "matrix/vector" computing architecture shown in FIG. 6. Instead of having a parallel array as shown in FIG. 5, this architecture utilizes the three dimensional capability of optical computing. The input source data vector 24 is input in dual rail format to the input source array 26. This vertical input vector is broadcast across all the columns of the control operator matrix plane 28 and imaged across all the rows of the control matrix plane 28. The control operator matrix plane 28 includes $\alpha$, N-bit control sequences. In parallel all combinatorial functionals, $f_1$ through $f_\alpha$ ($\alpha$ could equal k if desired) are available simultaneously at the output detector array 30. Consequently, the system is computing microcoded combinatorial functionals in parallel.

This architecture can be represented as a Boolean logic matrix/vector multiplication which produces all of the combinatorial output functionals $f_1$ through $f_k$ of Shannon's equation [1]. The only difference between this matrix/vector formulation and one use commonly in mathematics is that the inner product summation terms are actually threshold detections, Boolean summations, or "OR"ings. The only precision that is needed is binary, i.e. 1 or 0. The maximum inner product answer is 1. However the effect is to have multiple parallel input "AND" gates via DeMorgan's Laws.

This matrix/vector formulation represents a complete instruction. Notice that all output functionals $f_1$ through $f_\alpha$ are produced. Again $\alpha$ could equal k if desired. Equation 7 relates the matrix/vector formulation to the physical hardware of FIG. 6.

$$\begin{bmatrix} \xi_{11} & \xi_{12} & \cdots & \xi_{1N} \\ \xi_{21} & \xi_{22} & \cdots & \xi_{2N} \\ \vdots & \vdots & & \vdots \\ \xi_{\alpha-1,1} & \xi_{\alpha-1,2} & \cdots & \xi_{\alpha-1,N} \\ \xi_{\alpha 1} & \xi_{\alpha 2} & \cdots & \xi_{\alpha N} \end{bmatrix} \quad [7]$$

Control matrix $$\begin{bmatrix} x_1 \\ \overline{x_1} \\ \vdots \\ x_{\frac{N}{2}} \\ \overline{x_{\frac{N}{2}}} \end{bmatrix} = \begin{bmatrix} f_1 \\ f_2 \\ \vdots \\ f_{\alpha-1} \\ f_\alpha \end{bmatrix}$$

Data vector | Output functional vector

The equation can also be expanded as shown in equation 8. Each vertical column of the control plane as shown on the optical architecture of FIG. 6 interacts with the input data linear source array to produce on each detector a corresponding equation as shown in equation 8. Note again that the summations shown are actually "OR" functions and the detectors are merely thresholding. Again applying DeMorgan's Laws the output combinatorial functionals are actually realized.

$$= \begin{bmatrix} x_1\xi_{11} & + \overline{x_1}\xi_{12} & + x_2\xi_{13} & + \overline{x_2}\xi_{14} & + \ldots & + x_{\frac{N}{2}}\xi_{1,N-1} & + \overline{x_{\frac{N}{2}}}\xi_{1,N} \\ x_1\xi_{21} & + \overline{x_1}\xi_{22} & + x_2\xi_{23} & + \overline{x_2}\xi_{24} & + \ldots & + x_{\frac{N}{2}}\xi_{2,N-1} & + \overline{x_{\frac{N}{2}}}\xi_{2,N} \\ \vdots & \vdots & \vdots & \vdots & & \vdots & \vdots \\ x_1\xi_{a-1,1} & + \overline{x_1}\xi_{a-1,2} & + x_2\xi_{a-1,3} & + \overline{x_2}\xi_{a-1,4} & + \ldots & + x_{\frac{N}{2}}\xi_{a-1,N-1} & + \overline{x_{\frac{N}{2}}}\xi_{a-1,N} \\ x_1\xi_{a1} & + \overline{x_1}\xi_{a2} & + x_2\xi_{a3} & + \overline{x_2}\xi_{a4} & + \ldots & + x_{\frac{N}{2}}\xi_{a,N-1} & + \overline{x_{\frac{N}{2}}}\xi_{a,N} \end{bmatrix} \quad [8]$$

$$\begin{bmatrix} \left(\prod_{i=1}^{\frac{N}{2}} \overline{x_{N-1}\xi_{1,2N-1}}\right)\left(\prod_{i=1}^{\frac{N}{2}} \overline{x_{n-1}\xi_{1,2N}}\right) \\ \vdots \\ \left(\prod_{i=1}^{\frac{N}{2}} \overline{x_{N-1}\xi_{a,2N-1}}\right)\left(\prod_{i=1}^{\frac{N}{2}} \overline{x_{n-1}\xi_{a,2N}}\right) \end{bmatrix} = \begin{bmatrix} f_1 \\ f_2 \\ \vdots \\ f_{a-1} \\ f_a \end{bmatrix}$$

The output is the first set of answers required by Shannon's theorem. They can be fed back to the input, the control operator changed (or downloaded as the case may be) and the second set of Shannon's equations are produced at the output, thus representing, in two computation cycles, a complete instruction.

Returning for the moment to the 2-bit multiplier design an example of flash computation will now be provided. These equations describe the desired outputs of the multiplier in terms of the sum of combinatorial products.

Figure 7:
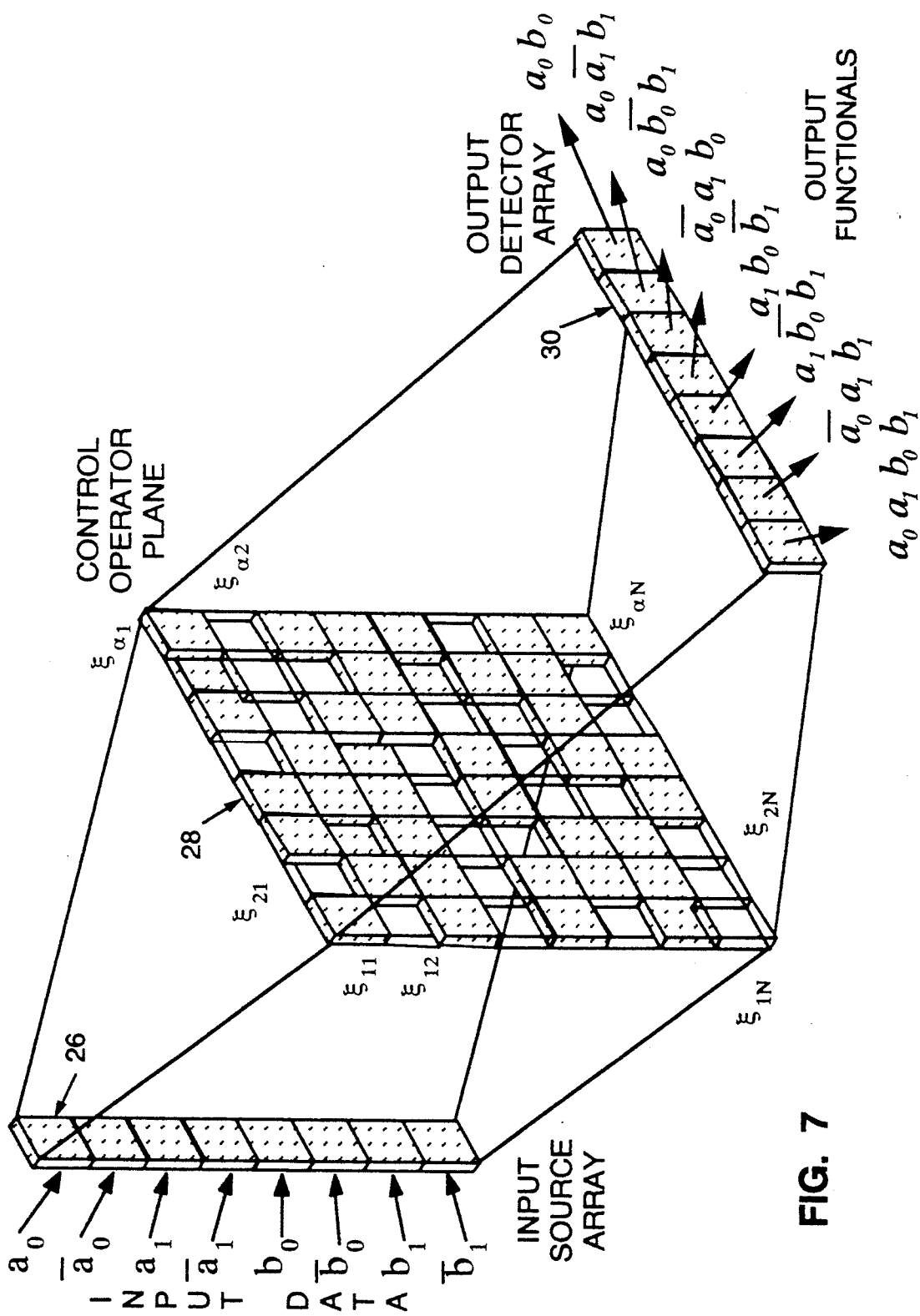
FIG. 7 is an illustration of the embodiment of FIG. 6 which has been programmed to perform flash 2-bit multiplication in two passes.

For the purpose of demonstration FIG. 7 is a reconfigured representation of FIG. 6 with the following changes. First, as shown in FIG. 7, the input data source now shows the input words for the two bit multiplier, specifically $a_0$, $\overline{a_0}$, $a_1$, $b_0$, $\overline{b_0}$, $b_1$, and $\overline{b_1}$. The control matrix plane first generates the eight functionals shown in equation 3 therefore its size is $8 \times 8$ and eight detectors are required.

As shown in FIG. 7, the first column of the control matrix plane 28 is configured with $\xi_{12}$, $\xi_{14}$, $\xi_{16}$ and $\xi_{18}$ "on". This allows $\overline{a_0}$, $\overline{a_1}$, $\overline{b_0}$, and $\overline{b_1}$ to reach and "sum" or OR on the first detector. After output inversion and by DeMorgan's law this becomes $O_4 = a_0 a_1 b_0 b_1$ or the correct answer for the most significant bit of the multiplier. The next two columns of the control matrix plane 28 are programmed as shown to produce the correct functionals for $O_3$; the next four columns produce the correct four functionals for $O_2$; and finally the last column produces the correct functional for the LSB or $O_1$. These eight functionals would then be fed back into the Input Source Array as a second pass. The second pass through the system produces the correct ORing after the control plane is reprogrammed to do so. To produce the final result from detectors 1, 2, 3, and 4, the control mask would be changed as follows: $\xi_{11}$, $\xi_{22}$, $\xi_{23}$, $\xi_{34}$, $\xi_{35}$, $\xi_{36}$, $\xi_{37}$, and $\xi_{48}$ would be set to one or "on". All other control plane pixels would be set to "0". The non-inverted outputs would be used.

Figure 8:
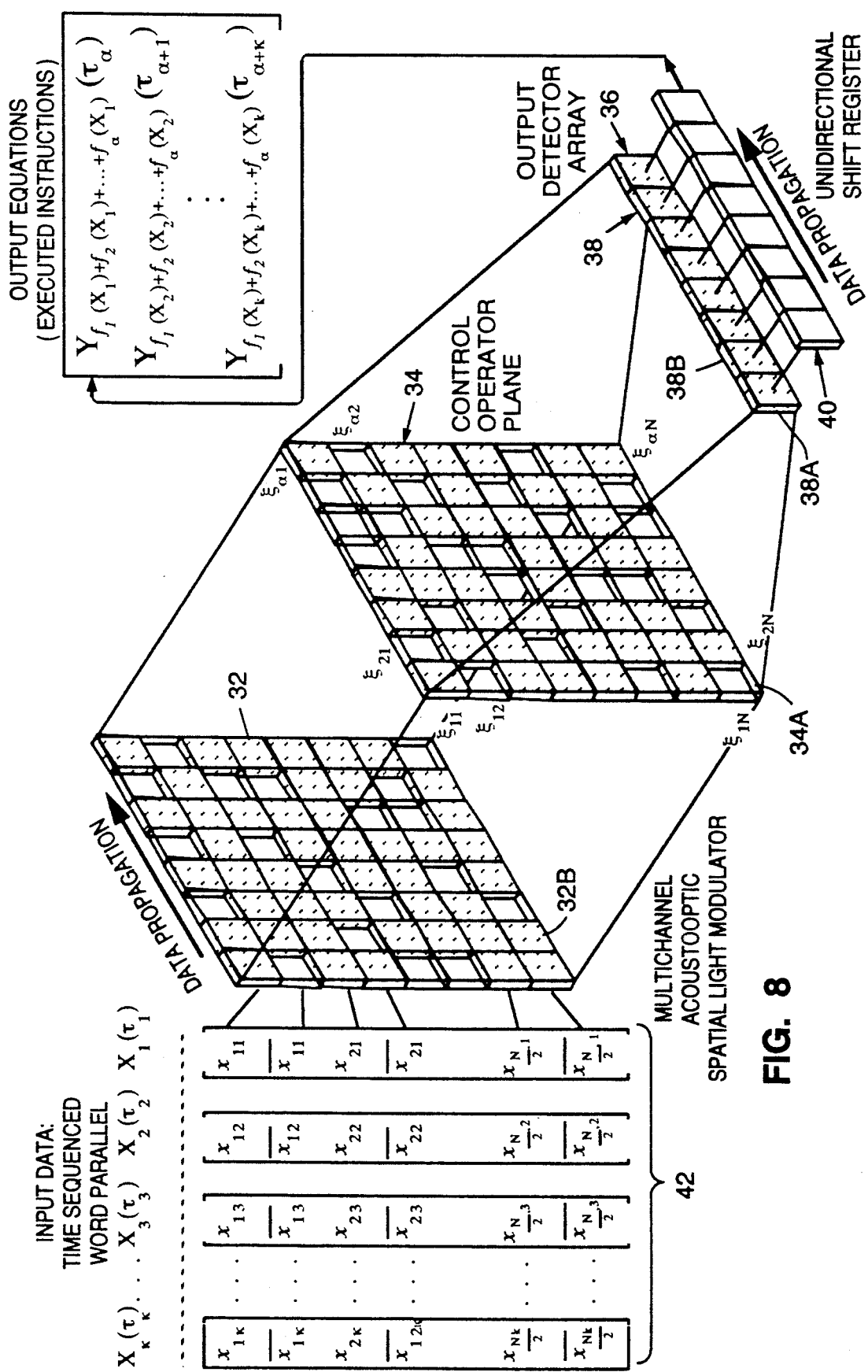
FIG. 8 is an illustration of the present invention in which a plurality of input data words are propagated through a spatial light modulator to provide an expanded parallel version of the present invention in which the input data vectors are time sequenced against the control matrix in the control operator plane.

This general purpose design methodology can now be expanded an additional level to make use of multi-channel acousto-optical devices as shown in FIG. 8. The architecture is an expansion of the above concept to a full parallel optical implementation. As shown in FIG. 8, rather than the first plane being a point source array as described FIGS. 6 and 7, it is replaced by a multi-channel acousto-optic spatial light modulator 32. For now the control operator plane 34 remains a fixed control operator plane. Both input planes could be ultimately replaced with more sophisticated spatial light modulators if and when they are ever available. The output detector array 36 can be a linear avalanche photodiode array 38 driving an off chip electronic unidirectional shift register 40.

The multi-channel acousto-optic device 32 provides a propagating bit window in a "convolver" mode with respect to the fixed control operator plane 34. Consider for the moment the input data 42. Data is input word parallel as shown in equation set 9. Successive data words from memory (not shown) are down loaded time sequentially and input to multi-channel acousto-optic device 32. First word $X_1(\tau_1)$ is fed to the multi-channel acousto-optic device 32. The number of bits fed to the cell is twice the word length to enable all bits and their complements to be input, i.e. a dual rail format. (Therefore, if a 16 bit CPU is desired, then a 32-channel acousto-optic cell is used for a single clock data cycle, $\tau 1$.) Immediately after the first data work, $X_2(\tau_2)$ is then fed to the multi-channel device 32, and so on.

$$X_k(\tau_k) \ldots X_3(\tau_3) X_2(\tau_2) X_1(\tau_1) = \begin{bmatrix} x_{1k} \\ \overline{x_{1k}} \\ x_{2k} \\ \overline{x_{2k}} \\ x_{\frac{Nk}{2}} \\ \overline{x_{\frac{Nk}{2}}} \end{bmatrix} \ldots \begin{bmatrix} x_{13} \\ \overline{x_{13}} \\ x_{23} \\ \overline{x_{23}} \\ x_{\frac{N}{2},3} \\ \overline{x_{\frac{N}{2},3}} \end{bmatrix}$$

$$\begin{bmatrix} X_{12} \\ \overline{X_{12}} \\ X_{22} \\ \overline{X_{22}} \\ X_{\frac{N}{2},2} \\ \overline{X_{\frac{N}{2},2}} \end{bmatrix} \begin{bmatrix} X_{11} \\ \overline{X_{11}} \\ X_{21} \\ \overline{X_{21}} \\ X_{\frac{N}{2},1} \\ \overline{X_{\frac{N}{2},1}} \end{bmatrix}$$

For the purpose of understanding the operation of the device, consider only the interaction of the first input data word, $X_1(\tau_1)$, with the control operator plane 34. At time $\tau=1$, the first input data word $X_1(\tau_1)$ (where the $\tau_1$ represents that the word $X_1$ was in fact inserted at the first clock cycle) interacts with the first column 34A of the control operator plane 34, generating on the first detector 38A of the output detector array 38, the first functional $f_1(X_1)$. At the next clock cycle, time $\tau=2$, the second data word $X_2(\tau_2)$ is input to the multichannel acousto-optic device 32 whereupon it interacts with the first column 34A of the control operator plane 34, and generates on the first detector 38A of the output detector array 40 an output corresponding to the first functional on the second data word $f_1(X_2)$.

While this is happening, the first input data word $X_1(\tau_1)$ has traveled down the multichannel acousto-optic device 32 to the second position 32B where, because of the imaging configuration of the optical system, it interacts with the second column of the control matrix, and subsequently produces an output on the second detector 38B of the output detector array 38 which corresponds to the second functional operating on the first input data word, or $f_2(X_1)$.

Figure 9:
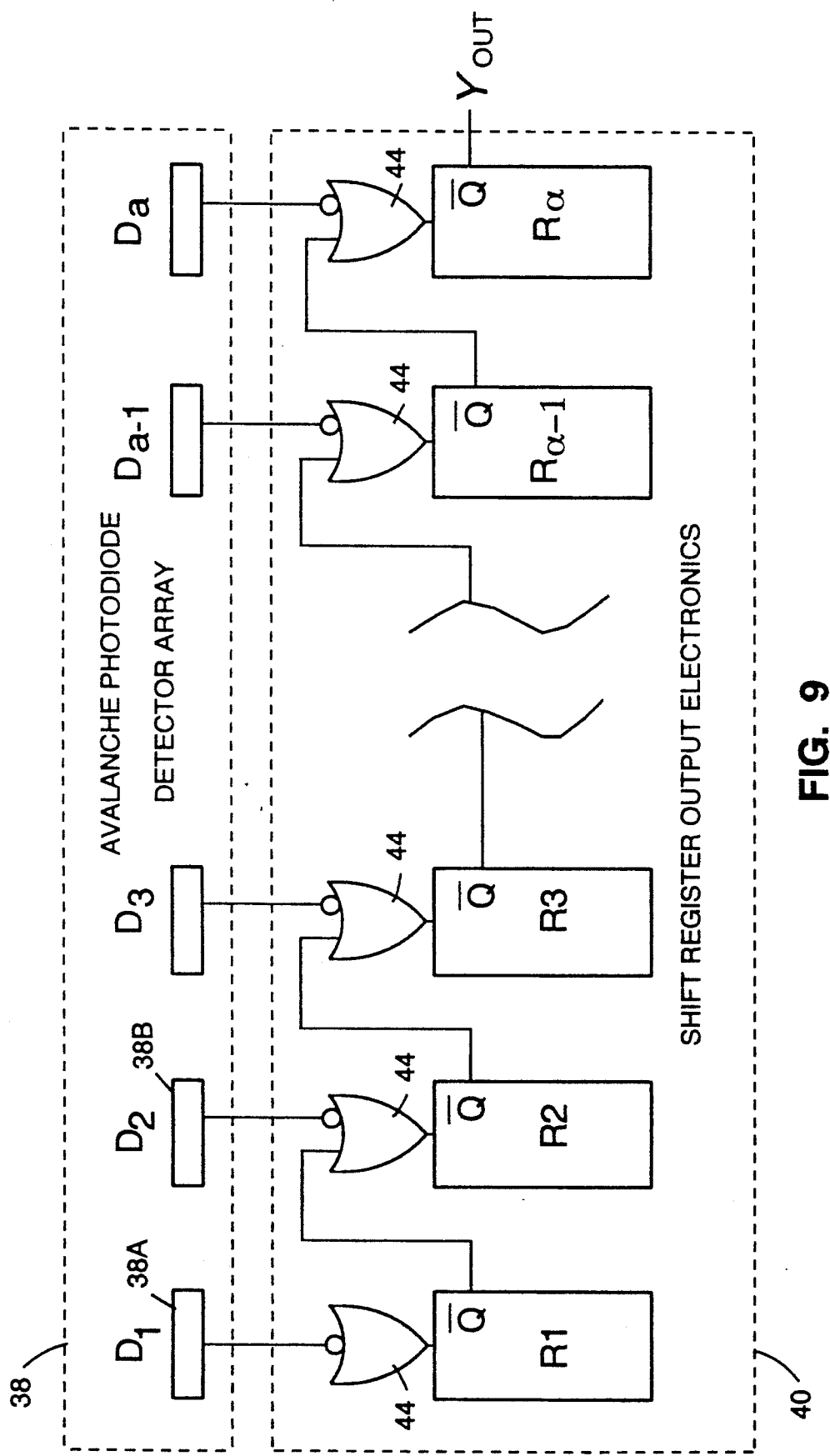
FIG. 9 is a functional block diagram of a unidirection output shift register for use in the time sequenced expanded parallel impelemtation of FIG. 8.

Examination of the output unidirectional shift register electronics 40 will assist in the understanding of the complete operation of the system. Consider the output shift register schematic as shown in FIG. 9.

The output shift register electronics consists of "a" detectors (D1 through Da), OR gates 44, and latches (R1 through Ra). The output of each detector is first inverted and then ORed with the $\overline{Q}$ of the previous shift register latch (except for the first one). Consequently at time $\tau=2$ the output from the second latch becomes the Boolean sum $f_1(X_1)+f_2(X_1)$ and the output from the first latch is still $f_1(X_2)$. One can see that the detector configuration is actually "time-integrating" the Boolean ORs as the data clocks down the multichannel acousto-optic device 32. Therefore, after $\alpha$ clock cycles, a complete instruction on input data word $X_1(\tau_1)$ will have emerged from the end of the shift register 40, namely $\alpha$ functionals and summations. The output can be written:

$$O(\tau_a) = Y_{f_1(X_1)+f_2(X_1)+ \ldots +f_a(X_1)}(\tau_a) \quad [11]$$

Similarly, at the next clock cycle, $\alpha+1$, an identical instruction has been carried out on the next input data word $X_2(\tau_2)$ where the result is shown in equation 12:

$$O(\tau_{a+1}) = Y_{f_1(X_2)+f_2(X_2)+ \ldots f_a(X_2)}(\tau_{a+1}) \quad [12]$$

Finally, at any later arbitrary clock cycle, $\tau=\alpha+\kappa$, where $\kappa$ is the arbitrary index, the identical instruction has been carried out on the $\kappa$th input data word $X_\kappa(\tau\kappa)$ and the result can be written as:

$$O(\tau_{a+\kappa}) = Y_{f_1(X_k)+f_2(X_k)+ \ldots +f_a(X_k)}(\tau_{a+\kappa}) \quad [13]$$

The fixed control operator plane 34 in this configuration can be replaced by a spatial light modulator such as the magneto-optic device, liquid crystal devices, etc. Insertion of such devices would allow the user to change his program and not be limited by a fixed instruction set. Unfortunately, these devices are currently extremely slow. In addition, their diffraction efficiencies leave much to be desired On the other hand, multichannel acousto optic devices are extremely fast, for example 6.4 Gbits/sec loadability.

Figure 10A:
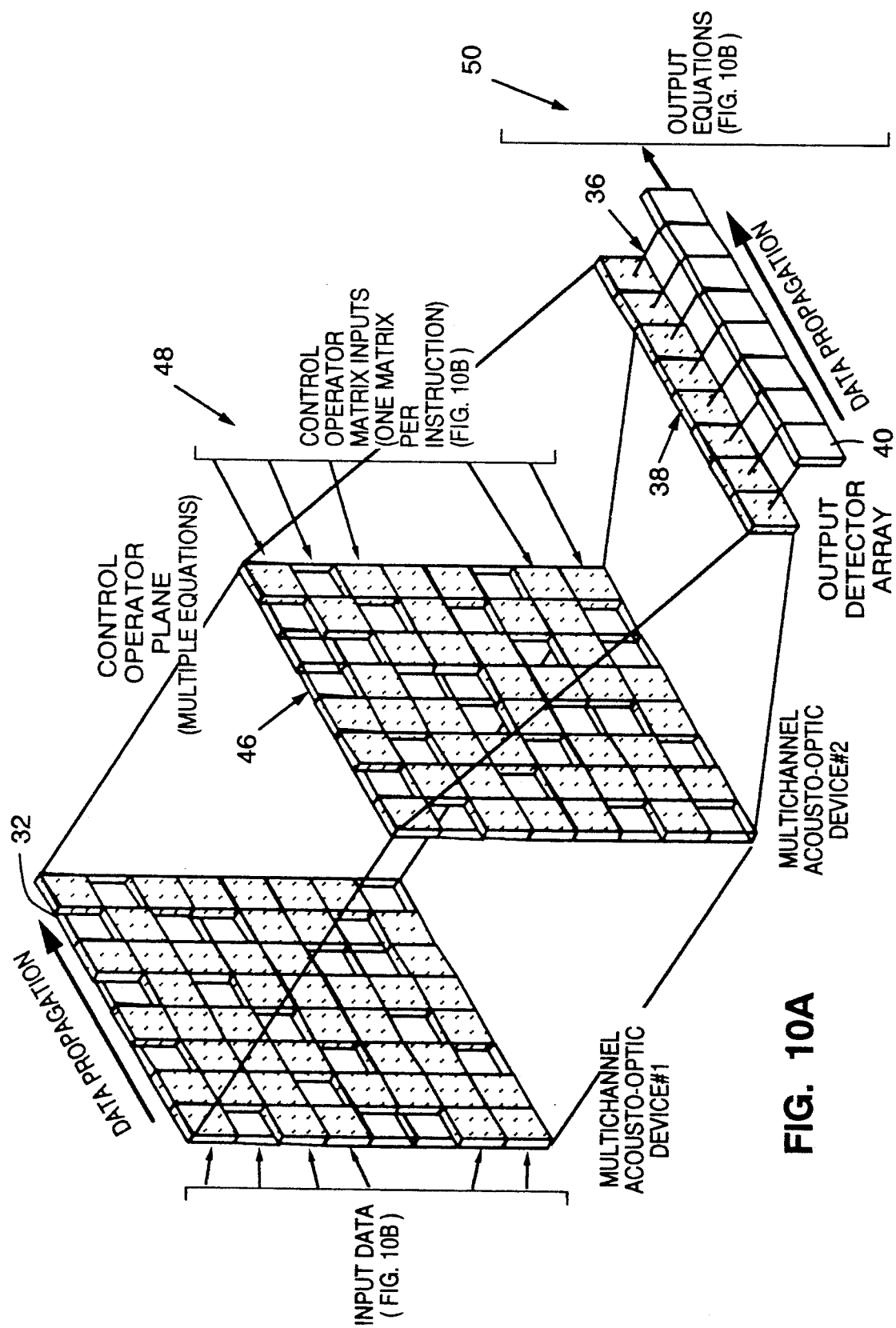
FIG. 10 illustrates the use of control operator matrix inputs to a spatial light modulator in place of the fixed control operator plane of FIG. 9 to provide a programmable control matrix.

Consider the system of FIG. 10. Here the fixed control operator plane 34 has been replaced with a multichannel acousto-optic spatial light modulator 46 identical to the multichannel acousto-optic input data spatial light modulator 32. Now matrices of instructions may be down loaded randomly under software control.

Notice that the matrix transpose of the control matrix 48 is fed to the second multichannel acousto-optic device 46 in row parallel format. The output vector 50 is provided from the unidirectional shift register 40 of the output detector array 36. The system is identical to that of FIG. 8, with the exception of some timing considerations. For the purpose of discussion, after each data and control vector are loaded, a "0" vector also needs to be loaded. This inefficiency can be later removed through "puzzling" methods on the detector.

In this computer the compute gain is thus calculated as $2N\alpha$. This can be on the order of $10^3$ and higher depending on the length of the equation. If the equation length is 32 and the bit length is 32 then the compute gain is 1024. In addition, if the detector array is partitioned into segments, multiple parallel processor configurations can be realized.

The optical computer architecture of FIG. 10 can be reduced to hardware as shown in FIGS. 11A and 11B. Both top view, FIG. 11B, and side view, FIG. 11A, are shown. The input source illumination shown is preferably a Laser source 52 although the system is inherently "incoherent". First the input light is collimated as shown in region 54. From the side view the collimation is co-axial. From the top view the collimation is offset to produce the correct Bragg angle of the first and second multichannel acousto-optic devices 32 and 46, respectively. Consequently, light enters the first multichannel acousto-optic device 32 perpendicular to its face in the dimension of the transducers 56. See side view, FIG. 11A. In the dimension of sound propagation, the light enters at the Bragg angle. See top view, FIG. 11B.

The lens 58, immediately to the right of the first multichannel acousto-optic device 32, is used to Fourier transform the two dimensional information at the first input plane; i.e., at the output of the multichannel acousto-optic device 32. This allows the zero order light to be filtered off in the Fourier transform plane by way of stop 60. Diffracted light, containing the bit information is allowed to pass through to the second multichannel acousto-optic device 46 via the second lens 62 in the telecentric imaging lens pair 64.

This second lens 62 effectively performs an inverse Fourier transform. So essentially the first order diffracted light from the first multichannel acousto-optic device 32 becomes the input zero order light for the second multichannel acousto-optic device 46. This zero order light is Fourier transformed along with the product of the zero order and the control matrix data 48, FIG. 10, input to the second multichannel acousto-optic device 46. The "zero" order light is filtered, using stop 66, as shown in the Fourier plane of the lens 68 to the right of the second multichannel acousto-optic device 46, as shown in the top view, FIG. 11B.

The multiplicative product is allowed to pass where it is inverse transformed and consequently imaged onto the output detector array 36, by lenses 70 and 72 as shown. The two lenses 70 and 72 performing this imaging are actually cylindrical and have no power in the side view dimension. The second to last lens 70 shown in the side view dimension is a cylindrical lens with a focal length of twice that of the imaging cylindrical lens pair 70 and 72. This causes all rays to be focused in the side dimension on to the output detector array 36.

This system in hardware can be built very similarly to the SAOBiC design described in U.S. Pat. No. 4,667,300, issued May 19, 1987. The SAOBiC design, built previously by the applicants, is quite different in terms of data flow, however; many of the same principles in hardware are readily applicable. For example, two multichannel acousto-optic devices were arranged in a convolver mode through a telecentric imagine lens configuration. However in the SAOBiC, only four of each of the 32 channels were used to demonstrate proof of principle. In the present invention, a channel count approaching 50 is desirable. In addition, the SAOBiC requires a far more complex detection and post processing configuration than the present invention.

MACHINE LEVEL ARCHITECTURE

The high level architecture to be used with the optical hardware of the present invention will now be described in greater detail. The embodiments which will be described herein generally employ the configuration of FIG. 10 except that the input data will be operated upon one input data vector at a time; i.e. only the first column of the input spatial light modulator 32 will be used. It is to be understood that instead of a spatial light modulator a multichannel acousto-optic device, or even a diode array, such as a laser diode array, can be used. The data inputs to the input spatial light modulator will be assumed to be arbitrarily selectable and not confined to a dual rail format. The inputs to the spatial light modulator 46 for the control operator plane also will be assumed to be arbitrarily selectable and not confined to any one format.

One objective is to achieve a usable high level architecture which permits hardware modification and enhancements without having to re-invent (or re-implement) the wheel for the software support. As such, an interpretation of the Sun Microsystems, Inc. of Mountain View, Calif., SPARC architecture (Scalable Processor ARChitecture) is employed, using optical logical primitives.

A first embodiment (embodiment I) of the optical processor of the present invention is equivalent to a 49 input by 128 deep systolic programmable logic array ("PLA") with a 10 nsec clock period. A PLA width of 37 signals, which is presently available, allows a flash calculation of an 8 bit add carry look ahead in a single clock cycle (an additional cycle is required to OR the 49 minterms to get the 8 maxterms). A width of 49 signals allows an 8 bit add with an additional cycle for the "detector OR" logic operation. A static data architecture is described here using a photodiode array 74 for data input source array 26 and a Spatial Light Modulator ("SLM") 76 for the control operator plane 28, compare FIGS. 7 and 12A.

The first embodiment is scalable over a wide range of sizes of the photodiode array 74 depending on the available optical hardware by varying the optical primitive widths (w). The primitives for an ADD operation require 6 * w inputs for the Sum output and (3 * w)+1 for the carry lookahead.

The data is presented to a photodiode array 74, or equivalent linear array, which is imaged with a cylindrical lens (not shown) onto the SLM 76 so that each photodiode data bit is distributed over an entire row of pixels across the SLM 76, as discussed in the previous section.

The light from each column of SLM pixels, e.g. column 78, is then imaged using another cylindrical lens (not shown) onto its corresponding detector, e.g. detector 80, in detector array 82. See FIG. 12A. Thus light from a selected subset of photodiodes 74 is summed onto each photodetector of photodetector array 82 according to the pattern in the SLM 78.

Figures 12A, 12B:
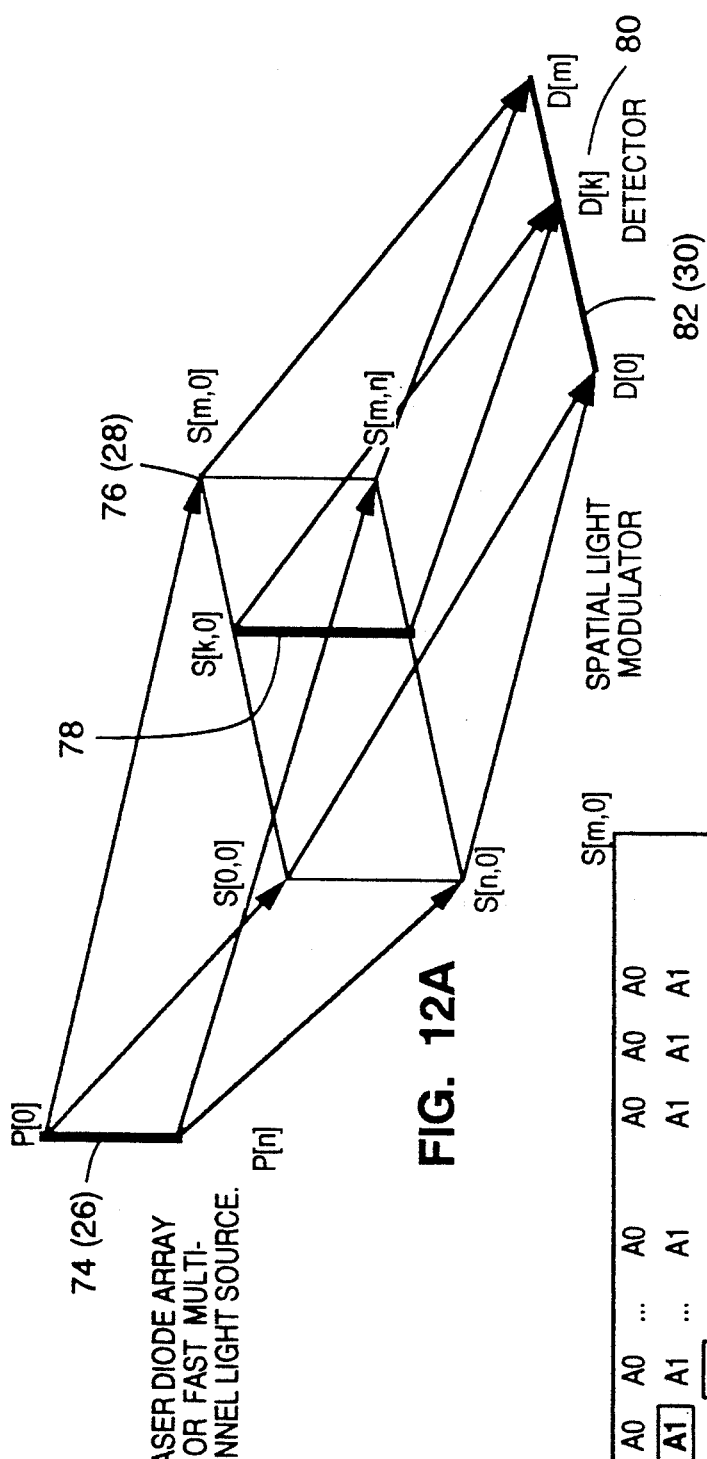
FIG. 12A illustrates the generalized optical hardware architecture of the preferred embodiment of the present invention.
FIG. 12B illustrates one possible programmable control mask of the embodiment of FIG. 12A.

As used in FIGS. 12A and 12B, individual photodiodes in the photodiode array 74 are referred to by the designations P[0] through P[n], where n is equal to the number of photodiodes in the array; the pixels of the SLM 76 are referred by the notation S[0,0] through S[m,n], where m represents the columns in the SLM and n corresponds to the diodes of the photodiode array 74 and is equal to the total number of rows in the SLM; and the individual detectors of the output detector array 82 are referred to by the designations D[0] through D[m], where m corresponds to the columns of the SLM. The input data takes the form of two input words A, having bits $A_0$ through $A_{(n/2)-1}$, and B, having bits $B_0$ through $B_{(n/2)-1}$. FIG. 12B illustrates the operation of the SLM 76, as controlled by the control plane input matrix, upon the input data words A and B.

For example, in high true logic (1=on=light) a bit of a logical OR is calculated by imaging only the light from the photodiodes controlled by the signals $A_0$ and $B_0$ onto detector $D_0$. The SLM 76 blocks light from the other photodiodes of the photodiode array 74. This process is repeated for all columns over bits A0 through $A_{(n/2)-1}$, B0 through $B_{(n/2)-1}$, that are selected for detectors D0–Dm. See FIG. 12B. The off to on ratio of the SLM 76 and other sources of stray light limit the maximum number of input photodiodes P[] that can be imaged on one detector D[] for reliable no light versus light threshold detection. This presently limits functions to 50 to 70 input signals maximum for the current implementation of this embodiment.

BASIC OPERATIONS

The control operator matrix input to the SLM 76 implements a number of primitive operations which are concatenated to compute the 32-bit operations described in the next section. In other words, the primitives are the building blocks from which the higher level operations are constructed. All logical operations are done in the optics except negation which is done during data selection for the photodiode array.

The photodiode array is loaded from data in the input registers (not shown) according to the particular set of functions which is to be computed. The present example uses a minimum of 8 32-bit input registers, designated as registers A, B, C, D, 0, T, and Y, and a 1-bit $C_{in}$, that are accessed during the combinatorial functional and combinatorial summation operations with the photodiode array 74, the SLM 76, and the output detector array 82. These registers can be emulated by microcode or control code in one implementation or exist as hardware registers when speed is important. The BIT 3210 five port register file, manufactured by Bipolar Integrated Technology of Oregon can be used for this purpose and provides 64 registers of 32 to 64 bits wide.

The A and B registers initially correspond to the selected Operand register values at the emulation level. The C and 0 and T registers are used for intermediate value calculations within a functional/summation sequence during an emulation instruction.

SOURCE DATA SELECTION PRIMITIVES

Figure 13A:
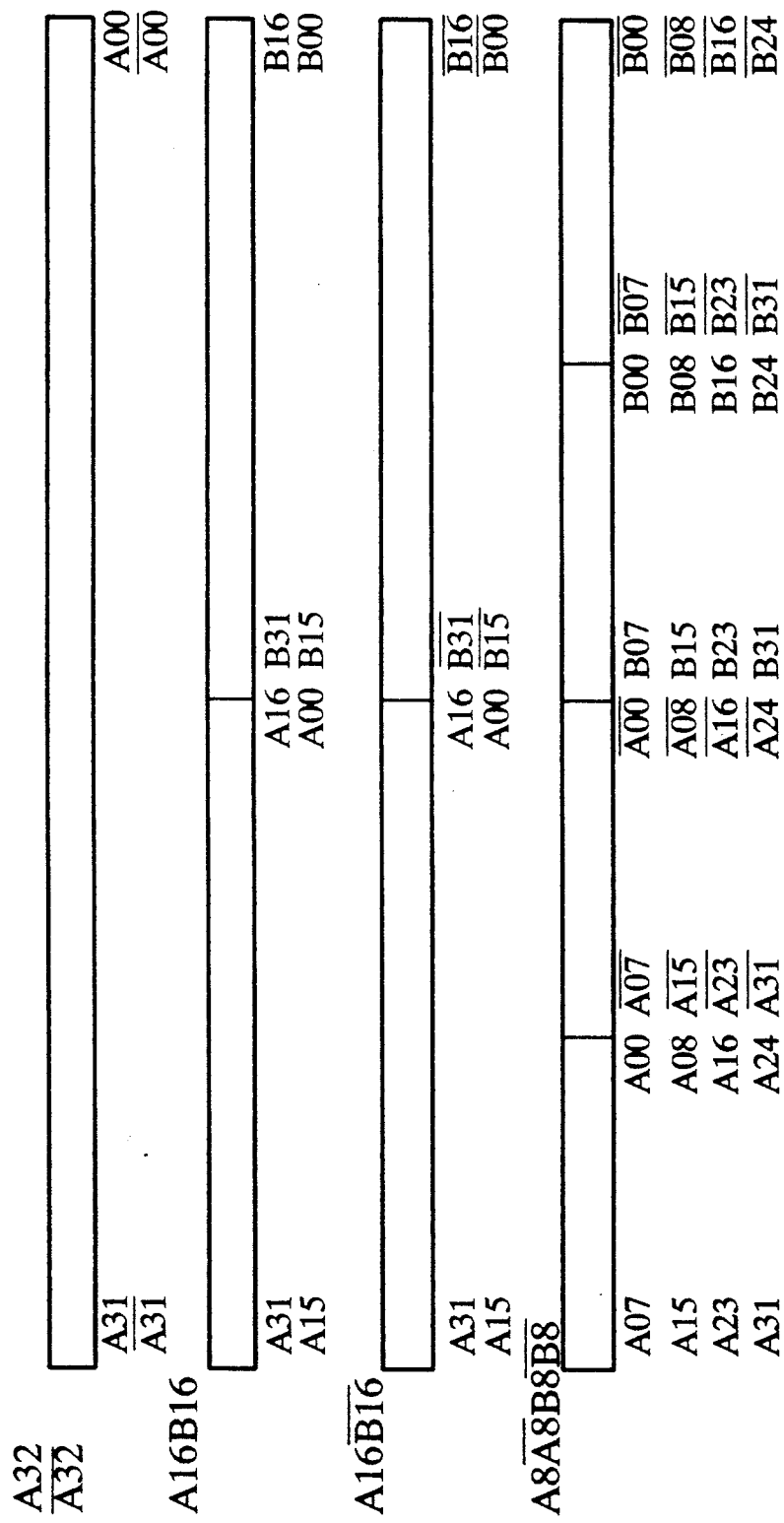
FIG. 13 is an illustration of an example of data selection which can be employed in embodiments of the present invention for various channel widths.

The source data selection primitives control the extraction and routing of data from a plurality of input registers to the photodiodes P[0] to P[m]. FIG. 33 lists the terminology for specification of register origin, field width, starting bit position and polarity for the data to be routed to the photodiode array. The left column of FIG. 33 names the primitive and format used, while the right column provides a brief description of the primitive. FIG. 13 shows the allocation of bits for each set of data supplied to the photodiode array for each stage of a particular primitive, and also shows the sequence of data selections required to compute the various primitives discussed in further detail below. In addition the figure graphically depicts the sources and polarities of the input signal selection.

For example, in FIG. 13, the primitive for A16[]$\overline{B16}$[00,16] is illustrated as first routing bits A31 through A16 and B31 through B16 to the photodiode array 74. In the next step of the primitive, bits A15 through A00 and B15 through B00 are routed to the photodiode array 74.

LOGICAL SLM AND DETECTOR PRIMITIVES

The data selected by the above primitives are used as the input logical operators to be operated upon by the SLM 76 under control of the control operator matrix (see for example control operator matrix 48, FIG. 9). Each column in the SLM 76 receives each of the input logical operators from the photodiode array 74 and selects from them, for transmission to the detector array 82, a series of terms from the input array to be physically ORed together. Since the logical OR of a number of product terms is more useful as an implementation primitive than the logical AND of a number of OR operations, a low true logic interpretation is used. By DeMorgan's Law an AND of OR's can be converted to an OR of AND's in order to interpret each column of the SLM 76.

$$\overline{A+B+C+\ldots} = \overline{A}\cdot\overline{B}\cdot\overline{C}\cdot\ldots \qquad [14]$$

Thus, each column in the SLM 76 is interpreted as calculating the AND of all enabled data items and thus calculates each mini-term or combinatorial functional with low true logic. The output detector array logic 82 does a high true OR of the detector outputs (light=logical 1) resulting in an OR of ANDs.

DETECTOR LOGIC REQUIREMENTS

Since each column in the SLM 76 is focused onto a corresponding detector, a photodetector array for the output detector 82 of the same size as the SLM 76 length is used. The number of rows allowed to be focused onto a detector is limited by the signal to noise ratio at the detector such that a single ON pixel is guaranteed to be detected. This limit sets the maximum number of rows used at 50 to 70, where 48 provides one clean solution.

The detector logic 82 should be configurable at about the same speed as the SLM 76. The optical flash and detect cycle that have been chosen for the embodiment being described is 10 nsec, where the speed of the detector logic 82 and data routing is the limiting factor. The signals corresponding to the absence of light at each detector need to be ANDed together to provide the output for a multi-term function.

For example, in an exclusive-OR operation, two terms (columns) are calculated and used to generate each output bit. The ADD instruction (without feedback) uses from 2 to 17 terms for each bit of the carry lookahead calculation of a 16-bit wide add carry look ahead primitive with carry-in.

EMULATED RISC OPERATIONS

The optical control matrix primitives discussed herein are chosen to efficiently implement a 32-bit wide instruction set given the data width limitations above. Thus, a shift instruction can be done on all 32 bits in a single flash. An exclusive OR instruction can be executed 8 bits at each flash by using 32 inputs for A[8-]$\overline{A[8]}$B[8]$\overline{B[8]}$. The logical operations that are required to completely emulate the RISC instruction are NOT, AND, OR, XOR, ADD, SUBtract, and a multiply shift and add primitive. The following seven sections describe the implementation algorithms and primitives for each of these logical operations implemented in the optical machine in accordance with the present invention.

It is to be understood that the principles of the present invention are applicable to word lengths other than 32 bits, and that the descriptions provided herein are not intended to limit the scope of the invention claimed.

FIG. 34 illustrates the optical primitive sequences for the logical functions: NOT, AND and OR. The logical function is named in the left most column, the sequence of optical primitives is listed in the center column, and a short description of the primitive is provided in the right most column.

Figure 14A:
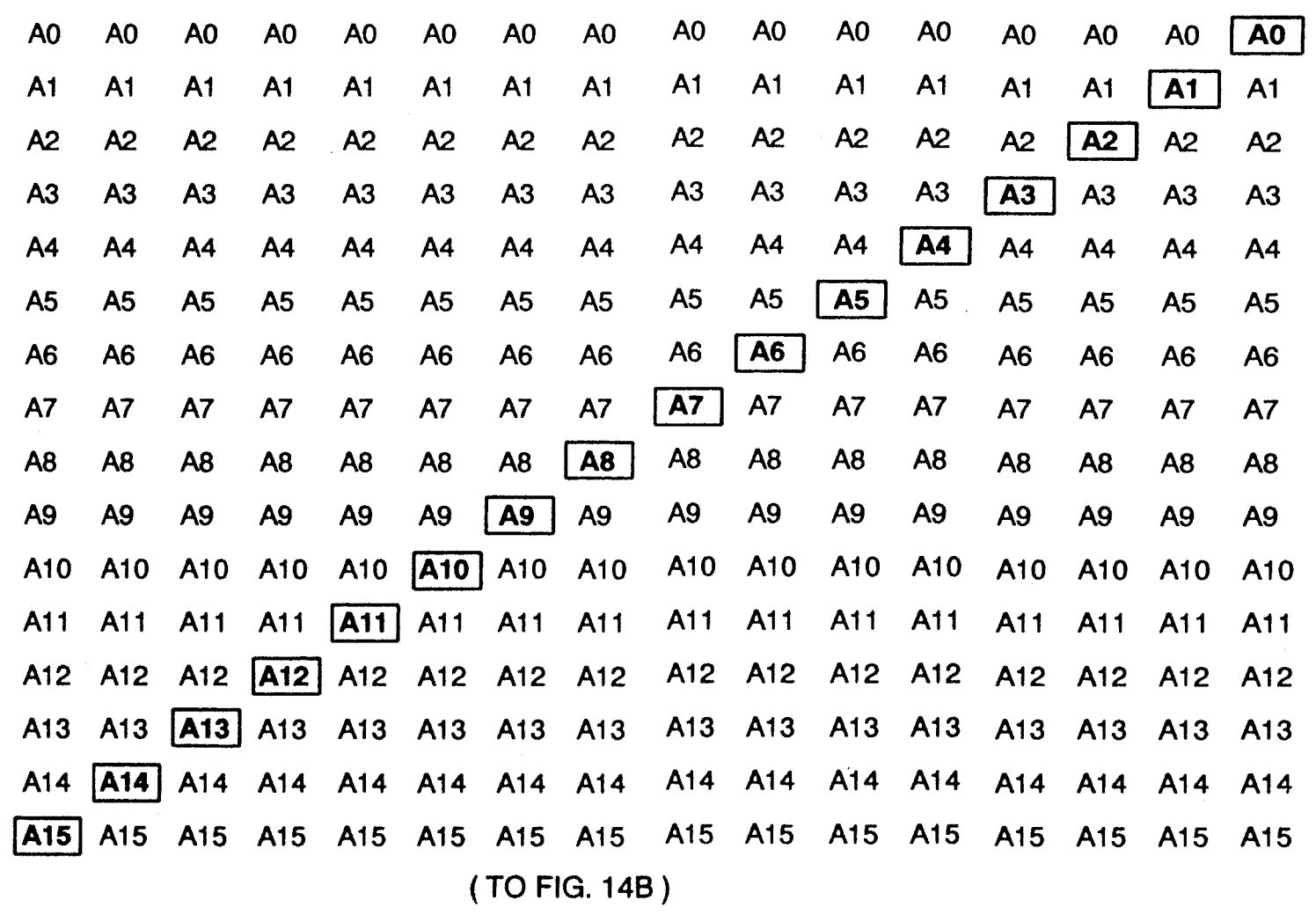

FIG. 14 represents an actual control matrix spatial light modulator representation for both the AND logical function and the OR logical function. This is because the AND computation is performed with the "low true" inputs (light=0) and the OR computation is performed with the "high true" inputs. In all of the above three primitives, only one logical term or column in the control matrix needs to be evaluated for each output bit so no additional detector logic is required.

Thus, for the AND primitive, the A and B inputs are first inverted and are then applied to the photodiode array 74 and the AND-OR control matrix of FIG. 14 is used. The outputs are taken from the output detector array wherein a low field is interpreted as corresponding to a logical 1 or true state.

For the OR primitive, no inversion of the A and B inputs is performed, the same AND-OR control matrix of FIG. 14 is used, and the outputs from the output detector array 82 are interpreted so that a high field corresponds to a logical 1 or true state.

In the case of the following primitives, two or more columns (minterms or combinatorial functionals) are to be combined to calculate each output logical maxterm (combinatorial summation).

Figure 15A-1:
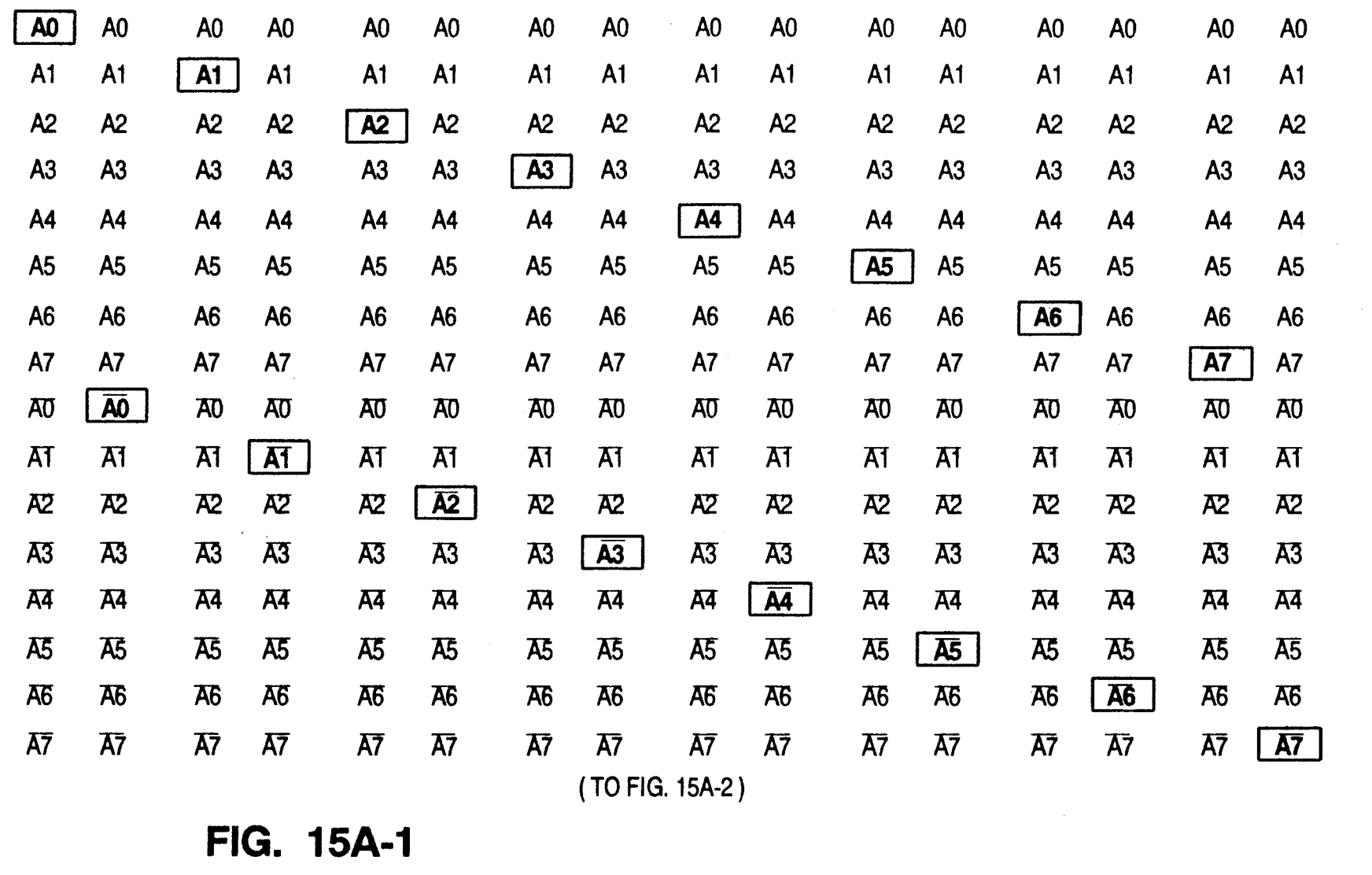
Figure 15B-1:
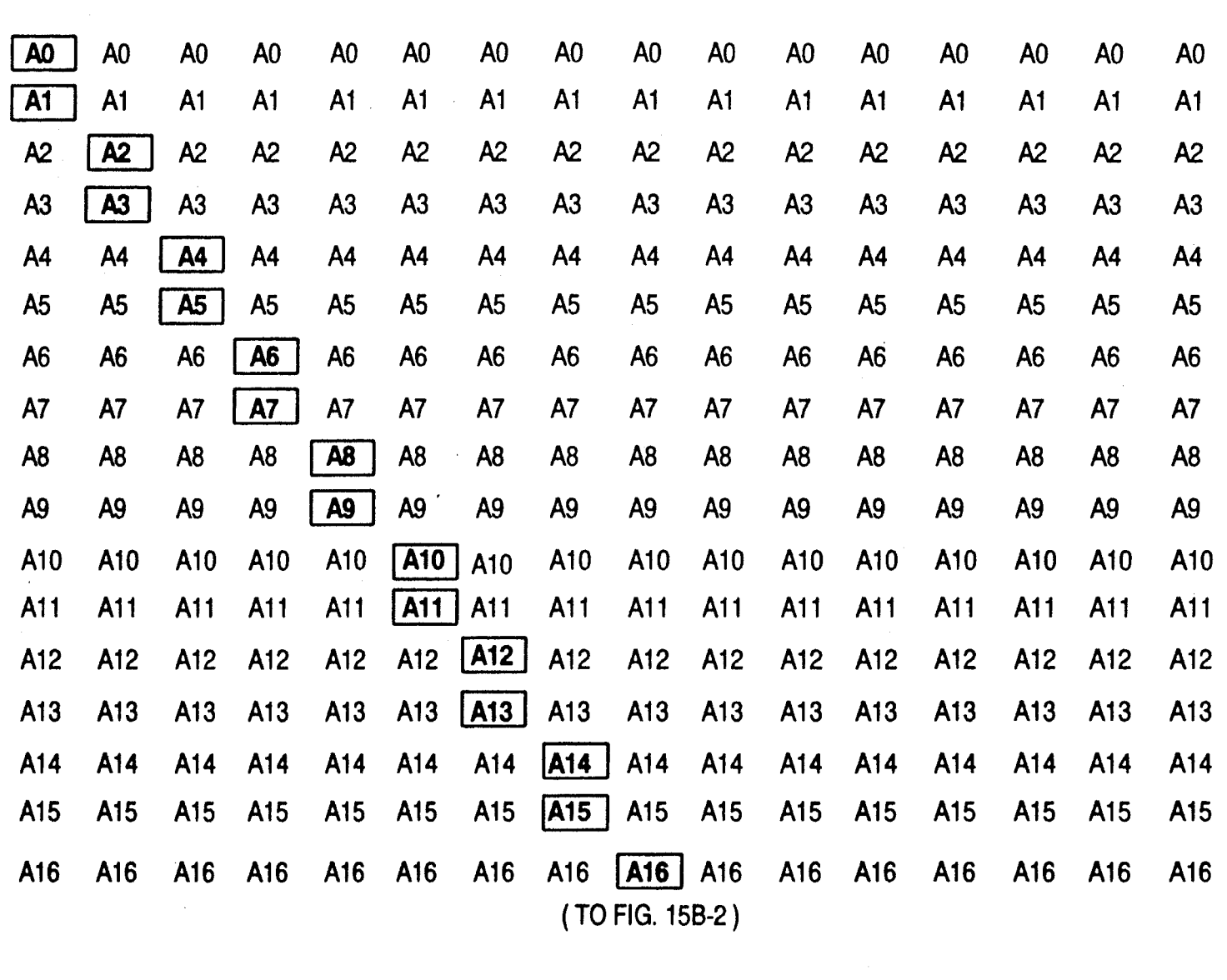
Figure 15B-2:
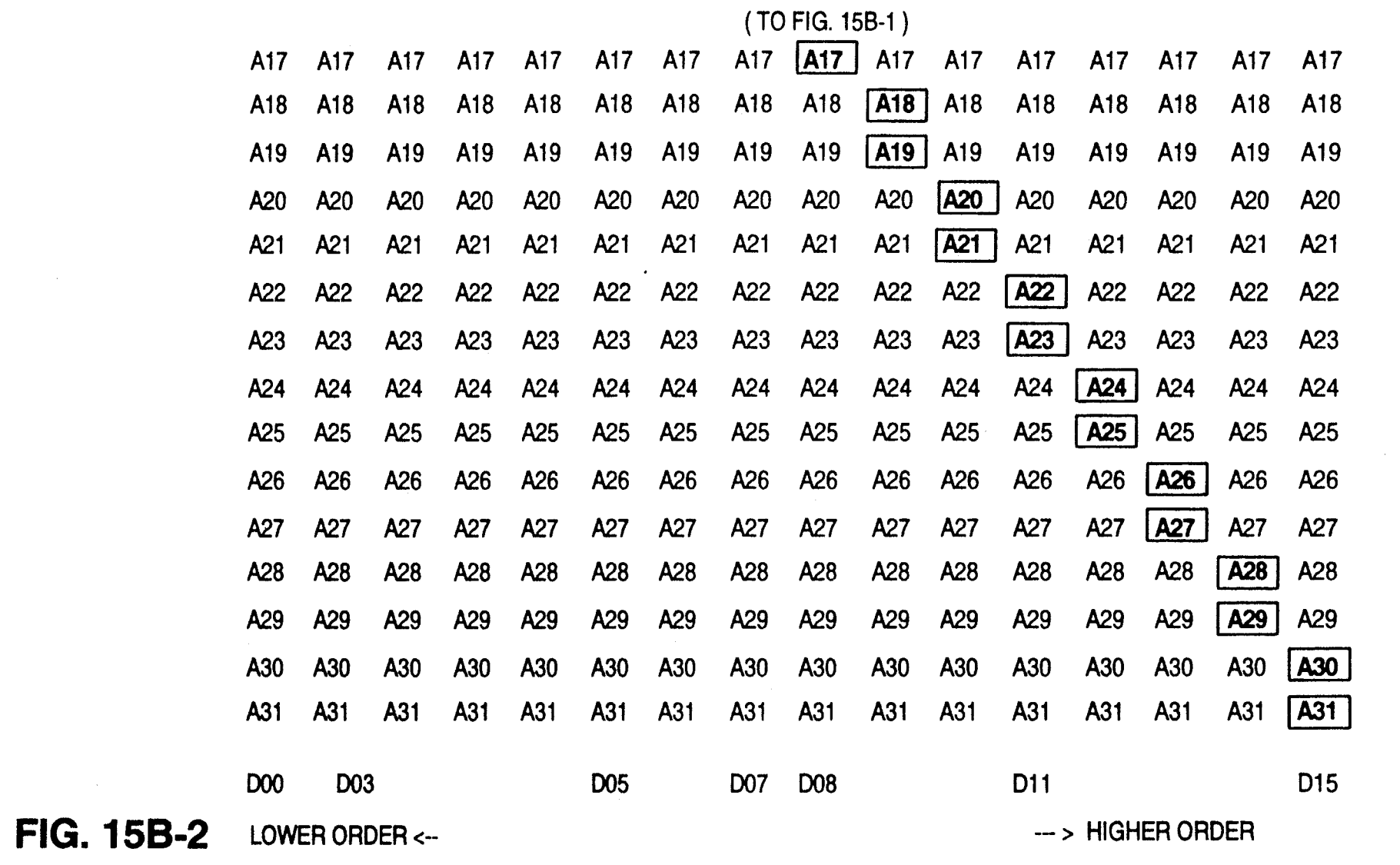

FIG. 35 illustrates the optical primitive sequence for the XOR function. FIGS. 15A and 15B illustrate the control matrix for formation of the XOR combinatorial functionals (FIG. 15A) and for the formation of the XOR combinatorial summations (FIG. 15B). The XOR combinatorial functionals are formed in 8 bit XOR slices. The XOR combinatorial summations are formed in 16 bit slices. As can be seen from FIG. 35, six cycles through the optics are involved. This will be referred to hereinafter as "detector OR" or "det OR" logic.

Figure 16A:
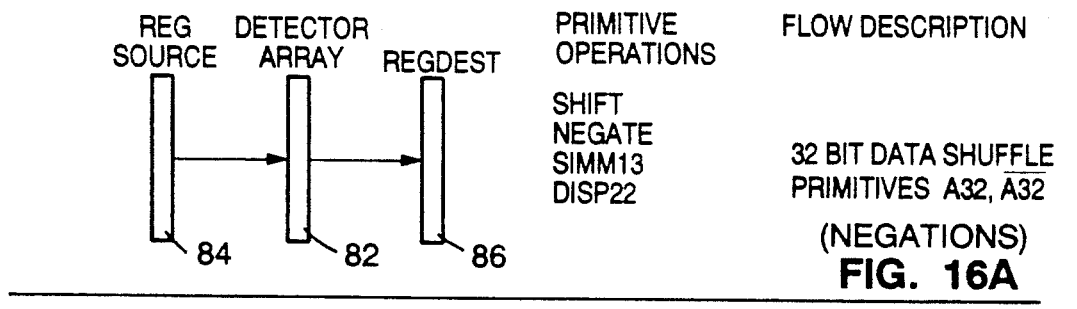
FIGS. 16A, 16B, and 16C provide examples of the primitive sequences and data flow for the primitives for a number of logical functions.
Figure 16B:
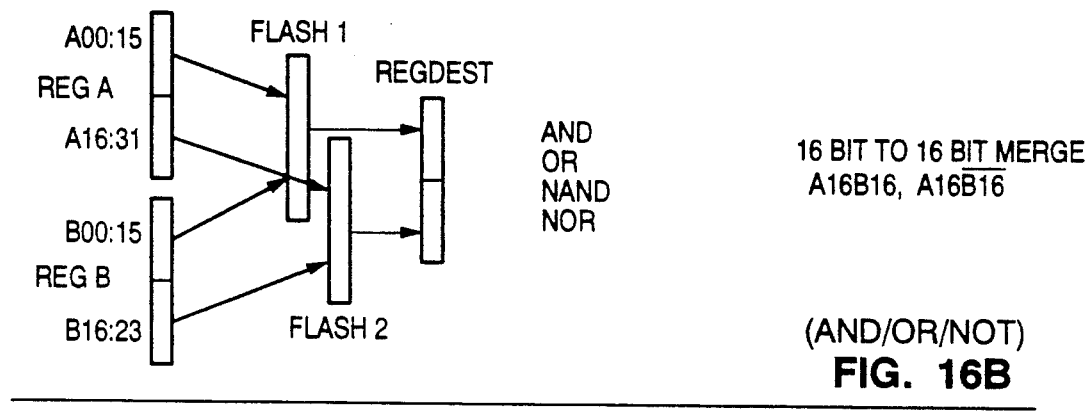
Figure 16C:
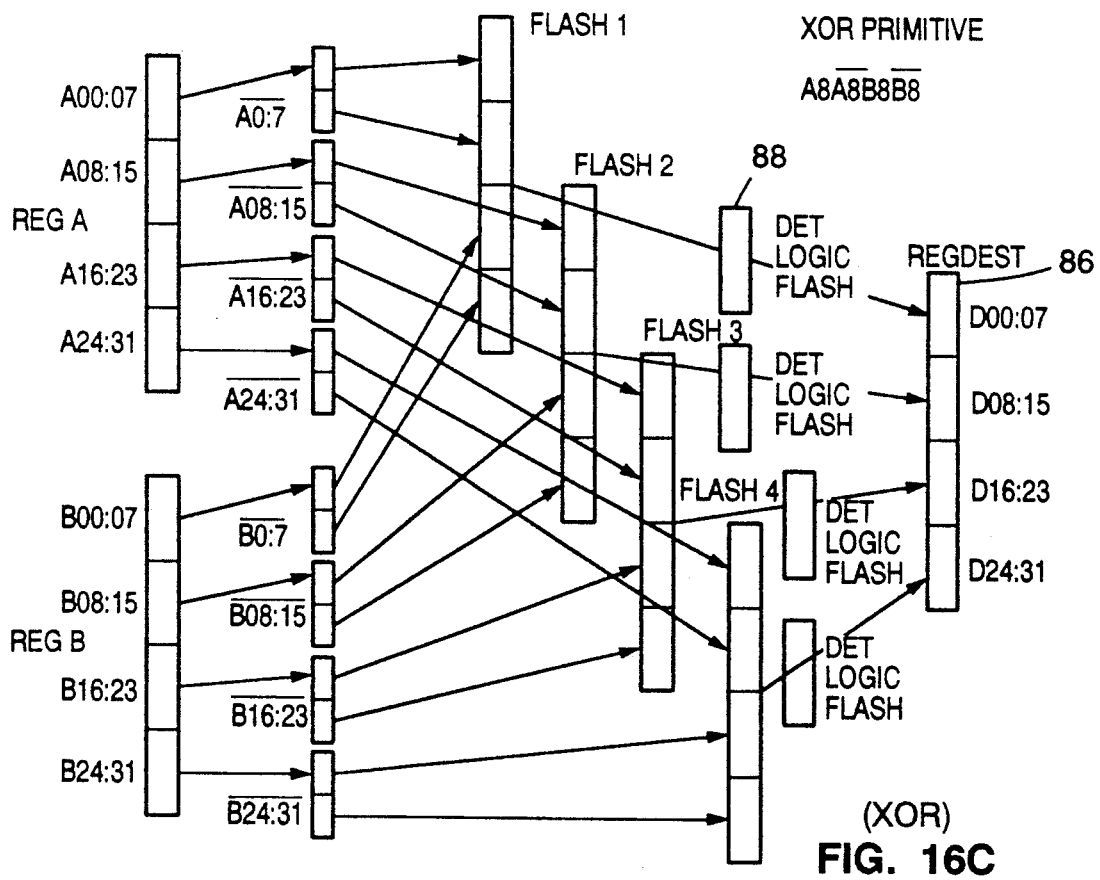

FIGS. 16A-C graphically depict the primitive sequences and data flow required for the Negation, AND/OR/NOR, and XOR type primitives. FIG. 16A depicts a single pass primitive like negation which requires no other manipulation. In this primitive data flows from the source register 84 through the optics to the detector array 82 and thence to the destination register 86.

FIG. 16B depicts the 16 bit merge operations like AND, OR, NAND which do several 16 bit slices of the input arguments to produce the outputs. Thus, the first 16 bits from register A and from register B are operated upon in flash 1 and stored in the first 16 bit positions of destination register 86. In flash 2, the second 16 bits from register A and from register B are operated upon using the control matrix and stored in the second 16 bit positions of destination register 86.

FIG. 16C depicts the XOR primitive which also requires a detector OR logic pass to combine multiple minterms (combinatorial functionals) for each output bit. Thus, in this primitive, four groups of 8 bits apiece are taken from each of register A and register B and inverted. The first group of 8 bits from register A and register B, inverted and not inverted, are operated upon in flash 1 using the XOR control mask of FIG. 15A. The resulting combinatorial functionals are then formed into combinatorial summations in a detector OR logic flash 88. The result is stored in the first 8 bit positions in destination register 86. The flash (combinatorial functional) and detector flash (combinatorial summation) sequences are repeated for the remaining three 8 bit groups.

ARITHMETIC OPERATIONS

ADD

For the logical equations for Boolean arithmetic expressed below, the following terminology is used:
$S_n$ = Sum value for bit n
$C_{n-1}$ = Carry in for bit n
$C_n$ = carry out value for bit n.
This terminology allows the expansion of the logical equations for a flash calculation of any number of bits of carry lookahead for an ADD operation as shown in equation 15.

$$S_n = C_{n-1} \oplus A_n \oplus B_n \quad [15]$$
$$= C_{n-1} \cdot (A_n \cdot B_n + \overline{A_n \cdot B_n}) +$$
$$\overline{C_{n-1}} \cdot (A_n \cdot \overline{B_n} + \overline{A_n} \cdot B_n)$$

$$C_n = A_n \cdot B_n + [A_n + B_n] \cdot C_{n-1}$$

$$C_n = A_n \cdot B_n + [A_n + B_n] \cdot [A_{n-1} \cdot B_{n-1}] +$$
$$[A_n + B_n] \cdot [A_{n-1} + B_{n-1}] \cdot C_{n-2}$$

Two functions which simplify the interpretation of the carry calculation equations are defined in equation 16.

Carry Generate: $C_{gn} = [A_n \cdot B_n]$

Carry Propagate: $C_{pn} = [A_n + B_n]$ \quad [16]

With carry generate and carry propagate, the carry calculation equations can easily be expanded for a larger number of terms. The frame of reference is also changed to a fixed low order Carry In as is commonly used for digital logic.

$$C_n = A_n \cdot B_n + [A_n + B_n] \cdot C_{n-1} \quad [17]$$

$$C_n = A_n \cdot B_n + [A_n + B_n] \cdot [A_{n-1} \cdot B_{n-1}] +$$
$$[A_n + B_n] \cdot [A_{n-1} + B_{n-1}] \cdot C_{n-2}$$

$$C_2 = C_{g2} + C_{p2} \cdot C_{g1} + C_{p2} \cdot C_{p1} \cdot C_{g0} + C_{p2} \cdot C_{p1} \cdot C_{p0} \cdot C_{in}$$

$$C_3 = C_{g3} + C_{p3} \cdot C_{g2} + C_{p3} \cdot C_{p2} \cdot C_{g1} + C_{p3} \cdot C_{p2} \cdot C_{p1} \cdot C_{g0} +$$
$$C_{p3} \cdot C_{p2} \cdot C_{p1} \cdot C_{p0} \cdot C_{in}$$

$$C_4 = C_{g4} + C_{p4} \cdot C_{g3} + C_{p4} \cdot C_{p3} \cdot C_{g2} + C_{p4} \cdot C_{p3} \cdot C_{p2} \cdot C_{g1} +$$
$$C_{p4} \cdot C_{p3} \cdot C_{p2} \cdot C_{p1} \cdot C_{g0} + C_{p4} \cdot C_{p3} \cdot C_{p2} \cdot C_{p1} \cdot C_{p0} \cdot C_{in}$$

$$C_5 = C_{g5} + C_{p5} \cdot C_{g4} + C_{p5} \cdot C_{p4} \cdot C_{g3} + C_{p5} \cdot C_{p4} \cdot C_{p3} \cdot C_{g2} +$$
$$C_{p5} \cdot C_{p4} \cdot C_{p3} \cdot C_{p2} \cdot C_{g1} + C_{p5} \cdot C_{p4} \cdot C_{p3} \cdot C_{p2} \cdot C_{p1} \cdot C_{g0} + C_{p5} \cdot$$
$$C_{p4} \cdot C_{p3} \cdot C_{p2} \cdot C_{p1} \cdot C_{p0} \cdot C_{in}$$

In summary the logical equations for the carry at a given position can be written as the logical OR of the conditions that the carry is generated at that position or propagated without interruption from any of the previous positions. This is illustrated in equation 18.

$$C_n = C_{gn} + \sum_{k=0}^{n-1} \left[ \prod_{l=n}^{l=k+1} C_{pl} \right] C_{gk} \quad [\text{Eq. 18}]$$

Thus there are $w+1$ mini-terms for a w bit wide Addition Carry lookahead if Carry propagate is available or $j[2(w+1)]-1$ terms if only An and Bn are available without the carry propagate function.

TABLE 7

| Output Func. | # terms (using $O_n = A_n + B_n$) for each Cout | (w*(w+3))/2 cummulative | # terms (w/o using $O_n$) $(2^{(w+1)} - 1)$ | Cumulative $2^{(w+2)} - (n+4)$ |
|---|---|---|---|---|
| C00 | 2 | 2 | 3 | 3 |
| C01 | 3 | 5 | 7 | 10 |
| C02 | 4 | 9 | 15 | 25 |
| C03 | 5 | 14 | 31 | 56 |
| C04 | 6 | 20 | 63 | 119 |
| C05 | 7 | 27 | 127 | 246 |
| C06 | 8 | 35 | 255 | 501 |
| C07 | 9 | 44 | 511 | 1012 |
| C08 | 10 | 54 | 1023 | 2035 |
| C09 | 11 | 65 | 2047 | 4082 |
| C10 | 12 | 77 | 4095 | 8177 |
| C11 | 13 | 90 | 8191 | 16368 |
| C12 | 14 | 104 | 16383 | 32751 |
| C13 | 15 | 119 | 32767 | 65518 |
| C14 | 16 | 135 | 65535 | 131053 |
| C15 | 17 | 152 | 131071 | 262123 |
| C31 | 33 | 560 | 8E9 | 16E9 |

The carry lookahead calculation requires only the high true input vectors A[w], B[w], O[w] and $C_{in}$ for 3*width+1 input lines. The Sum output calculation requires $A[w]$, $\overline{A}[w]$, $B[w]$, $\overline{B}[w]$, $C[w-1]$, $\overline{C}[w-1]$, $C_{in}$ and $\overline{C}_{in}$ for 6*width input lines. Thus twice the width of carry lookahead can be computed as Sum outputs for a given number of input channels. There is an additional tradeoff involving the number of SLM or detector channels to allocate for an optical primitive. With only 128 detector channels, an 8 bit carry lookahead slice is optimal at 44 detector channels, as opposed to 152 detector channels with a 16 bit primitive.

A 16 bit $((1+2)+(4+2)_{det\ or}+1_{carry\ prop})=10$ flash adder is possible that will require only $152+32$ columns by 49 inputs. An 8 bit Sum output calculation is also possible with 49 inputs. This width would allow a 32 bit add in $((2+4)+(8+4)_{det\ or}+2)=20$ cycles.

A 32 bit $((2+2)+(4+2)_{det\ or}+1)=11$ flash adder requires 97 input channels and $152+64$ mask columns. This requires a 10 dB enhancement in signal to noise over the embodiment being described, as well as increased (but still feasible) SLM capacity. Integrated detector amplifier arrays would also improve feasibility when several hundred detector channels are considered.

Currently the on/off ratio of the SLM and other signal to noise ratio constraints limit the present embodiment of the invention to about 50 inputs. Thus, an 8 bit flash primitive is implemented with 49 input channels. These equations can be mapped onto the optical PLA implementation by first doing the lookahead carry operation and then doing the half adds to get the sum result. The carry propagate factors are calculated first as $O_n = A_n + B_n$. Without carry propagate as a precursor the number of terms increases exponentially with primitive width.

A direct bit slice addition could be done in a single flash utilizing dual rail inputs but the number of terms (SLM columns) increases very rapidly. Without carry propagate the direct expansion requires $4*w+2$ input channels and $4*[2^{(w-2)}-w-4]$ terms or columns, or 224 terms for a 4 bit add. Thus, the problem is better attacked sequentially. With carry propagate available this is reduced to $6*w+1$ inputs and $2*w2+3*w$ terms, or 44 terms or columns for a 4 bit add slice with carry in and carry out. If detector OR logic and data latencies are factored in, the tradeoff tends towards more sequential logic for a 32 bit add. Note that in digital logic this sequential implementation with multiple logic stages hides under the name "ripple through" or multi-stage logic. The single logic level optical approach of the present invention accomplishes the equivalent by looping the detector outputs back to the input vector for another pass.

Figure 17A-1:
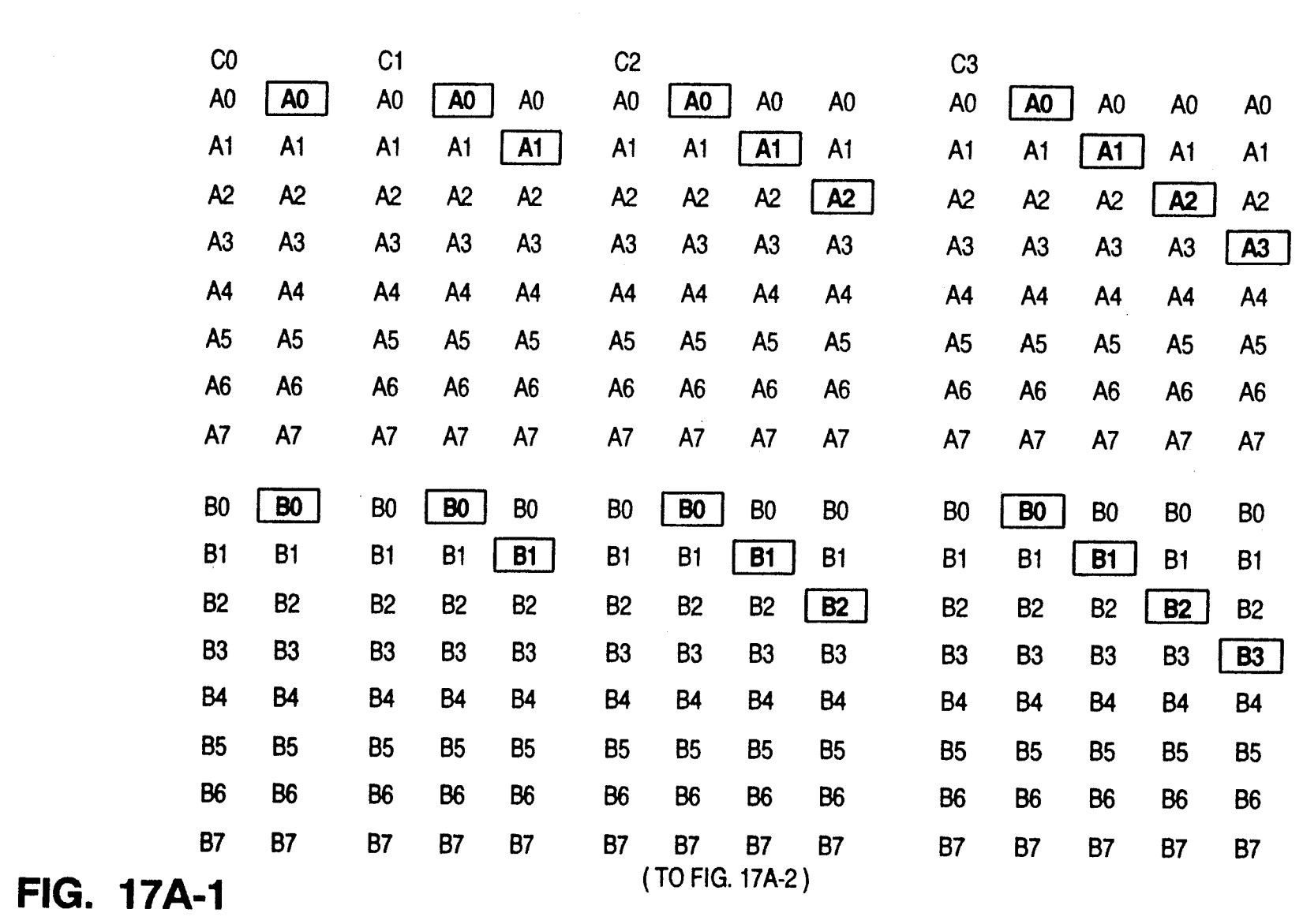
Figure 17A-2:
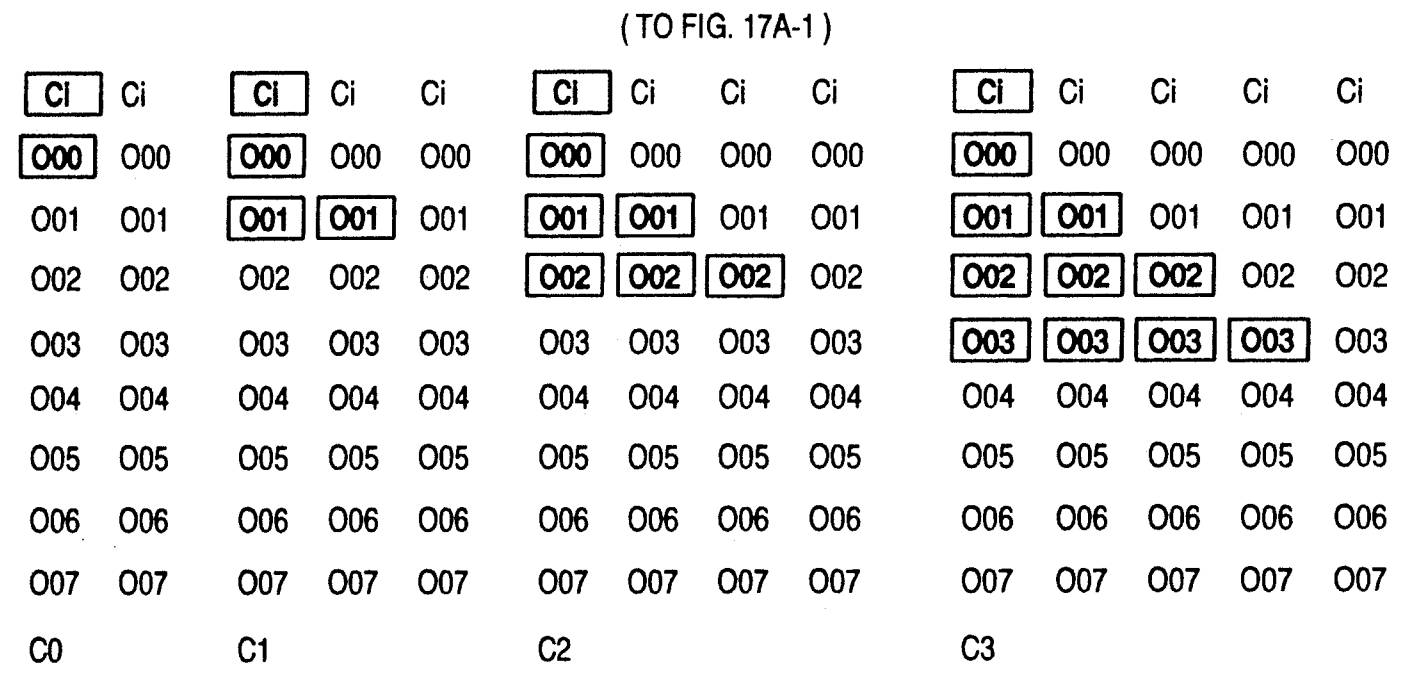
Figures 1, 17B:
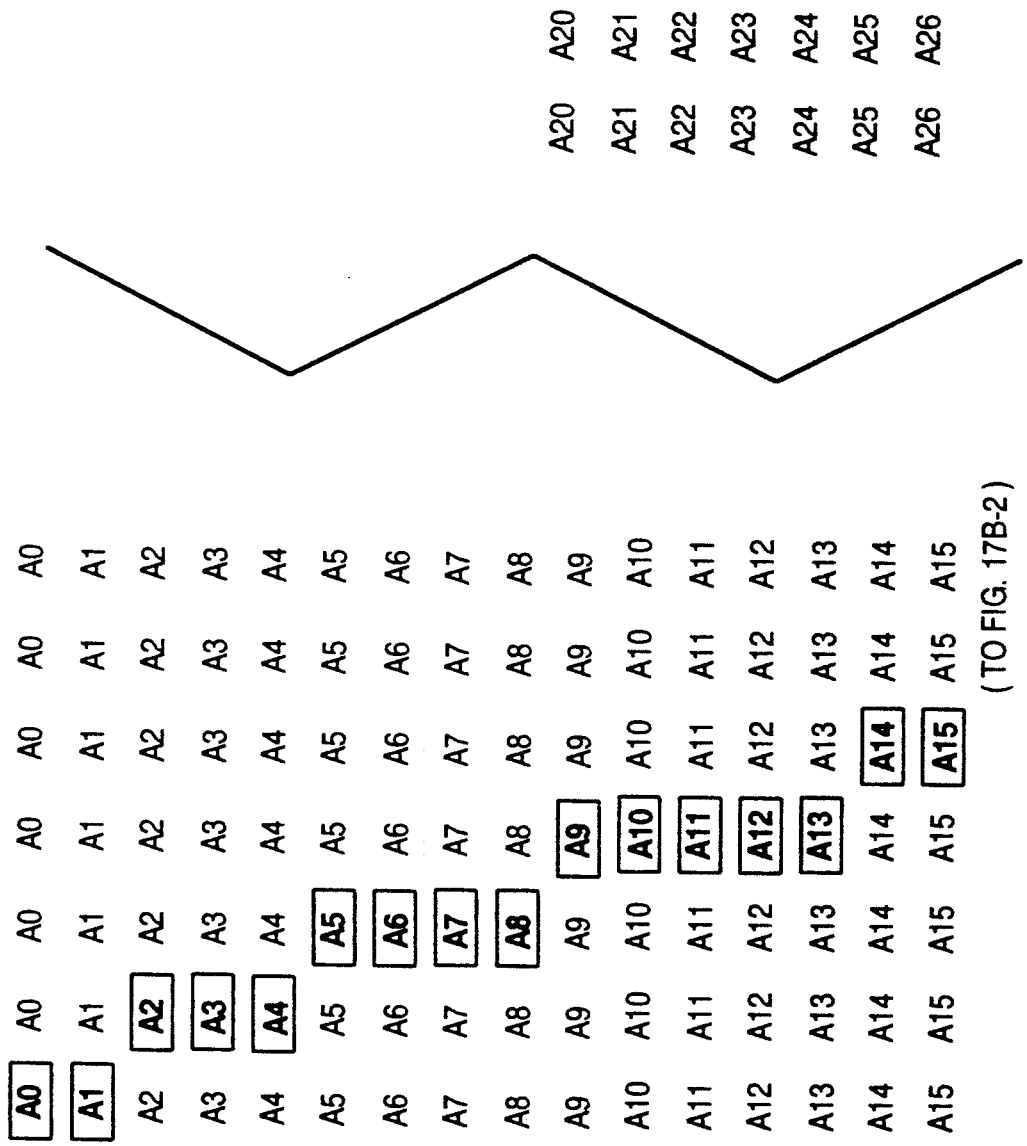

Addition is done by breaking up the 32 bit addends into four 8 bit long segments. A carry-in input is provided for multiple precision arithmetic and for doing a quick increment, as well as for ease of target emulation. FIG. 17A below depicts a 4 bit carry lookahead SLM control operator matrix 76. Note that the upper third of the matrix selects bits from the register A segment, the middle third selects bits from the register B segment, and the lower third of the matrix selects bits from the carry in and propagate register segment. FIG. 17B shows the required detector OR SLM control operator matrix logic for an 8 bit carry lookahead.

This methodology can be extended to 3 or more simultaneous addends as in partial product addition in multiplication. However, multiple precision carry information must be generated and the multi input exclusive "ORs" for w inputs require $2w$ terms for each output bit.

Figure 18A-1:
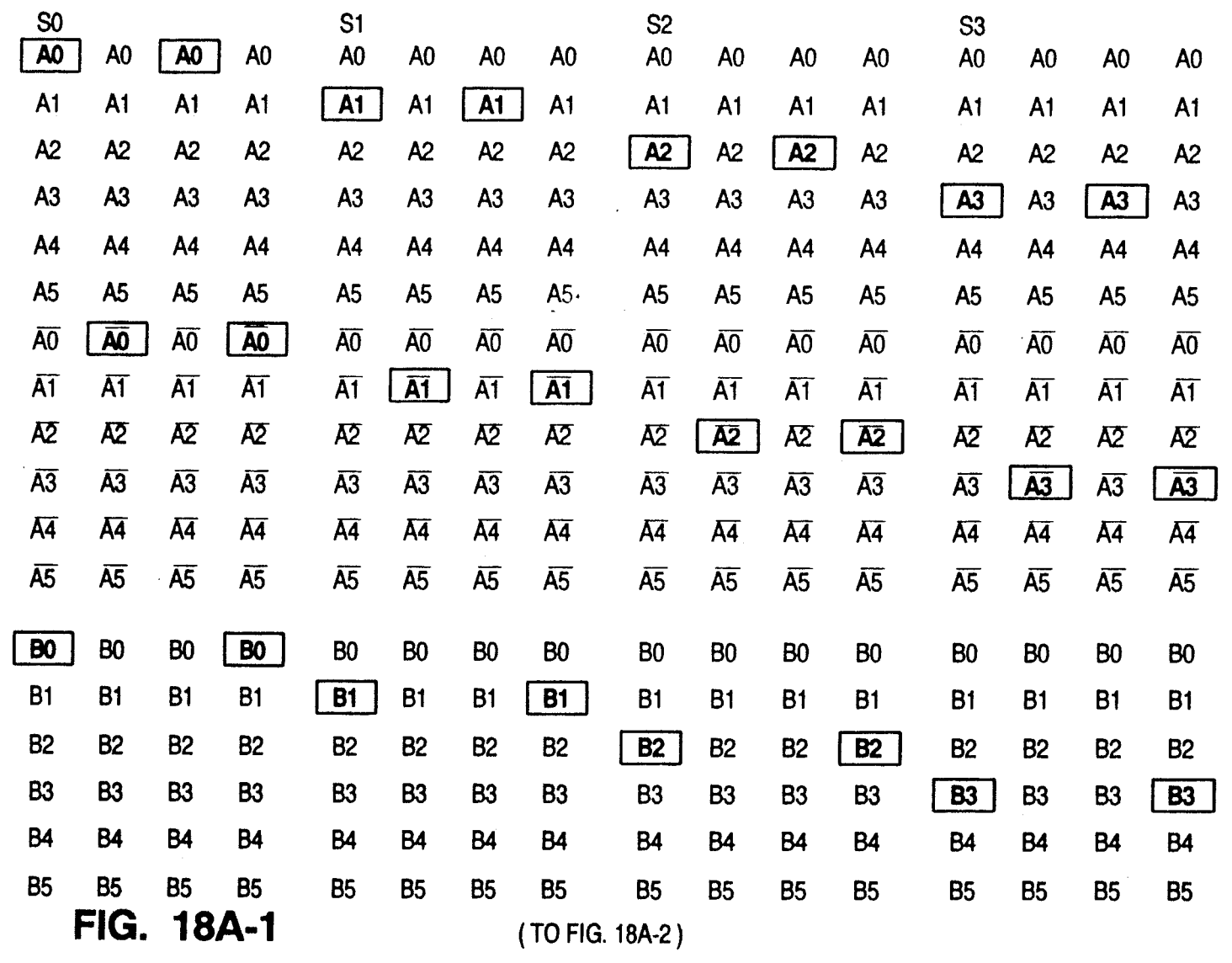
Figure 18A-2:
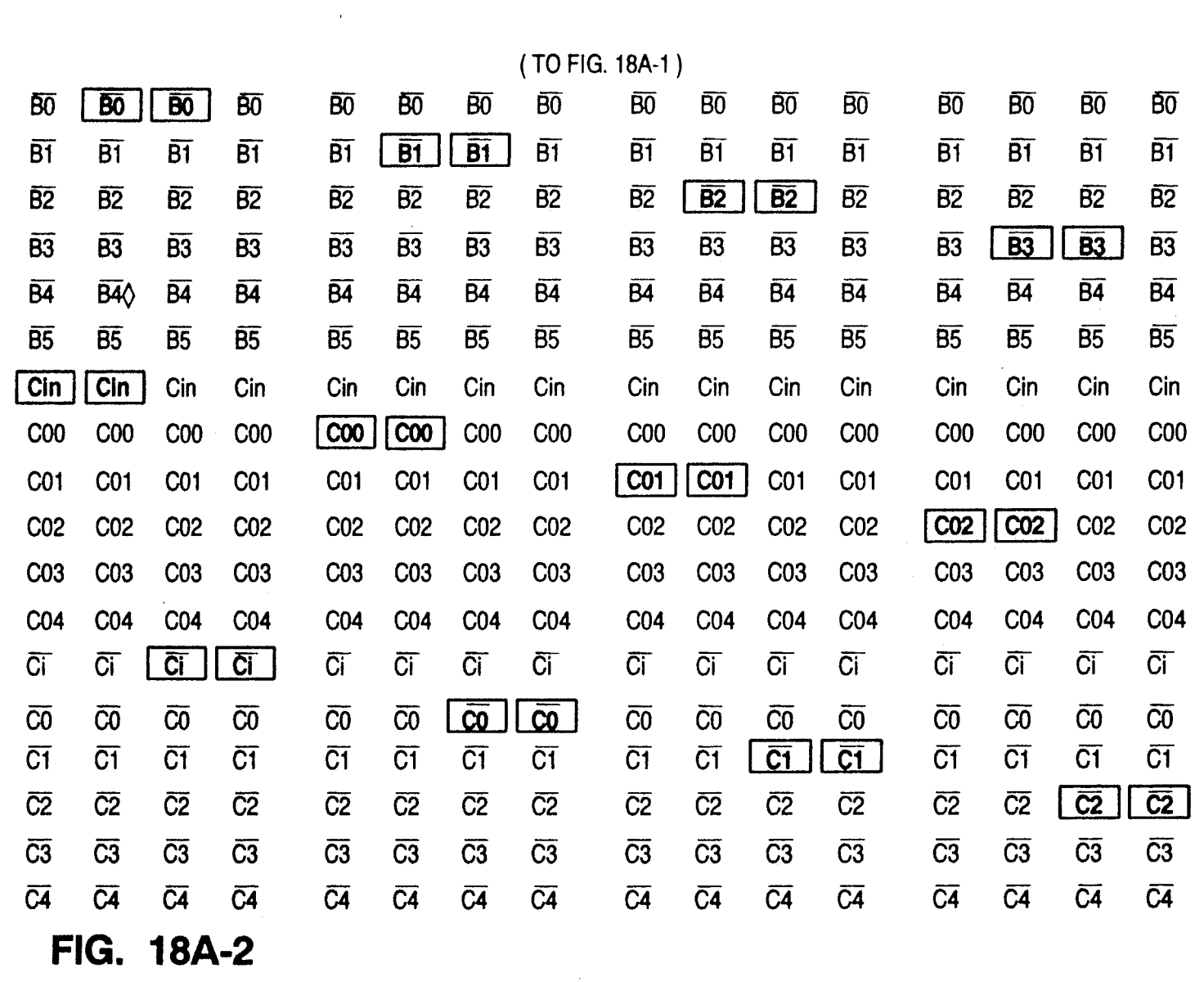
Figure 18B-1:
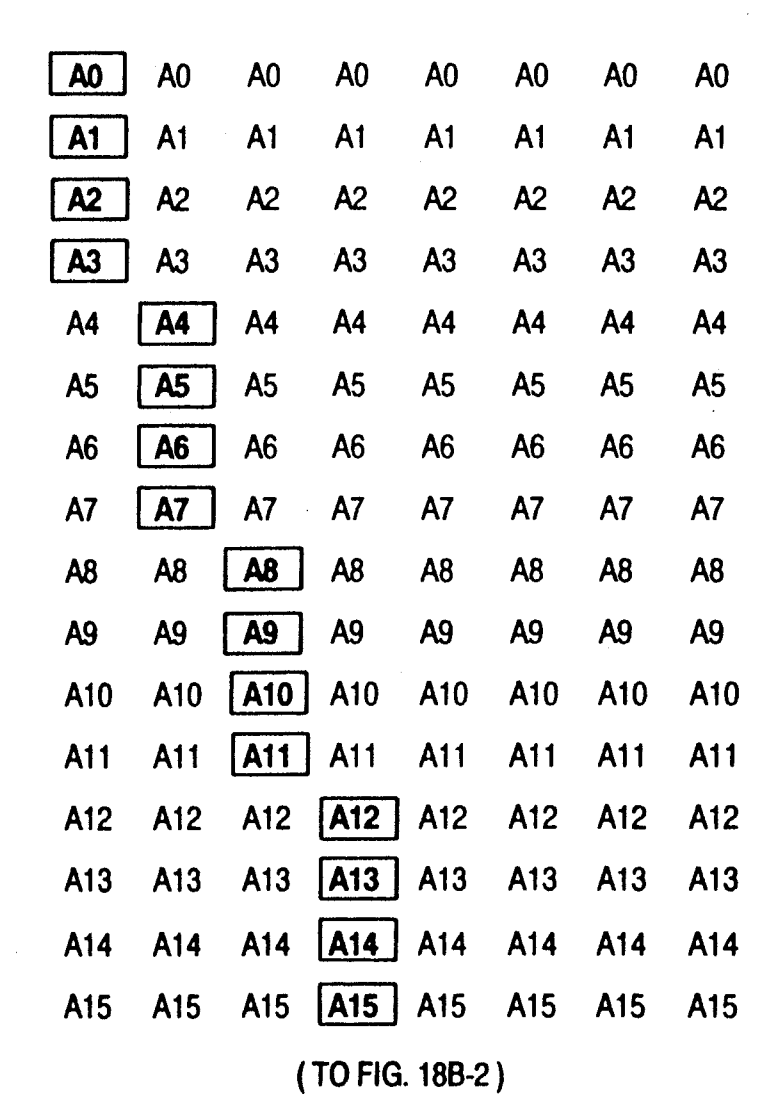
Figure 18B-2:
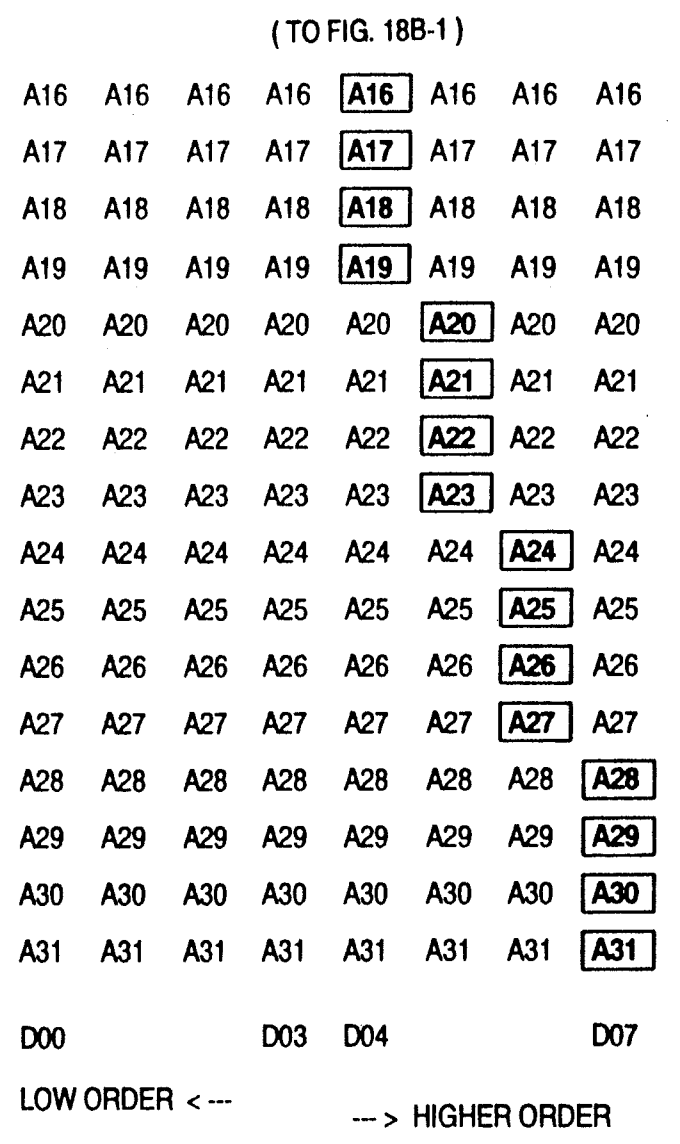

The 44 outputs from the 8 bit add carry calculation (14 are shown to illustrate a 4 bit slice) are then fed back around and combined in the detector OR logic SLM to provide the actual carry lookahead outputs as shown in FIG. 17B above. These outputs are routed back as dual rail inputs to a third level of calculation to generate the ADD-SUM miniterms as shown in FIG. 18A. The add-sum miniterms are then combined in the addsum detector OR logic SLM to generate the actual sum output bits as shown in FIG. 18B.

PROCESSING STEPS FOR 32 BIT ADD USING A 8 BIT PRIMITIVE

Figure 19A:
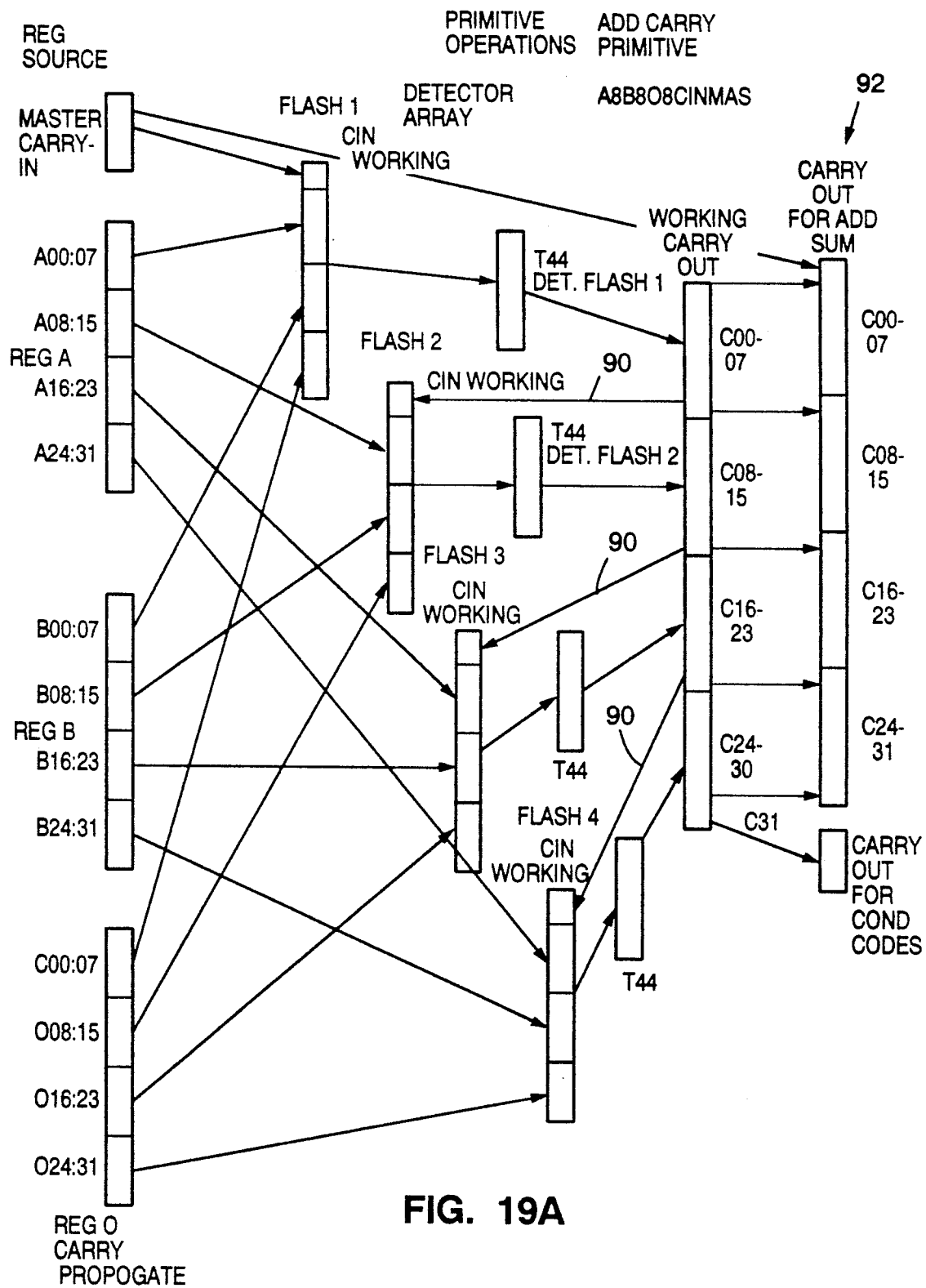
FIGS. 19A and 19B provide examples of the primitive sequences and data flow for the primitives for the ADD-CARRY Lookahead primitive and the ADD-SUM primitive, respectively.
Figure 19B:
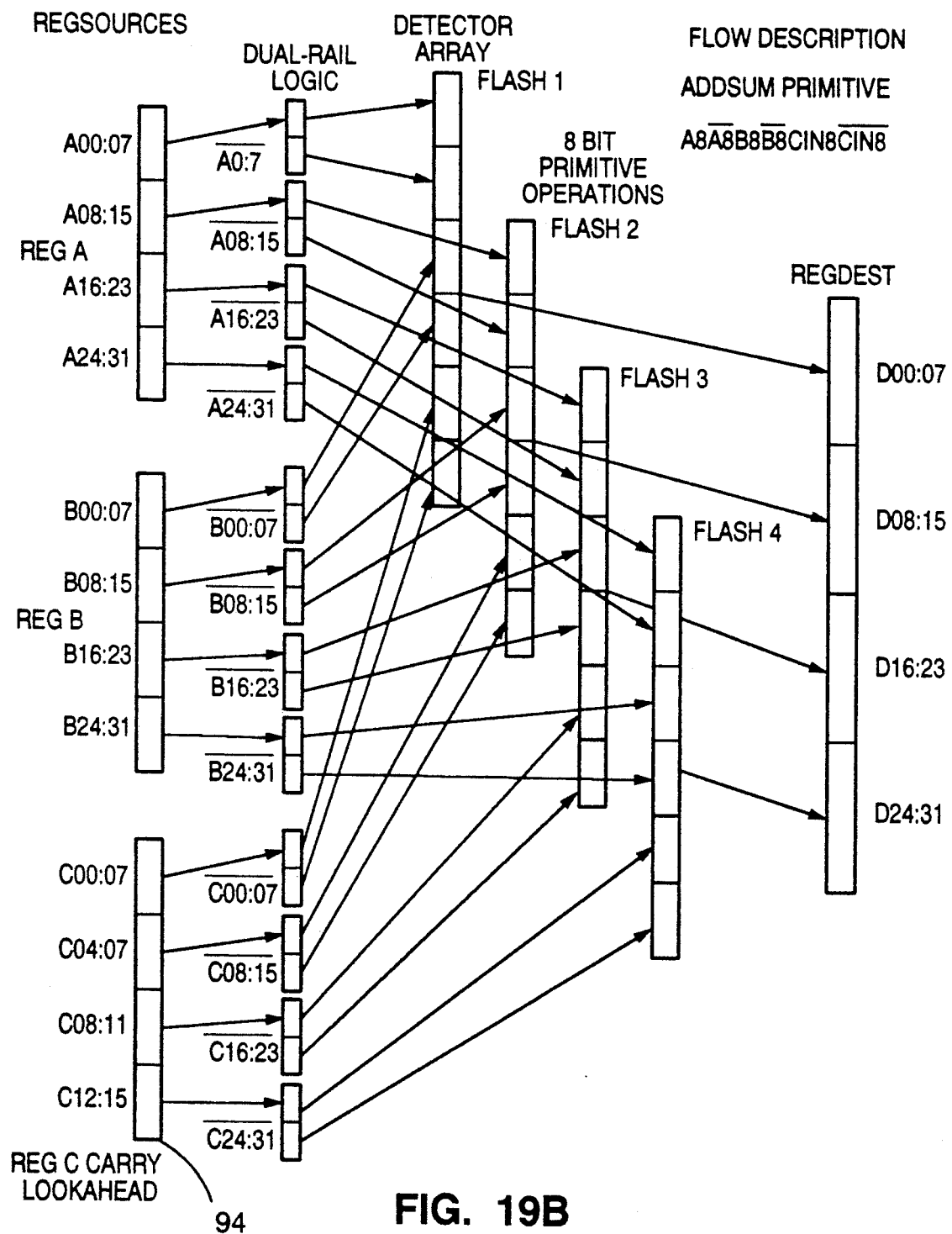

The following 32 bit addition sequence is worked out assuming a 49 channel SLM where the OR-ing of multiple terms in an expression is carried out in an additional pass through the detector OR logic in the optical hardware. The time requirements could be reduced from 18 clocks to 9 clocks if this operation was pipelined instead of iterated. The primitive flow sequence for calculating a 32 bit add using 8 bit primitives is depicted graphically in FIG. 19A. Here the feedback requirement 90 of the carryout from each previous slice can be seen. On the left in FIG. 19A, the sequential carry lookahead 92 is calculated in 8 bit slices then this is input in dual rail form at 94 in FIG. 19B for the add sum calculation.

Figures 2, 17B:
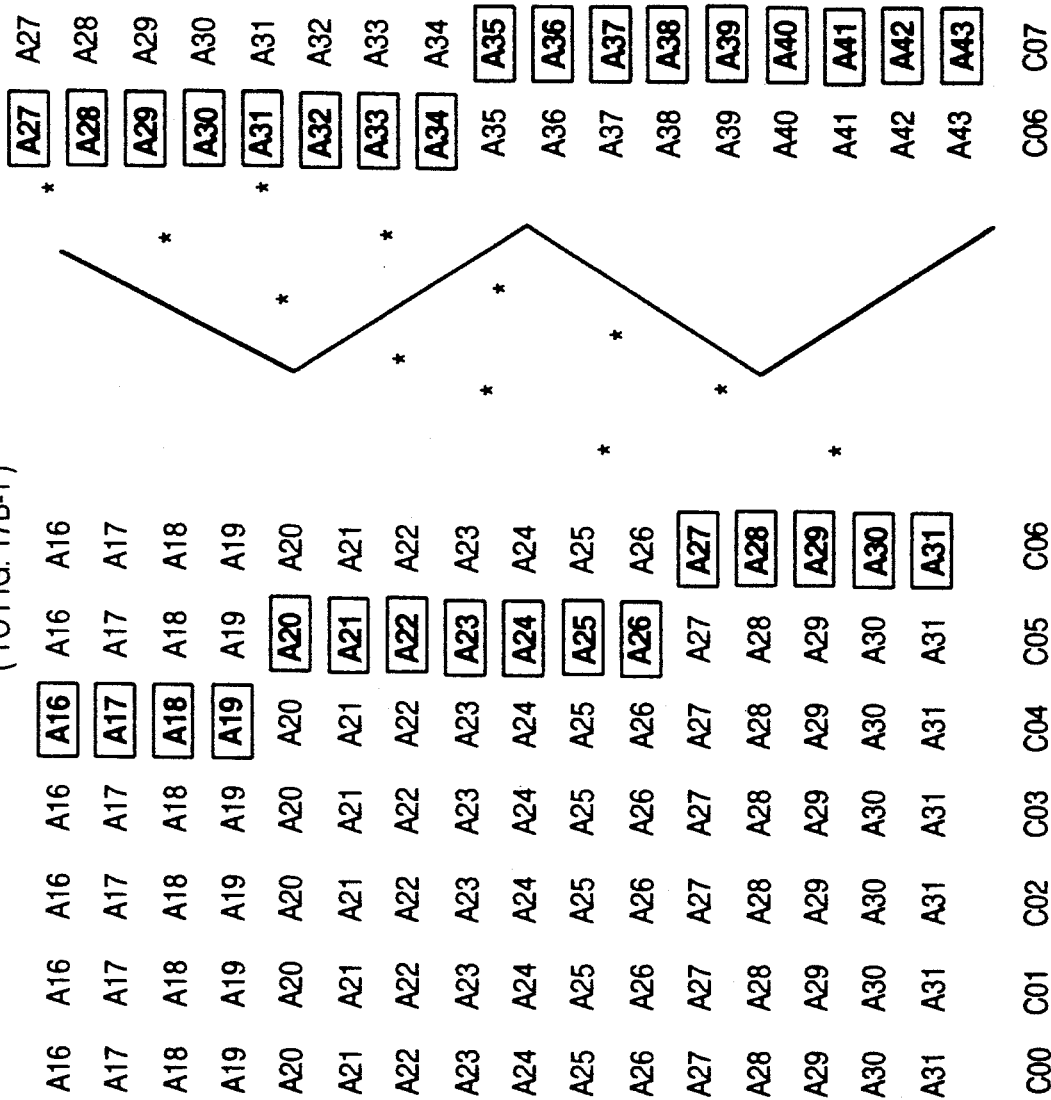

The add sequence using an 8 bit ADD carry and an 8 bit add sum primitive is elaborated below. The following is presented in logical order without regard pipeline delay state. See FIGS. 17 and 18 above for illustrative SLM masks used as primitives in the sequence below.

1) Calculate low order carry propagate values by computing $O_n = A_n$ OR $B_n$
   Input signals: 32 inputs used. $A_{00}$–$A_{15}$, $B_{00}$–$B_{15}$
   Outputs: $O_{00}$–$O_{15} = A_n$ OR $B_n$ for $n = 00$–$15$ 2) Compute high order carry propagate ($A_n$ OR $B_n$)
   Inputs: $A_{16}$–$A_{31}$, $B_{16}$–$B_{31}$
   Outputs: $O_{16}$–$O_{31} = A_n$ OR $B_n$ for $n = 16$–$31$
   Note that the 32 bit OR operation requires no multi-term detector OR logic pass 3) Compute $C_{00}$–$C_{07}$ (carry look ahead term calculation)
   Inputs: $A_{00}$–$A_{07}$, $B_{00}$–$B_{07}$, $O_{00}$–$O_{07}$, $C_{in}$
   Outputs: $D_{00}$–$D_{44}$ 4) D Compute $C_{00}$–$C_{07}$ (carry look ahead detector OR pass)
   Inputs: $D_{00}$–$D_{44}$
   Outputs: $C_{00}$–$C_{07}$ 5) D Compute low 8 bits of 32 bit sum (use add $S_{00}$–$S_{07}$ mask, FIG. 18A)
   Inputs: $A_{00}$–$A_{07}$, $\overline{A}_{00}$–$\overline{A}_{07}$ (16)
   $B_{00}$–$B_{07}$, $\overline{B}_{00}$–$\overline{B}_{07}$ (16)
   $C_{00}$–$C_{06}$, $\overline{C}_{00}$–$\overline{C}_{06}$, $C_{in}$, $\overline{C}_{in}$ (16)
   Outputs: $D_{00}$–$D_{32}$ 6) D Compute sum output detector pass (groups of 4 terms ORed together, FIG. 18B)
   Inputs: $D_{00}$–$D_{32}$
   Outputs: $S_{00}$–$S_{07}$ 7) Compute $C_{08}$–$C_{15}$ carry look ahead term calculation
   Inputs: $A_{08}$–$A_{15}$, $B_{08}$–$B_{15}$, $O_{00}$–$O_{07}$, $C_{in}=C_{07}$ (25 inputs)
   Outputs: $D_{00}$–$D_{44}$ 8) D Compute $C_{08}$–$C_{15}$ carry look ahead detector OR pass
   Inputs: $D_{00}$–$D_{44}$
   Outputs: $C_{08}$–$C_{15}$ 9) D Compute second 8 bits of 32 bit sum (use add $S_{00}$–$S_{07}$ mask, FIG. 18A)
   Inputs: $A_{08}$–$A_{15}$, $\overline{A}_{08}$–$\overline{A}_{15}$ (16)
   $B_{08}$–$B_{15}$, $\overline{B}_{08}$–$\overline{B}_{15}$ (16)
   $C_{08}$–$C_{14}$, $\overline{C}_{08}$–$\overline{C}_{14}$, $C_{07}$, $\overline{C}_{07}$ (16)
   Outputs: $D_{00}$–$D_{32}$ 10) D  Compute sum output detector OR pass (groups of 4 terms ORed together. FIG. 18B)
       Inputs:  $D_{00}-D_{32}$
       Outputs: $S_{08}-S_{15}$
11)    Compute $C_{16}-C_{23}$ carry look ahead term calculation
       Inputs:  $A_{15}-A_{23}$, $B_{16}-B_{23}$, $O_{16}-O_{23}$, $C_{in}=C15$
       Outputs: $D_{00}-D_{44}$
12) D  Compute $C_{16}-C_{23}$ carry look ahead detector OR pass
       Inputs:  $D_{00}-D_{44}$
       Outputs: $C_{16}-C_{23}$
13) D  Compute third byte of 32 bit sum (use add $S_{00}-S_{07}$ mask)
       Inputs:  $A_{16}-A_{23}$, $\overline{A_{16}-A_{23}}$ (16)
                $B_{16}-B_{23}$, $\overline{B_{16}-B_{23}}$ (16)
                $C_{16}-C_{23}$, $\overline{C_{16}-C_{23}}$, $C_{in}$, $\overline{C_{in}}$ ($C_{15}$) (16)
       Outputs: $D_{00}-S_{32}$
14) D  Compute sum output detector OR pass (groups of 4 terms ORed together)
       Inputs:  $D_{00}-D_{32}$
       Outputs: $S_{16}-S_{23}$
15)    Compute $C_{24}-C_{31}$ carry look ahead term calculation
       Inputs:  $A_{24}-A_{31}$, $B_{24}-B_{31}$, $O_{24}-O_{31}$, $C_{in}=C_{23}$ (25 inputs)
       Outputs: $D_{00}-D_{44}$
16) D  Compute $C_{24}-C_{31}$ carry look ahead detector OR pass
       Inputs:  $D_{00}-D_{44}$
       Outputs: $C_{24}-C_{31}$
17) D  Compute high 8 bits of 32 bit sum (use add $S_{00}-S_{07}$ mask)
       Inputs:  $A_{24}-A_{31}$, $\overline{A_{24}-A_{31}}$ (16)
                $B_{24}-B_{31}$, $\overline{B_{24}-B_{31}}$ (16)
                $C_{24}-C_{31}$, $\overline{C_{24}-C_{31}}$, $C_{23}$, $\overline{C_{23}}$ (16)
       Outputs: $D_{00}-D_{32}$
18) D  Compute sum output detector OR pass (groups of 4 terms ORed together)
       Inputs:  $D_{00}-D_{32}$
       Outputs: $S_{24}-S_{31}$ Note that 8 of the 18 steps (4, 6, 8, 10, 12, 14, 16, 18) which do detector ORing could be done in a following optical stage. Also the Carry lookahead width is optimized for the 49 channel capacity of the SLM for detector ORing. The 16 bit lookahead (152 terms) would require 4 detector OR clocks if passed through the 49 channels of the SLM.

Note also that 12 additional data latency clocks are required for a total of 30 clocks assuming a one clock data latency. However, only three temporary data registers ($C_{32}$, $O_{32}$, $D_{44}$) and a one bit carry-in are required.

Processing Steps For 32 Bit Add Using A 8 Bit Primitive Optimized For A One Clock Pipeline Delay Before Data Reuse The following 32 bit addition sequence is optimized for a 49 channel SLM where calculated detector data can be accessed after a one clock delay.

1)      Load SLM with OR primitive (16 clocks - 16 Columns)
1) (1)  Calculate low order carry propagate values by computing $O_n = A_n$ OR $B_n$
        Input signals: 32 inputs used. $A_{00}-A_{15}$, $B_{00}-B_{15}$
        Outputs: $O_{00}-O_{15}$
               = $A_n$ OR $B_n$ for n = 00-15
2)      Load SLM with Carry lookahead primitive (44 clocks - 61 cols.)
2) (2+) Compute $C_{00}-C_{07}$ carry look ahead term calculation
        Inputs:  $A_{00}-A_{07}$, $B_{00}-B_{07}$, $O_{00}-O_{07}$, $C_{in}$
        Outputs: $T_{00}-T_{44}$
3) (d)  Load SLM with carry lookahead det. OR prim (8 clocks - 71 cols)
3) (3+) Compute $C_{00}-C_{07}$ carry look ahead detector OR pass
        Inputs:  $T_{00}-T_{44}$
        Outputs: $C_{00}-C_{07}$
4) (4+) Compute high order carry propagate ( $A_n$ OR $B_n$)
        Inputs:  $A_{16}-A_{31}$, $B_{16}-B_{31}$
        Outputs: $O_{16}-O_{31}$ = $A_n$ OR $B_n$ for n = 16-31
Note that the 32 bit OR operation requires no multi-term detector logic OR pass
5) (5+) Compute $C_{08}-C_{15}$ carry look ahead term calculation
        Inputs:  $A_{08}-A_{15}$, $B_{08}-B_{08}$, $O_{00}-O_{07}$, $C_{in}=C_{07}$ (25 inputs)
        Outputs: $T_{00}-T_{44}$
6)      Load Add Sum SLM primitive ( 32 clocks - 106 cols)
6) (8)  Compute low 8 bits of 32 bit sum (use add $S_{00}-S_{07}$ mask)
        Inputs:  $A_{00}-A_{07}$, $\overline{A_{00}-A_{07}}$ (16)
                 $B_{00}-B_{07}$, $\overline{B_{00}-B_{07}}$ (16)
                 $C_{00}-C_{06}$, $\overline{C_{00}-C_{06}}$, $C_{in}$, $\overline{C_{in}}$ (16)
        Outputs: $D_{00}-D_{32}$
7)      Load add Sum Det. OR primitive (8 clocks - 115 cols)
7)      Compute $C_{08}-C_{15}$ carry look ahead detector OR pass
        Inputs:  $T_{00}-T_{44}$
        Outputs: $C_{08}-C_{15}$
8)      Compute sum output detector pass (groups of 4 terms ORed together)
        Inputs:  $D_{00}-D_{32}$
        Outputs: $S_{00}-S_{07}$
9)      Compute $C_{16}-C_{23}$ carry look ahead term calculation
        Inputs:  $A_{15}-A_{23}$, $B_{16}-B_{23}$, $O_{16}-O_{23}$, $C_{in}=C_{15}$
        Outputs: $T_{00}-T_{44}$
10)     Compute second 8 bits of 32 bit sum (use add $S_{00}-S_{07}$ mask)
        Inputs:  $A_{08}-A_{15}$, $\overline{A_{08}-A_{15}}$ (16)
                 $B_{08}-B_{15}$, $\overline{B_{08}-B_{15}}$ (16)
                 $C_{08}-C_{14}$, $\overline{C_{08}-C_{14}}$, $C_{07}$, $\overline{C_{07}}$ (16)
        Outputs: $D_{00}-D_{32}$
11)     Compute $C_{16}-C_{23}$ carry look ahead detector OR pass
        Inputs:  $T_{00}-T_{44}$
        Outputs: $C_{16}-C_{23}$
12      Compute sum output detector OR pass (groups of 4 terms ORed together)
        Inputs:  $D_{00}-D_{32}$
        Outputs: $S_{08}-S_{15}$
13)     (15) Compute $C_{24}-C_{31}$ carry look ahead term calculation
        Inputs:  $A_{24}-A_{31}$, $B_{24}-B_{31}$, $O_{24}-O_{31}$, $C_{in}=C_{23}$ (25 inputs)
        Outputs: $T_{00}-T_{44}$
14)     (16) Compute third byte of 32 bit sum (use add $S_{00}-S_{07}$ mask)
        Inputs:  $A_{16}-A_{23}$, $\overline{A_{16}-A_{23}}$ (16)
                 $B_{16}-B_{23}$, $\overline{B_{16}-B_{23}}$ (16)
                 $C_{16}-C_{23}$, $\overline{C_{16}-C_{23}}$, $C_{in}$, $\overline{C_{in}}$ ($C_{15}$) (16)
        Outputs: $D_{00}-D_{32}$
15)     (17) Compute $C_{24}-C_{31}$ carry look ahead detector OR pass
        Inputs:  $T_{00}-T_{44}$
        Outputs: $C_{24}-C_{31}$
16)     (18) Compute sum output detector OR pass (groups of 4 terms ORed together)
        Inputs:  $D_{00}-D_{32}$
        Outputs: $S_{16}-S_{23}$
17)     (19) Compute high 8 bits of 32 bit sum (use add $S_{00}-S_{07}$ mask)
        Inputs   $A_{24}-A_{31}$, $\overline{A_{24}-A_{31}}$ (16)
                 $B_{24}-B_{31}$, $\overline{B_{24}-B_{31}}$ (16)
                 $C_{24}-C_{31}$, $\overline{C_{24}-C_{31}}$, $C_{23}$, $\overline{C_{23}}$ (16)
        Outputs: $D_{00}-D_{32}$
Note that there is no optical operation to put here so a clock cycle must be wasted for the previous data to be accessible.
18 D    (21) Compute sum output detector OR pass (groups of 4 terms ORed together)
        Inputs:  $D_{00}-D_{32}$
        Outputs: $S_{24}-S_{31}$ Note that 8 of the 18 steps (4, 6, 8, 10, 12, 14, 16, 18) which do detector ORing could be done in a following pipelined optical stage. Also the 8 bit Carry lookahead width of 44 is optimized for the 49 channel capacity of the SLM for detector ORing. The 16 bit lookahead (152 terms) would require 4 detector OR clocks if passed through the 49 channels of the SLM as well as totally flushing the cache for the SLM of SLM primitives.

The time required for loading of the control matrix into the control operator Bragg cell or spacial light modulator is large compared to the actual computation time. This overhead could be reduced slightly by overlapping the SLM primitive load with calculations using previously loaded SLM primitives. If this overlap is to occur across multiple SPARC primitives the hardware should either recirculate a given primitive for re-use or keep track of those primitives still totally within the usable portion of the SLM.

SUBTRACT

Subtraction can either be implemented directly or by adding the 2's complement of the subtrahend.

Direct Implementation

In the direct implementation the logical equations are expanded as they were for addition. Fortunately very strong parallels exist so that the same logic can be used for both addition and subtraction.

The difference bit, $D_n$, is defined as: $Dn = An - Sn$; the borrow bit for the next stage is defined as $B_n$; and $Bn-1$ is defined as the borrow from the current stage. The equation 20 for the difference out bit Dn is given below.

$$D_n = B_{n-1} \cdot [A_n \cdot S_n + \overline{A_n \cdot S_n}] + \overline{B_{n-1}} \cdot [A_n \cdot \overline{S_n} + \overline{A_n} \cdot S_n] \quad \text{[Eq. 20]}$$

Note that this is identical to the add equation for Sn [15] so that the same mask and inputs can be used. The equation 21 for the borrow bit from the next stage is given below.

$$B_n = \overline{B_{n-1}} \cdot [\overline{A_n} \cdot S_n] + B_{n-1} \cdot [\overline{A_n} + S_n] \quad \text{[Eq. 21]}$$

This can be rewritten as below which is identical to the add equation for Carry [17A] except for complementing the $A_n$.

$$C_0 = C_{g0} + C_{p0} \cdot C_{in} = [A_0 \cdot B_0] + [A_0 + B_0] \cdot C_{in}$$

$$\begin{aligned} C_1 &= C_{g1} + C_{p1} + C_{g0} + C_{p1} \cdot C_{p0} \cdot C_{in} \\ &= [A_1 \cdot B_1] + [A_1 + B_1] \cdot [A_0 \cdot B_0] + \\ &\quad [A_1 + B_1] \cdot [A_0 + B_0] \cdot C_{in} \end{aligned}$$

$$S_n = C_{n-1} \text{ xor } A_n \text{ xor } B_n = C_{n-1} \cdot (A_n \cdot B_n + \overline{A_n \cdot B_n}) +$$

$$\overline{C_{n-1}} \cdot (A_n \cdot \overline{B_n} + \overline{A_n} \cdot B_n)$$

Thus, the same SLM functions can be used for both the ADD and SUBTRACT operations by using one additional data selection primitive to complement the Minuend before the borrow calculation.

MULTIPLY

Standard algorithms

A number of different but standard algorithms can be implemented in the present invention using the optical primitives of the present invention. The shift and add and the Booth algorithm are two such approaches.

Shift and add—This is the most straight forward algorithm. It requires n shift operations and typically n/2 to n add operations depending on the number of "1" bits in the multiplier. This can be optimized for when the multiplier is negative by negating both before and after multiplying.

The SPARC chip provides a 1 instruction shift and add primitive for use with this algorithm that is easily implemented by the optical primitives.

Booths algorithm—runs of two or more consecutive 1's in the multiplier are done in 2 operations: a high order bit add followed by a low order subtract. This requires a fast way of scanning a word for runs of more than 2 consecutive 1's and altering the control sequence depending on the data. The modified multiplier for a run of 1's is computed by subtracting one at the low end starting bit position then adding one at the bit position one bit to the left of the high end of the 1's. This requires fast conditional execution to be effective. Typically Booths algorithm speeds multiplication by a factor of two on positive multipliers and more on small negative multipliers.

Spatial Light Modulator Mask Size Requirements

In light of the above description, one can determine the size requirement for a spatial light modulator, or Bragg cell, for use in providing the operator control masks for the described primitives Each term (or functional) in t e logical expressions for the logical function requires a column in the Spatial Light Modulator and its associated detector ORing of the low true detector outputs is accomplished through another pass through the Optical System, taking up to the available number of channels worth of detectors in each pass. The numbers in Table 8 below give the number of SLM columns required for 32 channels (or for 49 channels with different segmentation). The number pairs in parenthesis refer first to the original AND term calculations and second to the detector OR calculation times the number of segments to calculate the 32 bit primitive.

TABLE 8

| Using 32 channels unless otherwise specified | # data bits/ iteration | columns or terms | 32 bit prim. interactions or flashes |
|---|---|---|---|
| AND - OR calculation | 16 | 16 | 2 |
| EXCLUSIVE OR | 8 | 32 | 4 |
| Exclusive OR detector OR | 16 | 32 | 2 |
| SHIFT RIGHT LOGICAL 1 | 16 or 32* | 16 or 32* | 2 or 1 |
| SHIFT RIGHT ARITHMETIC 1 | 16 or 32* | 16 or 32* | 2 or 1 |
| SHIFT LEFT 1 | 16 or 32* | 16 or 32* | 2 or 1 |
| SHIFT RIGHT LOGICAL 8 | 16 or 32 | 16 or 32 | |
| SHIFT RIGHT ARITHMETIC 8 | 16 or 32 | 16 or 32 | 1 |
| SHIFT LEFT 8 (same as shift right 8 low) | 16 or 32 | 1 | |

TABLE 8-continued

| Using 32 channels unless otherwise specified | # data bits/ iteration | columns or terms | 32 bit prim. interactions or flashes |
|---|---|---|---|
| ADD carry calculation (25 channels) | 8 bits | 44 cols | (1+2)*4=12 |
| ADD output calculation (24 channels) | 4 bits | 16 cols | (1+1)*8=16 |
| ADD carry calculation (37 channels) | 12 bits | 90 cols | (1+3)*3=12 |
| ADD output calculation (36 channels) | 6 bits | 24 cols | (1+1)*6=12 |
| ADD carry calculation (49 channels) | 12 bits | 90 cols | (1+2)*3=9 |
| ADD carry calculation (49 channels) | 16 bits | 152 cols | (1+4)*2=10 |
| ADD carry calculation (49 channels) | 8 bits * | 44 cols* | (1+1)*4=8 |
| ADD carry detector OR (32 channels) | 8 bits | 8 cols | |
| ADD output calculation (48 channels) | 8 bits * | 32 cols* | (1+1)*4=8 |
| ADD output detector OR (32 channels) | 8 bits | 32 cols* | |
| Emulation Operation Masks required for operand evaluation in optics | | | |
| DISP30 to byte offset (2 bit left shift) | 32 | 32 | 1 |
| SIMM13 to half word (19 bit sign ext.) | 32 | 32 | 1 |

The total Mask requirement for Logical Primitives is 252×49 and an associated 252 detectors. This could be mapped onto two (or three if desired) independent rows in a 128×128 SLM, or each primitive can be loaded when needed into the front end of a bragg cell at 8-10 nsec/column columns with a reduction to less than 128 in the number of required detectors.

The mask requirement for doing the complete emulation logic in Optics could be up to 370 columns using a static SLM depending on detector logic sophistication. When all the detector OR logic is done with optics by passing the detector outputs directly back into the light array for another pass the performance tradeoffs tend towards a square SLM.

The Bragg cell implementation is optimal with almost square primitives executed repetitively as opposed to wider SLM primitives executed less repetitively with more detector channels required.

OPTICAL HARDWARE

Figure 20:
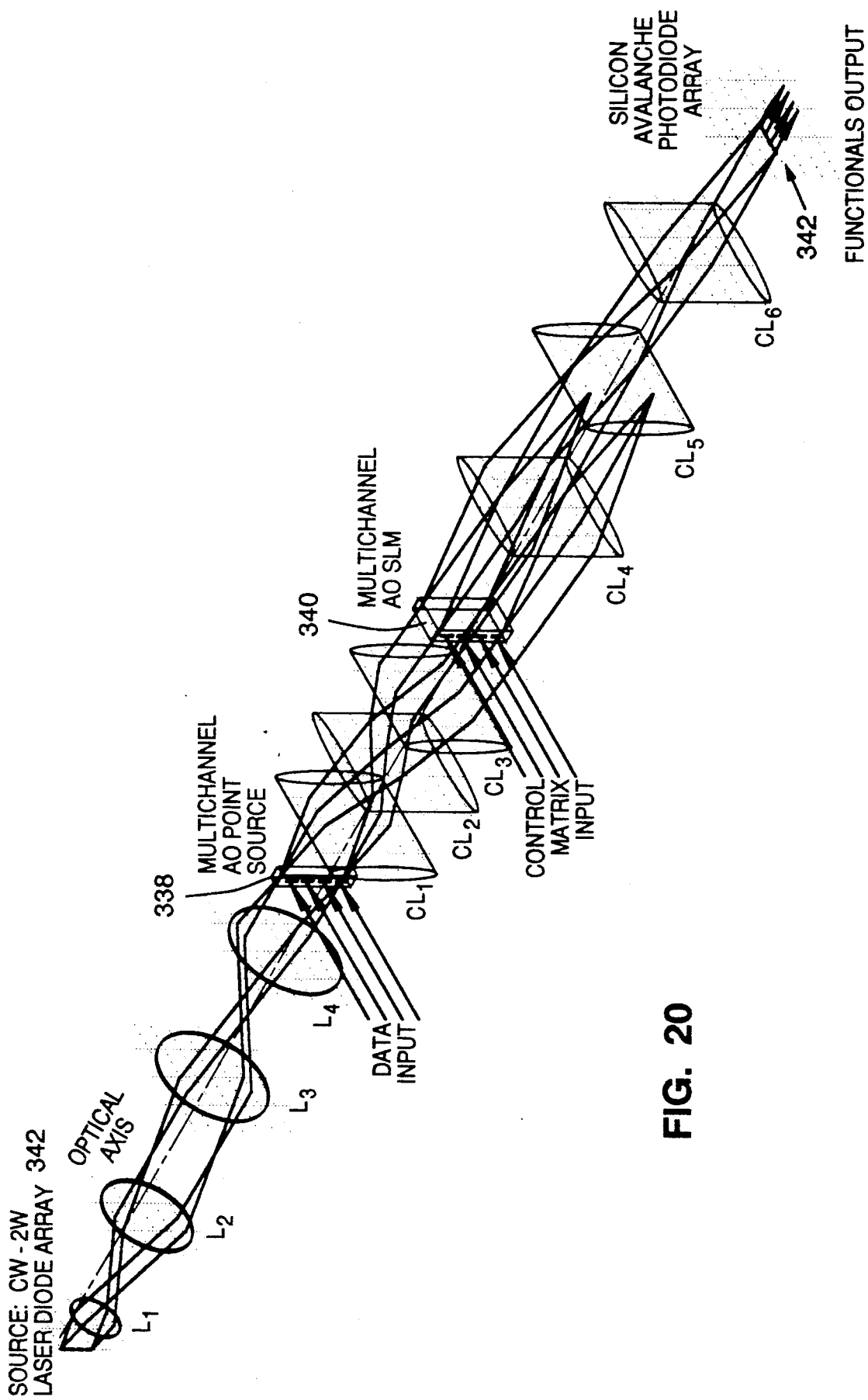
FIG. 20 is a perspective view of the optical section of the preferred embodiment of the present invention.

The preferred embodiment of the optical system used in the embodiments of the present invention described in detail hereinbelow will now be described in greater detail. Referring to FIG. 20, the optical system does an optical boolean vector matrix multiplication using two Bragg cells 338 and 340 where the first Bragg cell 338 provides a modulated linear data array which is imaged onto every column of the second Bragg cell 340. Each Column of the 2nd cell is focused onto its corresponding detector 342 formed from a linear detector array of 128 independent detectors. The number of detectors that can be used is limited only by the degradation of interchannel isolation with increasing depth in the control mask Bragg cell 340. One detector is used for each column in the control mask Bragg cell 340.

Figure 21:
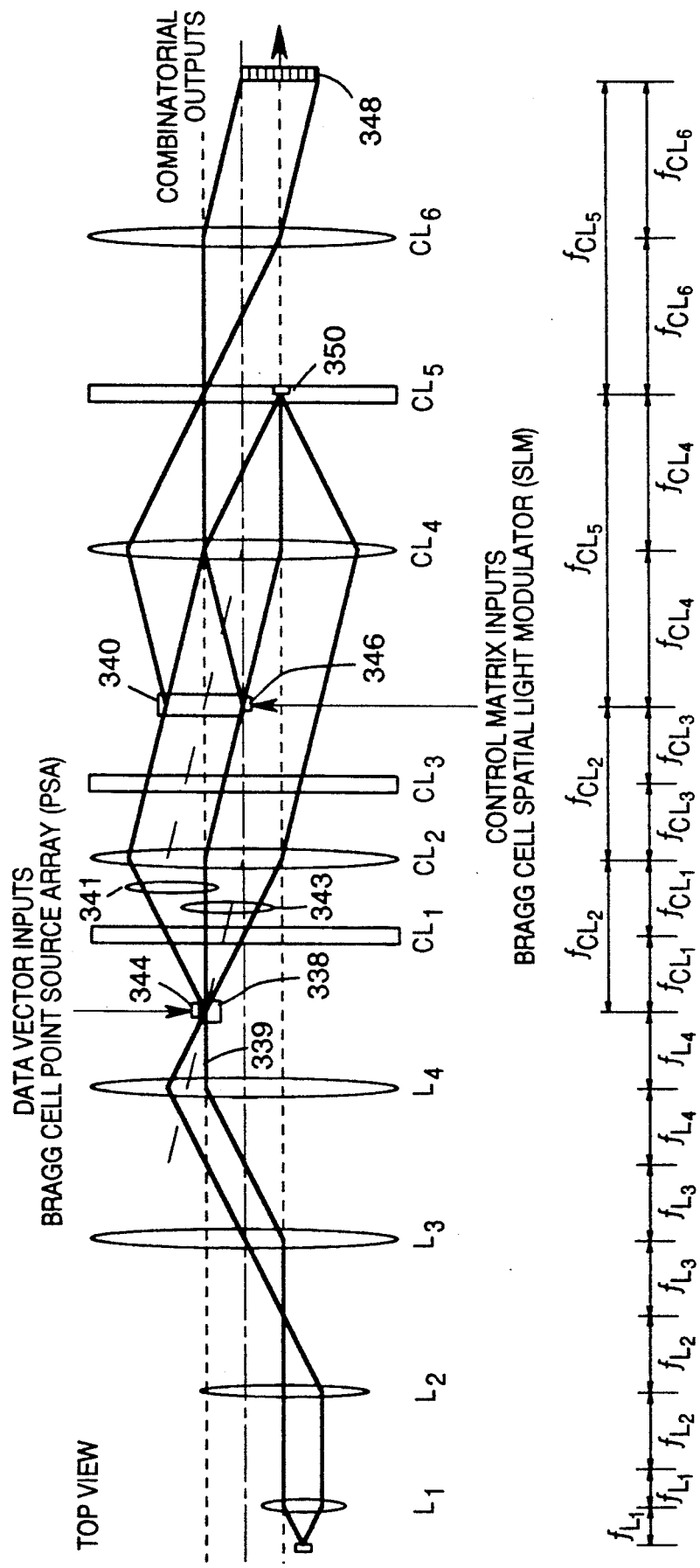
FIG. 21 is a top view of the optical section of the preferred embodiment of the present invention.
Figure 22:
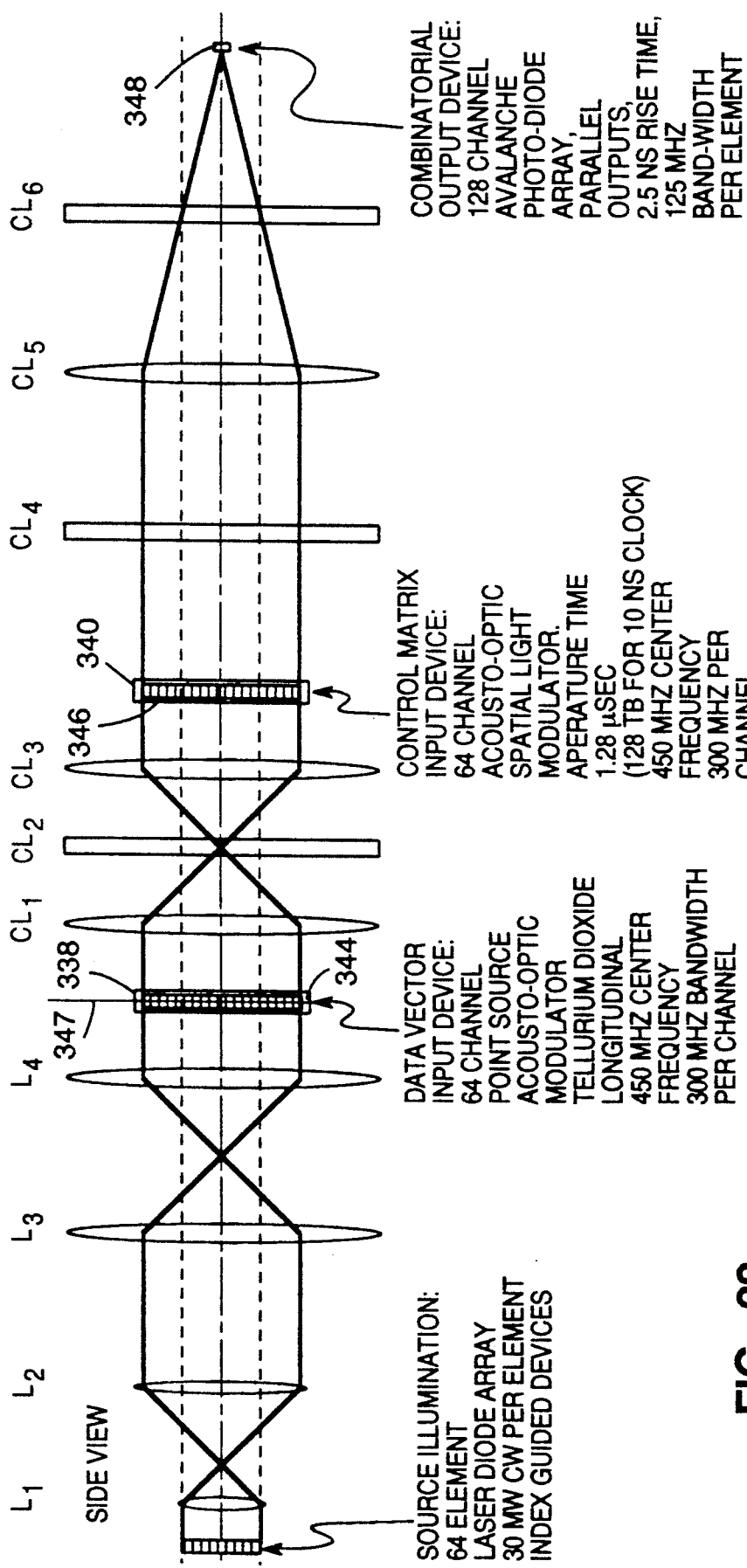
FIG. 22 is a side view of the optical section of the preferred embodiment of the present invention.

FIGS. 21 and 22 further depict the optical hardware configuration. Initially, the source laser diode array 342, formed from 64 laser diodes, is collected by spherical lens L1. As can be seen from FIGS. 21 and 22, the source array 342 is placed exactly one focal length away from lens L1. The stripe orientation of all 64 laser diodes is placed parallel to the diode stack. This is done primarily for two reasons: (1) the polarization of the output irradiance of the diodes is parallel to the stripe and therefore, when incident at the Bragg cells 338 and 342, the correct polarization is maintained parallel to the 001 axis of the spherical indicatrix in longitudinal mode TeO2, and (2) because the diode stripe aspect ration is in excess of 4:1, the immediate diffraction from the stripe in the dimension orthogonal to the stripe must be of angular excess with respect to the input angular bandwidth requirement at the first point source array (PSA) Bragg cell 338.

In the Side View, FIG. 22, spherical lenses L1, L2, L3, and L4 form two pairs of telecentric imaging systems. As shown this forms a perfect planar image (not spherical as in the case of a single lens imaging system) of the source array 342 onto the PSA Bragg cell 338. With a diode spacing of 1 mm and a transducer spacing of 1 mm and fL1=fL2=fL3=fL4, the light will be focused into the center of each acoustic channel such that no light passes outside the acoustic channel and thus subsequently made unusable. This also minimizes interchannel optical cross talk due to optical scattering from diverging ultrasonic waves. Diamond shaped apodized transducers are used on the transducer arrays 344 and 346 of the Bragg cells 338 and 340, and currently have a dimension of l=1.1 mm (along the optical axis) x h=0.3 mm (along the transducer stack dimension 347). Since the diode stripe length is on the order of 4 μm, the size of the spot in the Bragg cell is on the order of 4 μm. The 0.3 mm height of each transducer thus allows a 75:1 tolerance in alignment Along the Top View, FIG. 22, lenses L1, L2, L3, and L4 also represent two pairs of telecentric imaging systems, however, as can be seen lenses L1 and L2 are offset from the center optical axis of the system. The axis of Lens L2 is placed off axis at a distance equal to the off axis displacement of the PSA Bragg cell 338 required to maintain the center of the illumination wedge at the Bragg angle. The center of lens L1 must therefore be placed half again as far as the center of L2.

Alternately put, the center of lens L1 is displaced away from the optical axis at a distance equal to the intersection distance in the plane of L4 between the optical axis and the center of the Bragg angle wedge. This constrains the light wedge 339 incident on the first PSA Bragg cell 338 to be symmetrical about the Bragg angle. The angular extent of the inside plane of this illumination light wedge 349 is thus also constrained to be incident at less than the perpendicular to the PSA Bragg cell 338 in the Top View, FIG. 21. PSA Bragg cell 338 is placed at a distance fL4 behind lens L4, and at a distance fCL2 in front of lens CL2, and at an off axis distance equal to the focal length of CL2 multiplied by the tangent of the Bragg angle of PSA Bragg cell 338, where fL4 and fCL2 are the focal lengths of lens L4 and lens CL2, respectively.

Upon exit from the PSA Bragg cell 338, the light wedge 339 is separated into two parts: 1) the deflected wedge 341 and 2) the undeflected wedge 343. Cylindrical lens CL2 is placed exactly one focal length away from both the PSA Bragg Cell 338 and the Bragg cell spatial light modulator (SLM) 340 and serves two functions: 1) It collimates both the deflected and undeflected wedges in the top view only, maintaining the exact Bragg angle into the multichannel acousto-optic SLM; and 2) It illuminates each channel of the SLM in the Fourier transform plane of the lens to the full extent of its acoustic aperture from only the deflected wedge 341. The undeflected light wedge 343 does not interact with the SLM.

Correspondingly from the side view, FIG. 22, CL1 and CL3 form a telecentric imaging lens pair in the side view only. Consequently a perfect image of the PSA Bragg Cell 338 is formed on the multichannel acousto-optic SLM 340 in the side view. Recall that in the top view, FIG. 21, the deflected light is spread across the SLM 340 channels. The spot size is maintained at 4 μm at the SLM 340 as well as the 75:1 spot size to acoustic channel height tolerance.

Cylindrical lens CL5 is placed at one focal length behind the SLM 340 and one focal length in front of the detector 348. CL5 thus focuses each column of the SLM 340 onto its corresponding detector 348. In the top view, FIG. 21, CL4 and CL6 image the twice (binary multiplicative) deflected light coming only from the interaction between the PSA Bragg Cell 338 and the SLM 340 onto the detector. Both the originally undeflected light and the first order deflected light from the PSA Bragg Cell 338, which was undeflected by the SLM 340, is completely filtered at the plane of CL5 by a Fourier transform filter stop 350. CL4 is performing a Fourier transformation only with respect to the top view.

Cylindrical lenses CL1, CL2, and CL3 form an anamorphic imaging system. Note that lenses CL4, CL5, and CL6, also form an anamorphic imaging system. However this lens group (CL4, CL5, and CL6) is rotated 90 degrees to the first anamorphic lens system consequently canceling out any anamorphism at the output. In a sense the second lens group optically corrects what the first lens group created to give effectively an image of the source at the output rotated 90 degrees. Another way viewing this is to consider the first lens group as diverging the data vector across the control matrix rows while keeping the data pixels focused within each column. Likewise consider the second lens group as contracting (tensor terminology) only each control column/data vector selection onto its individual detector while keeping individual control column/data vector selections independent by imaging onto the detector array.

Every 10 nsec a new data vector can be presented and the resulting product can be read and stored. The detector for each channel need only differentiate between light present vs no light present. In an optimal system the interchannel crosstalk ratio should be less than the inverse of the number of pixels focused down onto each detector. However, this constraint is considerably reduced since operationally only a limited number of pixels are turned on in each column of the control mask. Thus, the critical parameters are related more to stray light and SLM ON/OFF ratio.

The present embodiment of the invention employs a Bragg cell for the SLMs 338 and 340 with an optical stop in the undeflected beam path and a 32 channel integrated The avalanche photodiode (APD) detector array 348 can be a device manufactured by RCA which provides between 25 and 40 db of adjacent channel isolation with good quantum efficiency and current gain in the 0.8–4.9 μm wavelength region.

Important performance parameters to be considered include the degradation of interchannel isolation in the Bragg cells with increasing ultrasonic propagation distance and overall system signal to noise ratio. Preferably performance of the hardware will support 10,000 photons per clock for the single pixel ON versus no pixels ON threshold discrimination, which provides a safety factor of about 10 over theoretical limits for a Bit error rate per flash of 10 E $-12$. The amplifier integration time and comparator sample window reduce this to about 3000 equivalent photons per 3 nsec event time window.

A transimpedance amplifier (NE5212, manufactured by Signetics Corporation) provides both a good power transfer from the current source equivalent APD and an effective short time constant due to its small effective input impedance of only 104 ohms. This combination of Avalance Photodiode detector and NE5212 amplifier provides an effective front end bandwidth in excess of 120 MHz with an effective single pole rolloff at the front end for optimal pulse shaping and stability. This provides a 3 nsec risetime (or effective front end integration time) for shot noise calculations.

An analog to digital decision upon the output of the detector array 348 can be provided by devices such as the Plessey SP9687 comparator which provides a short 2.2 nsec throughput delay and provides a sample and hold output for further digital processing. The sample time can be shorter than 3 nsec which provides a high data-valid duty cycle at the output.

The detectors in the detector array 348 can be provided by devices such as the RCA C30635E 32 element Silicon Avalanche PhotoDiode Array. This is a high efficiency (37 Amps/watt at 0.9 micron) 32 channel detector array with good inter element isolation and a fast 2 nsec response time. Since its output is like a current source it works well with current mode input transimpedance amplifiers. Element to element uniformity is within ±25% typically varying slowly across the array. A two stage Beam splitter maps four of these onto the 128 optical channels used on the SLM (Bragg cell 340). The interchannel isolation is between 24 db to 40 db depending on the incident light polarization. This device is described further in Applied Optics, Sep. 1987 p. 3594-9.

The Signetics NE 5212 used in the transimpedance amplifier is a current driven voltage amplifier which has the equivalent transfer characteristic of a 14 k resistor if operated double ended or a 7k resistor is operated single ended. Its input characteristics provided by feedback correspond to 10 pF across a 100 ohm resistor whose voltage drop is amplified by 70 as seen at either the positive or negative output. Its extremely low noise of 2.5 pA /root HZ equivalent input corresponds to 30 na at 140 MHz bandwidth or an instantaneous detector flux of 1 nanoWatt at the detector input assuming 30 amps/-watt detector sensitivity. This 1 nanowatt noise level corresponds to a photon rate of 4 photons/nsec expressed as an input flux at .81 m. The equivalent output noise signal is 0.5 mv differential.

A minimum of a 5 mv voltage swing at the amplifier output should be provided at the comparator inputs for constant delay switching corresponding to an input current of 360 na from the detector or 12 nwatts of incident optical power during the sample interval. Actually the statistical shot noise becomes important at these sensitivities so that a minimum of 1000 photons/event time is the minimum for an acceptable error rate ( FIG. 28 Tanguay 1988). With a sample time of 2 nsec this corresponds to 5000 photons/10 nsec or 5 E11 photons/sec or 0.12 watt per optical path at 0.81 m. If this gain and signal/noise were the only constraints and there were no other losses then a total system optical power of only 6400 optical products * 0.12 $\mu$watt = 770 w would be required. Losses in the optical system are allocated another factor of 60 which brings the minimum photon source power requirement up 50 mwatt. An increased noise margin and other optical distribution losses bring the source optical power requirements up to 320 mwatts. This source could be pulsed in later phases to minimize source cooling requirements since the detector data is only sampled during 20-30% of the cycle time.

Thresholding

The Differential output of the NE5212 is fed directly into the Plessey SP9687, an "ultra fast dual comparator" with an open loop bandwidth in excess of 300 MHz. This comparator provides a maximum of a 2.5 nsec delay from latch to output at a 5 mv overdrive voltage to Vos with only a 100 ps decrease in delay with 25 mv of overdrive. Thus minimal time jitter occurs as a function of overdrive voltage even if coming from reverse saturation on the previous clock.

The threshold level for light/no-light discrimination will be set under software control through a D/A on the VME interface board that allows setting the injected bias current seen by the Plessy comparator. Thus under software control a higher resolution picture of the actual required offsets can be determined and bias resistor values determined for balancing the threshold detector/amplifier pairs around the desired light/no-light threshold. Since only a binary decision needs to be made both the gain and offset compensations can be achieved with the threshold offset adjustment.

The Bragg cells will be fed ~5 nsec pulse trains of a 425 MHz carrier for each on pixel. The driver circuity will be able to provide between 100 and 625 Mwatts of power during each on pixel. THe RF will be generated in a central oscillator and distributed at low power to each Driver Module which will include a Motorola MHW 709 or 720 modular narrow band UHF amplifier. The RF output can be switched for each channel using a Mini-Circuits RF switch (the KSW-2-46 with 40 to 45 db on/off ratio) and be applied directly to the Bragg cell transducers as shown below. The input latches consist of Gigabit Logic 10G024 XOR quad input latches which provide both the required inverting input for data selection and an Output Enable control for the active high outputs so as to allow easy pulse on width control across all channels. A partial clock delay for the on time onset could thus be easily implemented. The level shifter in the schematic below is biased to provide a completely off control signal to the RF switch whenever the latch is tri-stated.

The memories are optimized for a fast read access time for microcode execution using the Fujitsu MBM 10474A-3 3 nsec access or the faster GigaBit Logic device no. 16G034 RAMS. Each memory module also includes a synchronously incrementable address latch with a 1.1 nsec total propagation delay that can be used as a program/state sequence counter to provide a high data output valid duty-cycle of greater than 80%. Thus the Program counter can be incremented without disturbing the memory output contents. A typical 64 bit wide memory module is shown in the figure below.

The Optical Executive (OPEX) interpretively executes the selected single threaded user mode program written for the SPARC RISC processor. When started OPEX first asks for the name of the executable SPARC file to be interpreted. It then looks at the file header to determine the size of the text (program code) and data segments and creates buffers in the OPEX address space to completely contain them. At least initially the program to be emulated must be linked (via the 1d linker) at an address above the top of the OPEX address space. Otherwise a table of address space mappings must be built up and referenced for each load/store instruction to generate an address offset for that instruction so that the correct address in the interpreted program is accessed. Fortunately any address space extension system calls (SBRK and BRK) would allocate address space unused by both the OPEX and interpreted program.

SYSTEM ARCHITECTURE

In the present invention, a host machine interacts with the optical hardware and software elements. The present invention can be configured in a number of different embodiments in which the tasks are divided differently among the host, the optical hardware and the software. For purposes of the following description of several of these different embodiments, the SPARC architecture, developed by Sun Microsystems, Inc. of Mountain View, Calif. will be emulated.

The SUN SPARC architecture is a full 32 bit load/-store RISC architecure with minimal complexities for emulation. Floating Point instructions are supported either via a Coprocessor or by software trap thus allowing incremental implementation. Compilers on the SUN 4 for C, Fortran, Pascal and ADA are presently available.

Three different embodiments of the present invention will be described, the first embodiment involves a simple controller with most of the control word and data handling performed by the host, while the optical system of the other two embodiments are directed to increasing the efficiency of the host-optical interaction in the SPARC emulation environment by providing a more sophisticated on-board controller capability.

Figure 23:
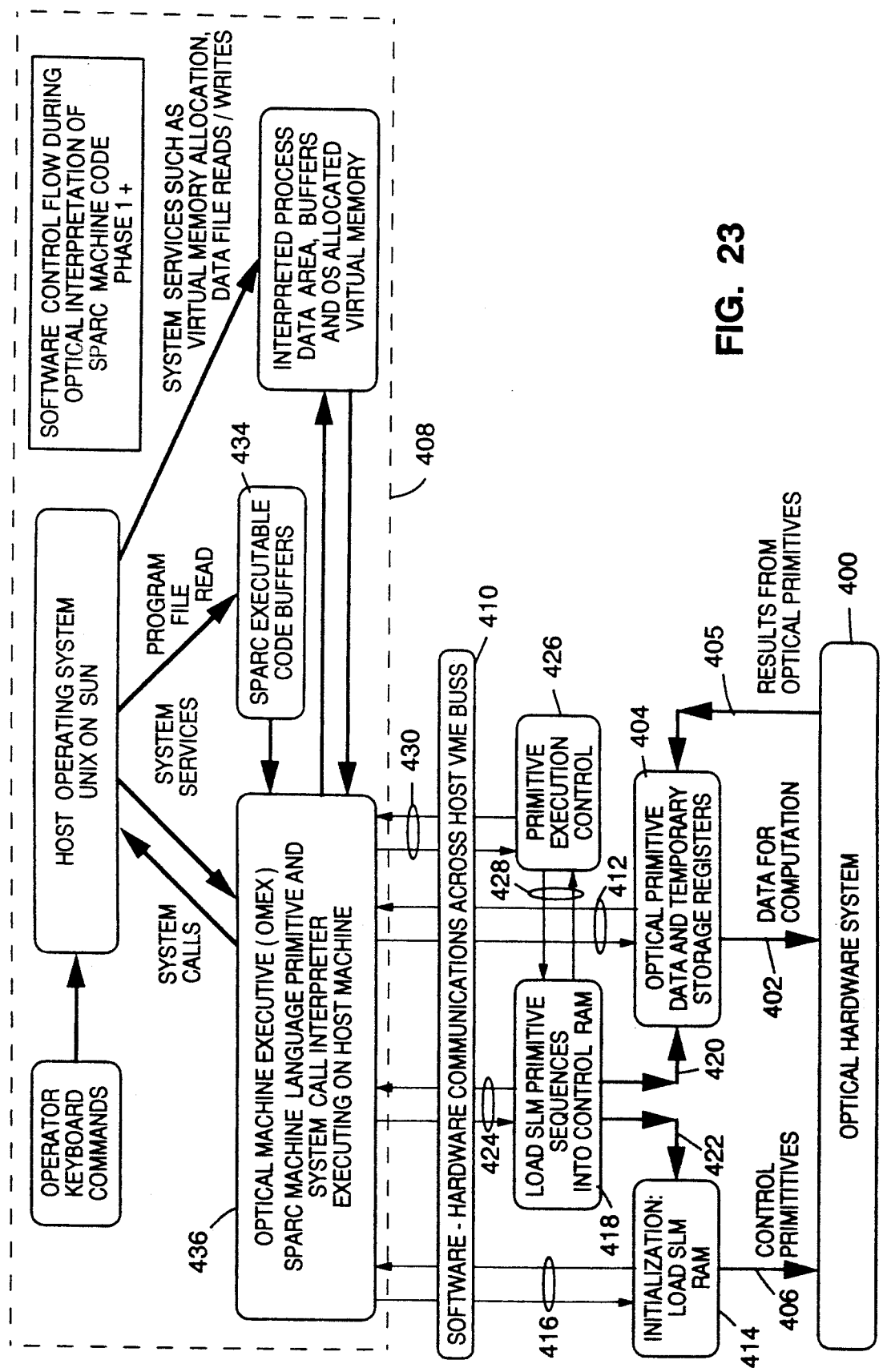
FIG. 23 is an illustration of the host/optical hardware interaction applicable to embodiments I, II and III of the present invention.
Figure 24A:
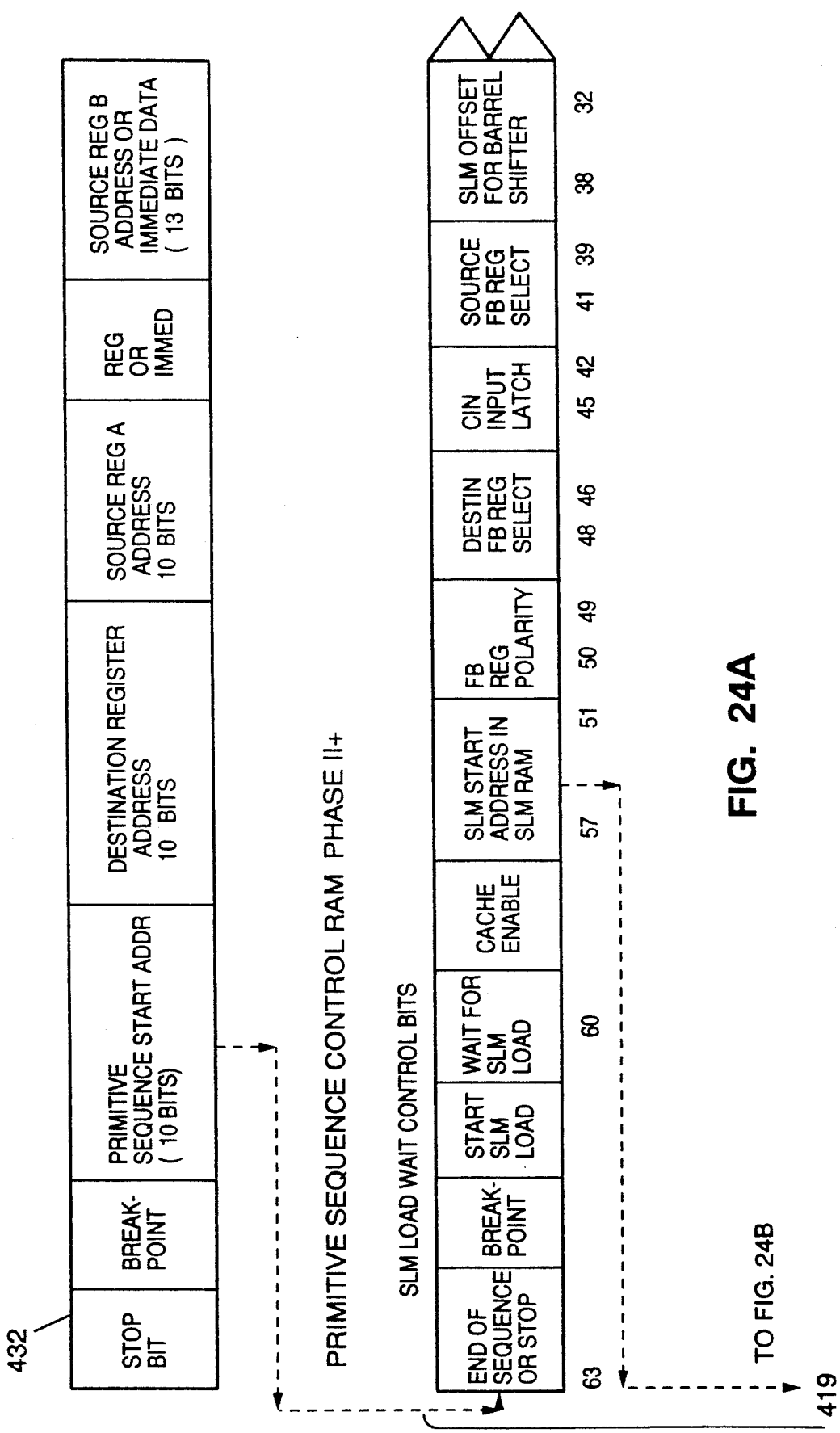
FIG. 24 provides microword layouts for embodiments II and III of the present invention.
Figure 24B:
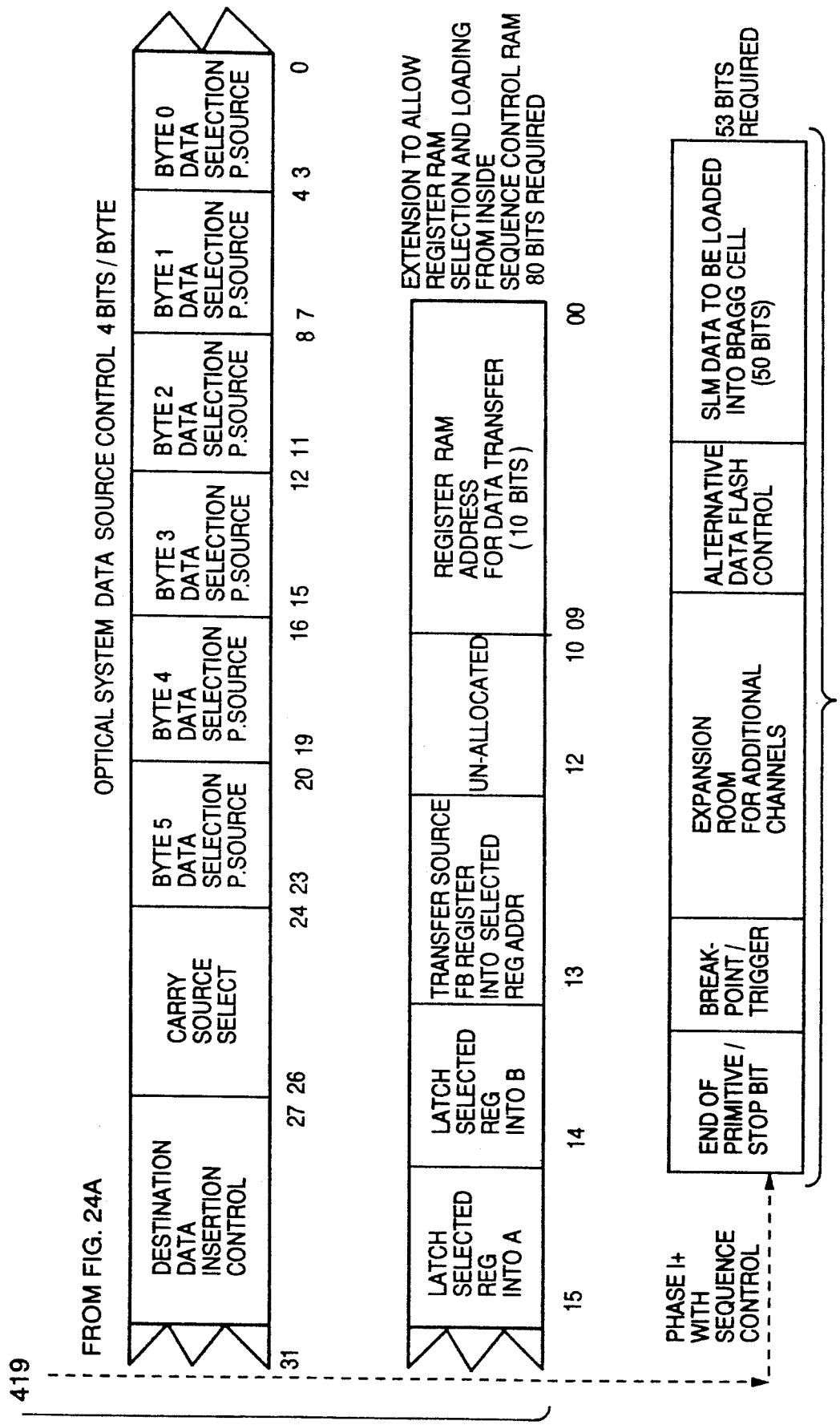

FIG. 23 illustrates the host/optical hardware interaction found in each of the three embodiments during execution of SPARC code in the present invention. As indicated above, from embodiment to embodiment it is the degree of hardware/software interaction that changes. FIG. 24 illustrates the levels of control information that are employed in the host/optical hardware interaction of FIG. 23. The blocks in FIG. 24 are not intended to show hardware details of the system, but rather show general classes of functions.

Referring to FIG. 23, the optical hardware system block 400 refers generally to that shown in FIGS. 20-22. The data to be operated upon by the optical hardware block 400 is provided via bus 402 from data block 404. Note also that data block 404 receives, via bus 406, the results of the operations being conducted in the optical hardware block 400, via bus 405. Further, it is to be noted that data block 404 communicates directly with the host function 408 via the VME Bus 410 and paths 412 In this way, the host can load data for processing directly into data block 404 during initialization, for example, and can access the results of operations directly therefrom.

The control masks for the particular operations to be performed in the optical hardware block 400 are provided via bus 406 from the control operator mask block 414. The designation of the control masks by the control operator mask block 414 takes the form of format 415 shown in FIG. 24. Note that block 414 is in direct communication with the host function 408 via paths 416 and the VME bus function 410. This permits the host function to manipulate the control masks stored under this block function 414, and to store, upon initialization of the system, the various possible mask sequences that might be used during the operation of the device.

Control of the functions performed by data block 404 and control operator mask block 414 is handled by mask primitive sequences block 418 via lines 420 and 422, respectively. Functional block 418 includes sequences of control microwords stored at specified addresses. An example of the control microword format is illustrated by the 80 bit word 419 in FIG. 24. These control microwords include the start address of the control words that form the control operator masks and the addresses for the data to be used for the particular operation being evoked by the particular control microword. The control microword also specifies the polarity and selection of the data to be used, and also the location to which the results are to be passed of the operation in the optical hardware. Note that paths 424, via the VME bus 410, provide direct communication between the host function 408 and functional block 418.

The microwords to be executed by functional block 418 are designated by primitive execution control block 426 by way of paths 428. The host function 408 communicates with the primitive execution control block 426 by way of paths 430, and supplies a SPARC primitive to block 426 having a format such as that bearing reference number 432 in FIG. 24. Note that the SPARC primitive format includes the start address of a primitive sequence. The primitive sequence includes the series of control microwords that are maintained as part of the primitive sequences block 418.

At the host function 408 level, a SPARC executable code is placed by the host operation system functional block 432 into SPARC executable code buffers block 434. The SPARC executable code is interpreted in OPEX block 436 to cause the appropriate SPARC primitive to be sent to the primitive execution control block 426 via path 430. From that SPARC primitive the primitive execution control block 426 extracts the start address of the primitive sequence (control microwords) for that SPARC primitive, and supplies it to the mask primitive sequences block 418. Mask primitive sequences block extracts the start address of the control mask sequence and the data addresses from each control microword and supplies the information to blocks 414 and 402, respectively. The optical hardware system block 400 uses the provided control mask sequence to operate on the designated data to form the combinatorial functionals and the combinatorial summations needed to provide the operation desired by the SPARC primitive.

Figure 25:
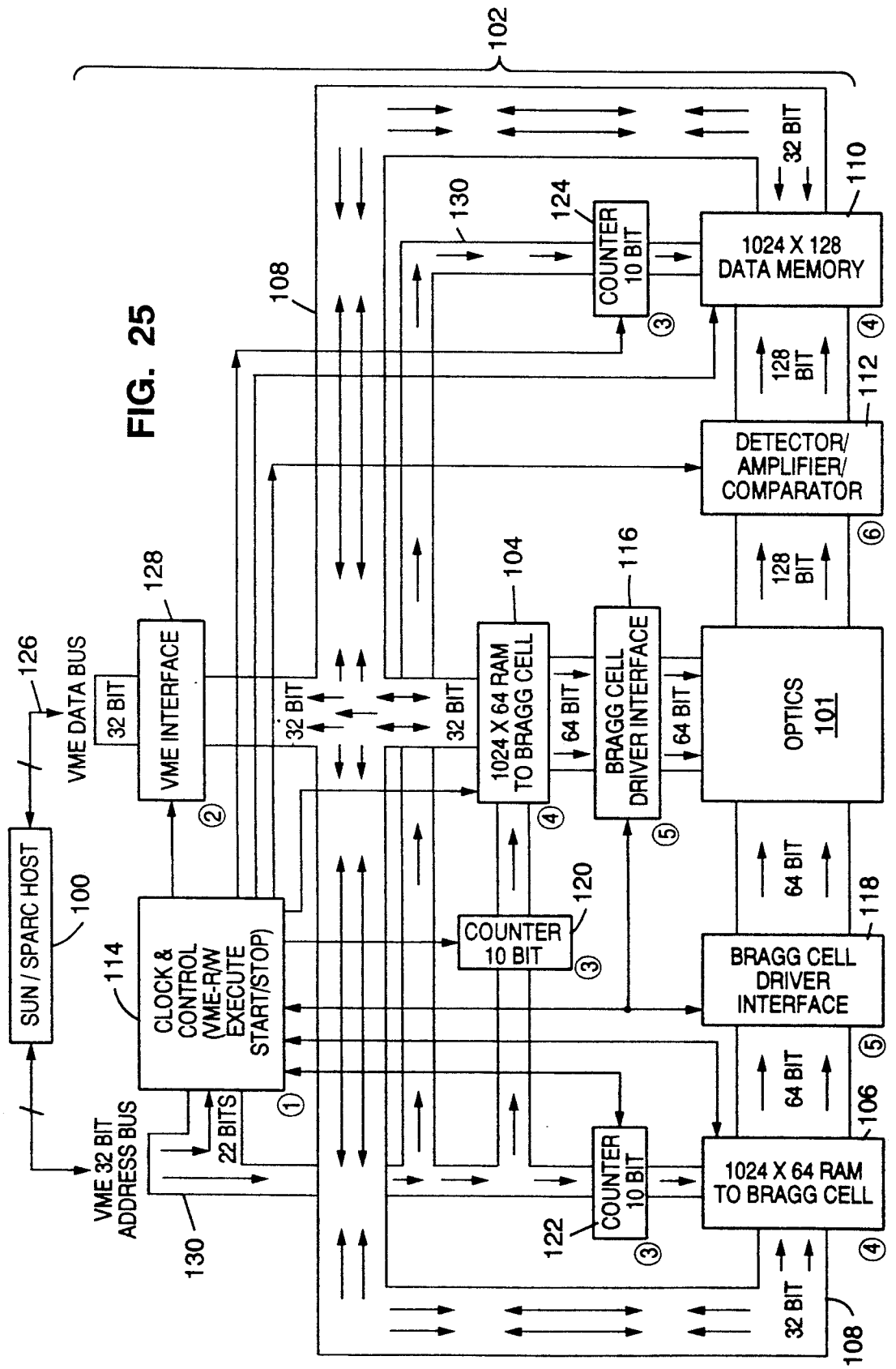
FIG. 25 is a functional block diagram of the embodiment I architecture of the present invention.

The system architecture of embodiment I, illustrated in FIG. 25, is directed towards initially doing most of the data selection logic in the host 100, in a SPARC-/RISC emulation program. The host based emulation program provides primitive data to the Optical Processing Hardware (OPH) 102 by writing directly into the OPH control and data registers (RAM), 104 and 106, respectively, over the host bus 108. The OPH 102 is started at the beginning of the desired control operator matrix stored in control operator matrix RAM 104 and steps sequentially until a there is an overflow in address counter 122. Results are then read back from the data memory 110 and used by the emulation program (OPtical EXecutive). This tight interaction provides an effective development environment for bringing up OPH primitives of increasing complexity.

Figure 28A:
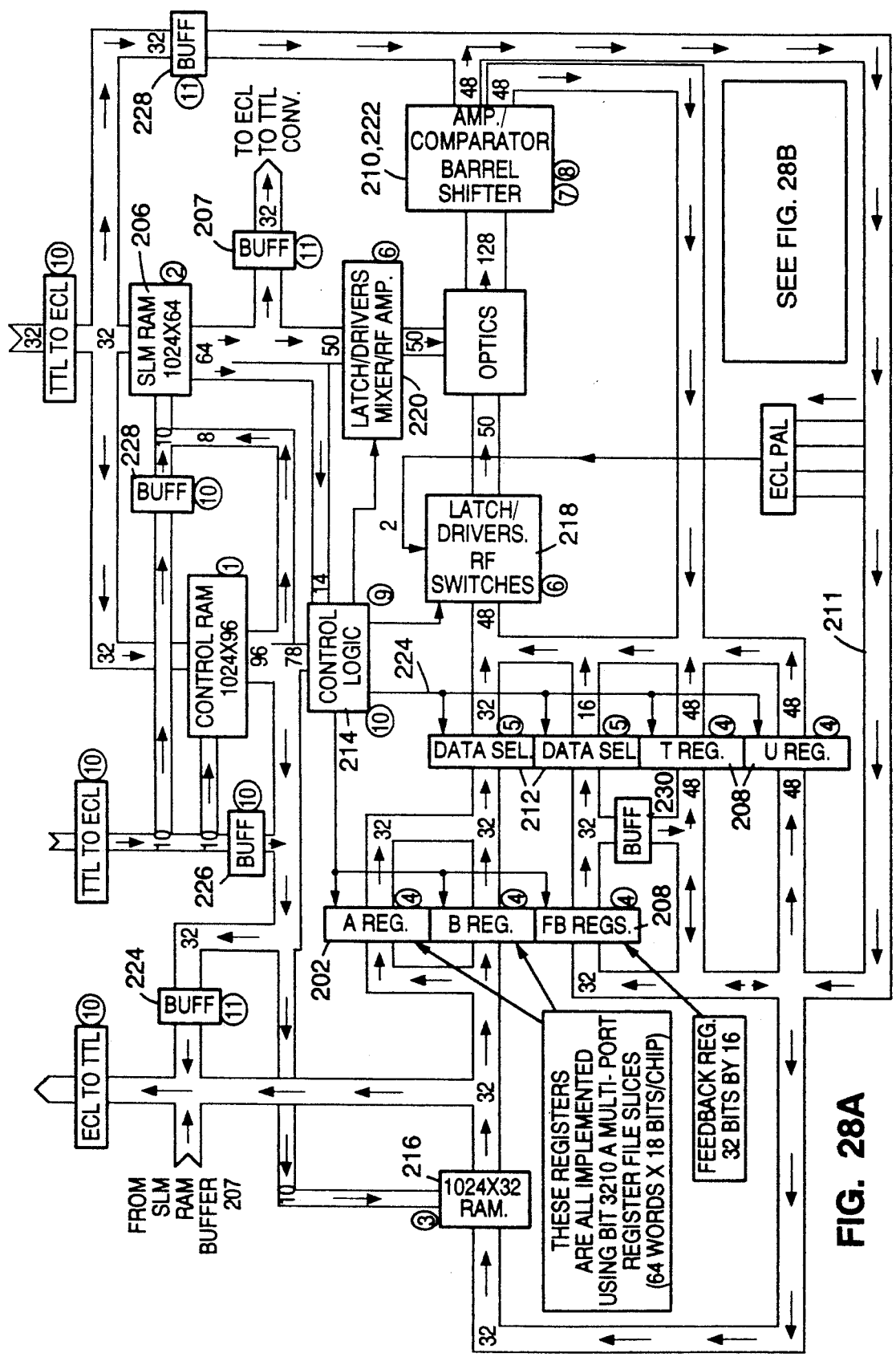
FIG. 28 is another functional block diagram of the embodiment II architecture of the present invention.

In the second embodiment that will be described, shown in FIGS. 26 and 28, a second level of control is added so that control mask sequences can be defined and executed in a single optical hardware/host interaction; i.e. designation of a control microword by the host to be executed by the hardware. Each of these control mask sequences corresponds in complexity to a 32 bit RISC primitive.

Figure 29A:
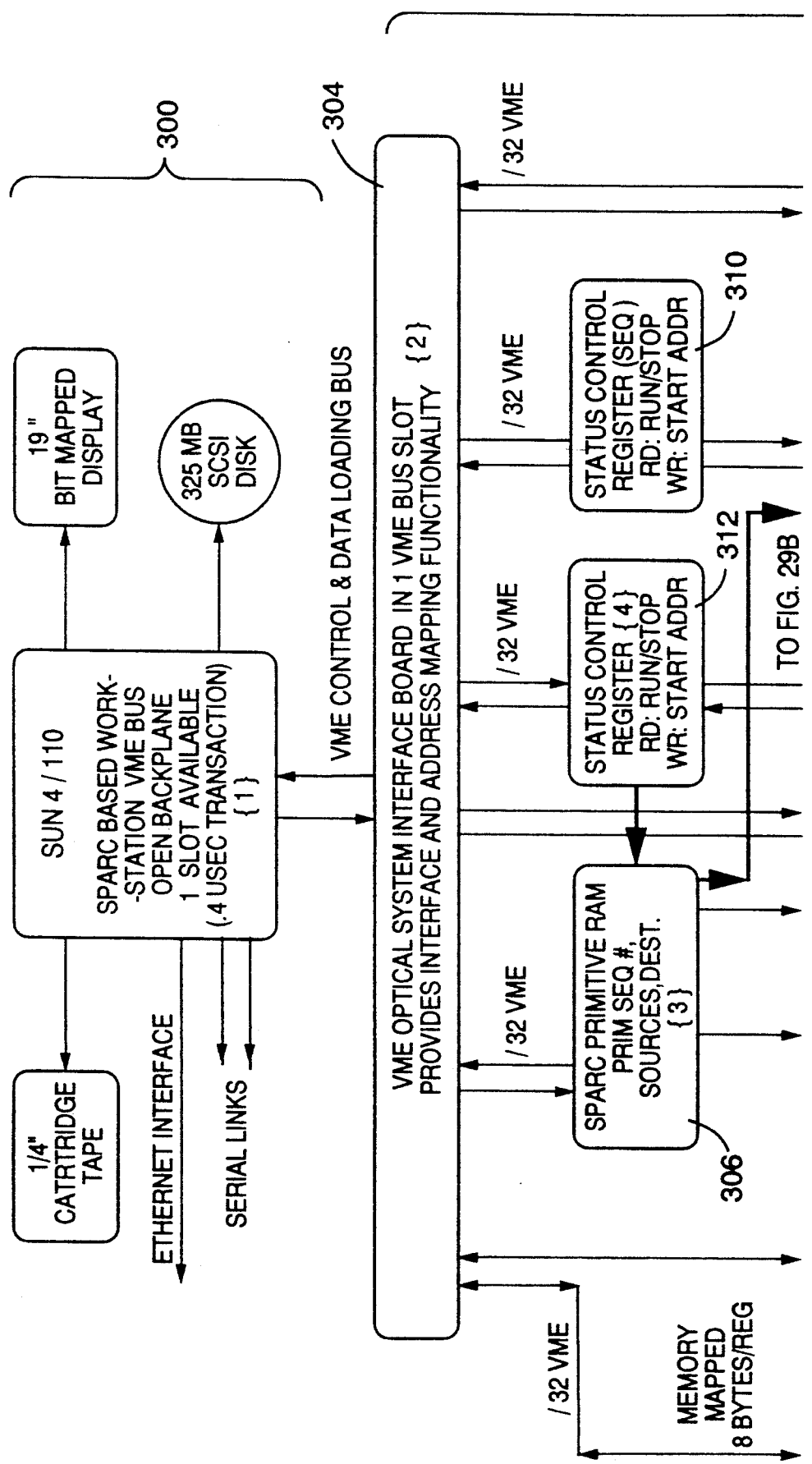
FIG. 29 is a functional block diagram of the embodiment III architecture of the present invention.
Figure 29B:
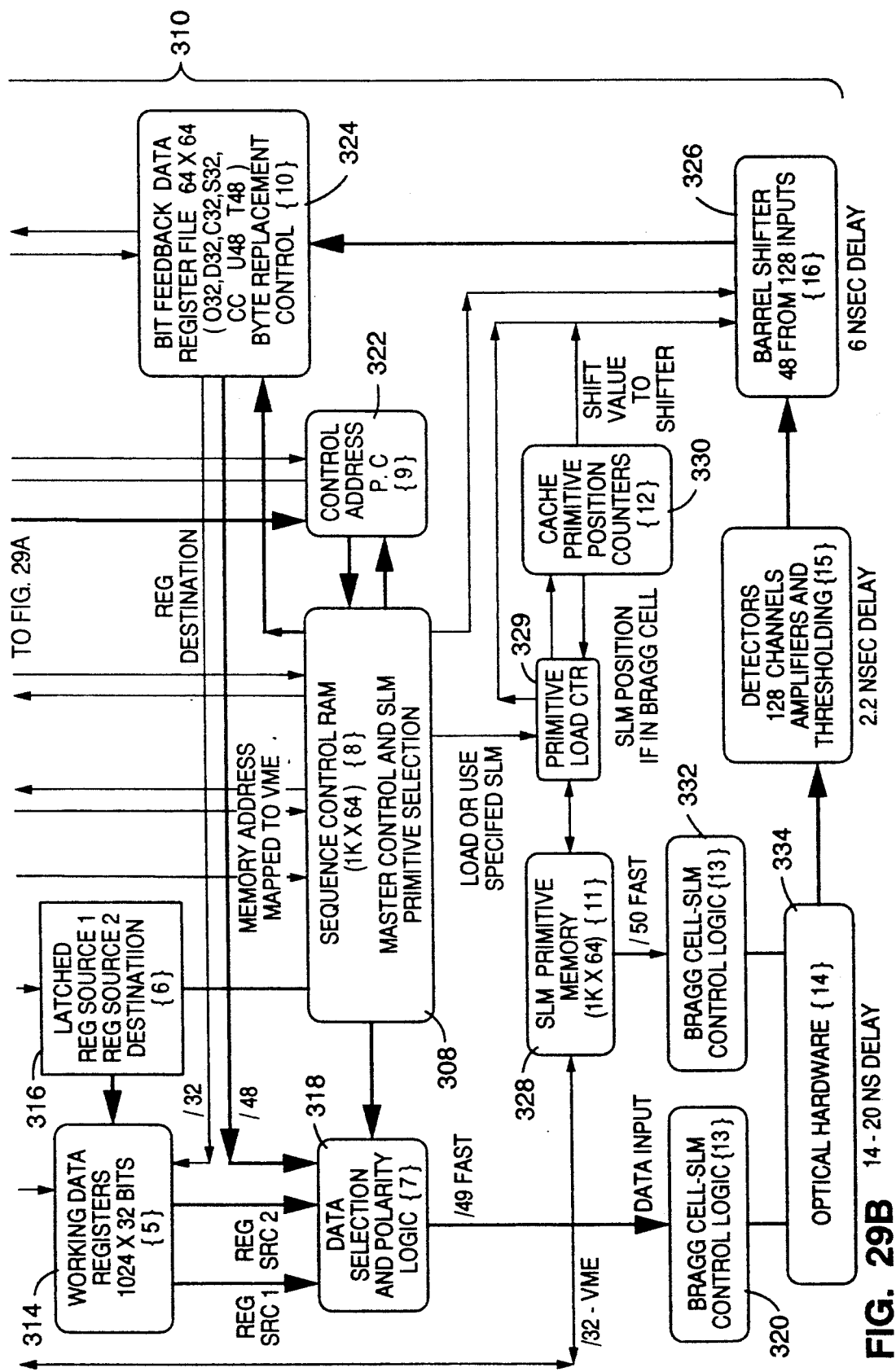

In the third embodiment, shown in FIG. 29, the host 300 loads an emulation control RAM 306 with a sequence of control operator matrix sequence descriptors, or SPARC primitives, which call out sequences of control microwords, so as to execute a burst of multiple RISC instructions before interacting again with the host 300.

Embodiment I Detailed System Description And Flow

While the embodiment I host 100 is described in terms of a SUN computer, it also can be a Macintosh personal computer, manufactured by Apple Computer Corporation of Cupertino, Calif., or comparable computer.

The hardware illustrated in FIG. 25 provides a minimal hardware system. The system loads an operator control matrix (or control mask sequence) from operator control matrix memory 104 and flashes data into the optics section 101 from any of 8 or 16 32-bit wide registers (RAM 106) and at multiple times during a operator control matrix (or control mask sequence) load operation. It is to be understood that such an operation involves the loading of control words into the spatial light modulator or Bragg cell that performs the control operator function 340 in FIG. 20. Data can be captured during execution from any of four 32 bit detector segments 112, and loaded into any desired 32 bit register located in data memory 110. A barrel shifter (not shown) can be positioned at the output of the detector 112 and used to capture a 32 bit wide detector slice at any arbitrary boundary for storage into a specified register at each clock cycle.

The host software, is preferably written in Forth for quickness and ease of interaction, and collects the data snapshots from the registers and displays the results in a humanized form. At this level a complete characterization of the optical system can be made by using a software controllable offset for setting the threshold for light/no light discrimination. Thus, by using a binary comparator and multiple trials a high resolution picture of the analog system behavior can be provided. A similar picture can be built up in the time domain by providing software control over a partial clock delay ($<10$ nsec ) for determining the time domain optimum for comparator data latching.

In this embodiment all data is loaded into OPH registers 106 prior to starting an control operator matrix load from RAM 104, and the resulting data is extracted from these registers by the host 100 after the load is completed. Data reuse within a burst is used in embodiment II described hereinbelow.

In embodiment I the host 100 loads up the control operator matrix RAM 104 with the desired control operator matrix control data, loads the Data input RAM 106 with the corresponding input data, and then starts execution at a specified RAM addresses latched into counter blocks 120 and 122 respectively. The host 100 starts execution when its sets the GO bit in the control status register, located in the clock and control block 114. During each clock cycle, the control words which form a control operator matrix (see for example 48, FIG. 10), are sequentially loaded from the RAM 104, through driver 116, into the Bragg cell 340 (see FIG. 20). The control words are retrieved from RAM 104, starting at the RAM address loaded by the host 100 into counter 120. During the clock cycle the data at the latched addresses (in counter 122) in data input RAM 106 are clocked into the Bragg cell 338, and the control words for the control mask sequence is clocked into Bragg cell 340. The resulting 128 bits of detector data from detector 112 are saved in the corresponding data output RAM 110 location, starting at the location latched into counter block 124. At the end of each clock cycle, clock and control block 114 causes counters 120, 122 and 124 to increment for the next cycle. This continues from the specified start address in counter 120, until either the control operator matrix counter 120 overflows, or until an allocated stop bit in the control operator matrix RAM 104 is found to be in a set state. The host 100 then manipulates the calculated data in the data output RAM 110 and sets both RAMS 104 and 110 up for the next cycle of execution.

Multiple useful flashes of data can be obtained in a given host cycle but the host 100 is involved in feeding back any data for use in another calculation.

The elements of embodiment I system block diagram described in FIG. 25 are described in greater detail below.

Control And Program/Storage Counters 114, 120, 122

As can be seen from FIG. 25, RAMs 104 and 106 are each preferably 1024 × 64 bytes. Each RAM 104 and 106 has an address latch/counter 120 and 122, respectively, that addresses them. These latches are loaded with the address bits during a transaction over the VME bus 126 and are incremented at the system clock rate (e.g. 10 nsec) when the system is running (Go bit is set). The contents of the latch/counters 120 and 122 can be read over the VME bus by reading the corresponding control status registers ("CSR") (not shown), which are located in VME interface block 128.

VME Interface 128

The VME interface block 128 provides total viability from the host 100 to the internal state of the OPtical Hardware System ("OPHS") 102. When the OPHS 102 is stopped all RAMS and registers in the OPHS 102 are directly addressable via a uniquely assigned address from the host 100. As implemented in connection with a SUN Model 4 type host, the VME transaction decode supports only 32 bit parallel transfers from the processor on long word boundaries (A0:A1 are ignored). A2:A3 select which 32 bit segment of a longer microword is to be accessed for reading or writing. All RAMS on the OPHS 102 are allocated 16 contiguous bytes of VME bus address space thus allowing up to 128 bit wide microwords. Unused words or bits return unspecified values when read. The control status register (not shown) for each RAM is always Read/Write accessible and is used to determine the run/stop status of the OPHS 102 and to read the address at which the OPHS 102 stopped. The CSR can be written with the stop bit set, to stop the OPHS 102, or, with the GO bit and an address set to start execution at the specified microword address. The VME interface block 128 also contains a D/A converter for setting the detector threshold value for light versus no-light discrimination for use by detector block 112.

Memories 104, 106, 110

The RAMs used in the OPHS 102 are preferably built using Fujitsu MBM 10474A-3 (1024 × 4) 3 nsec access static RAM Chips. These RAMs are used unchanged in embodiments II and III.

The control operator matrix RAM (1024 × 64) 104 contains the control mask sequence which is supplied to the control operator matrix plane (Bragg cell 340, FIG. 20) that selects and controls the optical data vector coming from the other Bragg cell (338, FIG. 20). The starting address of a sequence is under the control of the sequence circuitry 114 and 120, as loaded from the CSR by the host, and the stop address is determined by either a counter overflow (counter 120) or an extra stop bit that can be set in each word of the control operator matrix RAM 104. The 10 nsec system clock increments counter 120 during execution of the sequence.

The Data Input RAM (1024 × 64) 106 is loaded by the host 100 with the data to be presented sequentially to the Data input vector Bragg cell (338, FIG. 20) when the system is running. The data load starts with the last address left in the address latch (part of counter 122) and continues sequentially until the system stops.

The Data Output RAM 110 is a 128 bit wide by 1024 word deep memory used to save the resulting data coming from the 128 bit wide detector array 112 at each "flash" or clock time. The Fujitsu MBM 10474A 1024 × 4 memories are preferably used to construct this RAM and have a 3 ns access time which allows following logic to be direct flowthrough during each clock rather than be multi-stage pipelined. Address counter/address latch 124 allows sequential storage starting at an address specified by the host via VME address bus 130.

Bragg Cell Drivers and RF Source

In embodiment I, the data input plane (32, FIG. 9) and the control operator plane (46, FIG. 9) are implemented using Bragg cells, such as manufactured by Crystal Technology of Palo Alto, Calif.

Each 64 channel Bragg Cell Driver system 116 and includes 4 or 8 modules each providing an 8 or 16 bit wide fast exclusive OR input register (such as those available from Gigabit Logics, Device No. 10G024 4 bit XOR input flipflop) with an output enable that is used for pulse shaping the digital inputs to the RF switches. Narrow band Motorola MHW 709-1 or MHW720-1 RF amplifiers with 20 db gain are preferably used to provide up to 20 watts at a frequency of 425 MHz to the switch inputs. A such, a de-skewed variable width (2.4-7.1 nsec) digital pulse can be presented to the Bragg cell RF switches. These Bragg cell RF switches can be those manufactured by Mini-Micro Systems. These switches provide an on/off ratio in excess of 40 db (power) so as to minimize background light deflection from turned off pixels in the Bragg cells. The output of each of 64 switches (one per channel) will provide 200–625 mwatts (23–28 dbm) to the corresponding transducer on the Bragg cell. Thus for each input of "one bit", each channel of the Bragg cell is presented with between one and three full cycles of the 425 Mhz input RF source. The short pulse train lengths result in a $\sin(x)/x$ frequency distribution around 425 Mhz and provide an equivalent angular distribution around the 425 Mhz Bragg angle. No RF is presented during the OFF state or during the inter-pulse interval. Typically the data Bragg cell (32, FIG. 9) has about 50% ON pixels and the control operator matrix Bragg cell (46, FIG. 9) has less than 10% ON pixels, thus minimizing the Bragg cell power dissipation and resulting cooling requirements. Additional cooling margins can be achieved by operating the Optical Hardware in burst mode with considerable OFF periods for host control interaction. These modules are used unchanged in embodiments II and III.

Detector Amplifier Comparators

The detectors 112 are built up from 4 32 element avalanche photodiode arrays, such as device no. C30635E by RCA, each channel of which is connected to a transimpedance amplifier with a bandwidth of about 150 MHz (2.3 nsec 10%–90% risetime), such as device no. NE5212 manufactured by Signetics of Santa Clara, Calf. The output of the transimpedance amplifier is in turn feed into a comparator, such as device no. SP9687 built by Plessy Semiconductor, for thresholding. The comparator has a built in latch for use in defining the 2 nsec sample window time and to provide a stage of pipelining. Each compact analog module of this system is packaged with a detector and 32 surface mount amplifier chips (such as the NE5212) and is mounted within the optical system. The four analog modules are connected via differential feed for noise immunity to a digital board with 64 dual comparators with internal sample and hold latches, such as is available in the Plessy SP9687, so as to provide a stable 128 k channel ECL output interface to the Data Input memory 106 in Embodiment I. A bias voltage from the D/A converter in the VME interface block 128 is also distributed to allow software control over the threshold voltage value for light/no-light discrimination.

Embodiment II System Description And Flow

Figure 26:
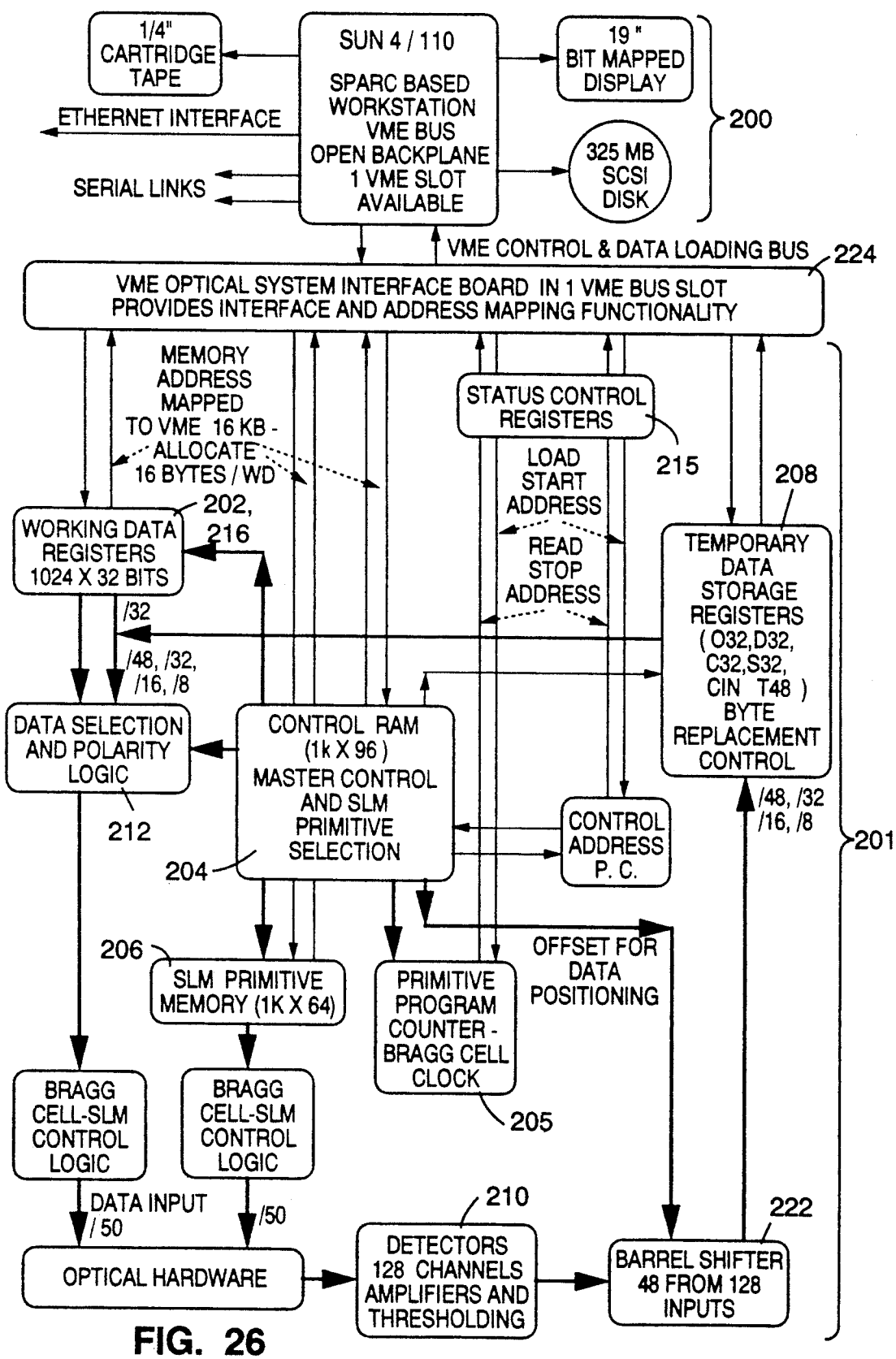
FIG. 26 is a functional block diagram of the embodiment II architecture of the present invention.

The functional block diagram of FIG. 26 illustrates the system architecture of embodiment II of the present invention. FIG. 28 illustrates the hardware block diagram for embodiment II.

This embodiment provides a burst level performance capable of executing a 32 bit SPARC primitive or some other defined primitive with fixed input and output registers after each interaction with the host 200. The host 200 sets the input data registers 216, used by the particular primitive, to the desired value then loads the start address of the desired primitive with the Go bit set into the Sequence control register CSR 204. When the Stop bit in the CSR comes up (see FIG. 23 VME address space layout) the sequence is complete and the calculated data is available to be read by the host control.

At system startup the SLM mask Memory 206 (FIG. 28) is loaded with all the desired SLM primitive control masks that need to be invoked and the sequence control memory 204 is loaded with the control microcode, or microwords (419, FIG. 24), to invoke the SLM primitives and control the dataflow through the SLM's. Thus, only the data registers and the sequence control memory 204 start address need be loaded at each host 200 - optical system 201 interaction. In embodiment III as described later multiple SPARC like instruction bursts can be executed between host - optical system interactions, and register specifications are performed at a SPARC equivalent level.

During SPARC emulation the required interaction comprises 1) loading the desired data input registers with the values required and then 2) writing the start address of the primitive sequence with the GO bit set into the Sequence control CSR. Typically the sequence will be completely executed and the STOP bit will be set by the next host instruction which polls for sequence completion as shown in FIG. 23: VME address space layout. At this time the calculated data may be read from the results registers 210 and the entire process completed.

This system implements functionality that eventually will be done in multiple stages of integrated optics by sequentially routing the data back through a single optical path while selecting parts of data words to go through the specified control logic mask. Thus, there is considerably more electronic glue than there would be in an integrated optical system to control the data flow.

Each microword 419, FIG. 24, specifies the complete data-flow for that specific time cycle including waiting for, or starting, a specific SLM mask load. This includes Bragg cell output data selection from selectable registers, compensation for the position of the control SLM mask in the Bragg cell 340, FIG. 20, using the barrel shifter 210, and detector data routing with partial register data replacement.

A typical sequence starts by requesting an SLM mask load (from SLM mask memory 206 into Bragg cell 340) and latching the source data from data RAM 216 into the A and B register latches 202. When the SLM control mask is finished loading into Bragg cell 340, as many bytes of operand data as the available channels allow are passed to the Data vector Bragg cell (338, FIG. 20) and flashed. The data can be selected, via data selection block 212, on a byte by byte basis and negated by byte as needed by the primitive under execution as shown in FIG. 27, data selection. Bits 0:23 in microword format 419, FIG. 24, specify this bit selection. Thus, a 4 bit selector is provided for each of the 6 bytes of data source. This selector includes a polarity bit and three bits of source selection whose interpretation varies with which of the three 16 bit groups they control. The six byte wide data source vector is divided into three 16 bit wide groups where the high and low bytes are independently specified. The first group selects any byte of the A register or the low order part of one of the three global registers A, U, and T. The second group selects any byte of the B register or bits 16:31 of the A, U, or T registers. The third group selects any byte of the selected Feedback registers or the high bits of the T or U registers. The Source feedback register field (39:41, FIG. 24) selects which feedback register can be accessed in the third group.

The feedback registers provide the path for accessing data calculated earlier in a sequence as source data later in the sequence in another flash without host intervention. The T and U registers, block 209, FIG. 28, allow source access to the wide number of minterm bits generated in some primitives to allow logical or combination into the desired functional bits. The feedback registers, including registers 208, can be independently accessed for both source (reading), bits 39:41 of microword format 419, FIG. 24, and destination (writing), bits 46:48 of microword format 419, independently in the same cycle. Data can be written into or replaced in the feedback registers with byte wide control provided by a control word bit for each possible destination byte.

Data positioning prior to writing to the feedback registers is accomplished by a seven bit field that specifies the barrel shifter shift or offset value, see 32:38, microword 419, FIG. 24. This value compensates for both the location of the SLM primitive control mask propagating through the Bragg cell 340 and the desired alignment position for the data replacement.

There is an additional data path used for bit wide feedback of data such as the carry propagation in the ADD or SUBtract primitives. The carry latches allow independently saving the contents of the high bit of each byte written to the feedback registers and displaying any one of these carry bits in dual rail form on channels 48 and 49 of the Bragg cell. This allows carry propagation between successive byte slices in the ADD-carry calculation and an effective shift by a bit of the carry inputs into the ADD-Sum or subtract slice calculation. A fifth carry latch is provided for the Carry_in used by the ADDX or SUBX primitives.

The sequence control RAM 204 is preferably a 96 bit wide by 1024 word deep memory used to specify the control operator mask to be used, and the data selection and data insertion for each flash through the OPH 201. Each 96 bit wide microword is interpreted by the optical hardware control logic 214 as a number of fields that control different aspects of execution as described in FIG. 24. Preferably the sequence control RAM 204 is constructed of Fujitsu MBM 10474A 1024×4 memories, with a 3 ns access time which allows following logic to be direct flowthrough rather than be pipelined. These microword RAMS also include a program counter/address latch that allows sequential execution starting at a specified address.

The control mask (or SLM mask) RAM 206 is a preferably fast 3 nsec access memory that is 64 bits wide by 1024 words deep. This memory contains the mask sequence needed to select and control the data loaded into the input Bragg cell (338, FIG. 20). The starting address of a control mask sequence is under the control of the SLM start address field bits 51:57 419, FIG. 24) from the microword in sequence control RAM 204 above. The stop address is determined by an extra stop bit that can be set in each word (415, FIG. 24) of the control mask RAM 206.

The Data RAM (1024×32) 216 allows primitive sequences to work from different input data locations on invocation, but to remain unchanged internally. Some data RAM 216 locations are allocated for longer term temporary storage for use within particular sequences especially in embodiment II using a two way data path between the feedback registers 208 and the data RAM 216 that is accessible from both the sequence control microword (RAM 214) and primitive list control words (RAM 204). Such a multiported data path can be provided by the BIT 321? register file device. During execution the data must first be loaded into the "A" or "B" latch registers 202 and is then loaded under control of the data selection logic 212 into the latches in the Bragg cell driver 218.

The Feedback data registers include the following parts: the A, B data latches 202 that are loaded directly from data memory, the feedback registers (64 words×32 bits) 208, and the 48 bit wide T and U latches 209 used for temporary data feedback. All of the above except the A and B latches are loaded from the barrel shifter data path 211. Both the T, U latches 209 and the front end feeding the FB register file are preferably built using an exclusive OR input latch such as the Gigabit Logic device No. 10G024. The main feedback store is preferably built with 5 port register file slice chips, device manufactured by BIT.

The data selection logic 212 allows the sequence control software to select the sources and polarities of the data according to the needs of the particular primitives being calculated as they are presented to the Bragg cell driver 218. This irregular puzzling of the data is done in a regular manner by the hardware where the source and polarity of each output byte is independently specifiable. Thus, a polarity bit and an eight way multiplexer can completely implement the data selection for each byte position.

Each Bragg cell driver 218 and 220 are the same as that described in connection with Embodiment I, except each set of 32 Bragg cell channels will be provided with up to 625 mwatts of the 425 MHz input RF source.

The detectors 210 are the same as that described in connection with the detectors 112 of the Embodiment I.

A barrel shifter 222 is provided which permits the selection of 48 bits from the 128 detector-amplifier-latch channels with a end to end wraparound from the output of the comparators. The barrel shifter 222 takes a 7 bit control input number which corresponds to what input channel number is shifted to position zero of the output. The barrel shifter 222 achieves this flexibility in three stages, the first stage selects the correct 16 bit word boundary preferably using 16 F100158 8 bit barrel shifter chips (manufactured by Signetics) connected to allow end around wrapping, the second stage selects the starting byte number in the positioned 64 output bits, and the third stage selects the starting bit number within the byte position again using F100158's. A single stage of latches in the middle stage is incorporated in the F100155 quad 2 to 1 multiplexers and can be used for de-skewing if desirable. The barrel shifter 222 also provides the additional service of positioning result data bytes to the desired byte or half word boundary for partial result loading into an output feedback register. (Note—a different SLM could be loaded to both calculate the desired result and position it but this would require a larger more expensive memory for the control operator mask RAM and also slow the final system.)

The control logic 214 in conjunction with the VME interface 224 both provides the host processor 200 with full visibility to all major data pathways and memory elements as well as providing the standalone execution state sequencing control.

Whenever the sequencer in the control logic 214 is stopped, VME mode is enabled and according to the VME bus address decode all necessary isolation buffers are enabled to allow VME read or write access to the selected hardware. Thus, in VME mode, host software can provide a complete checkout of all data paths and memory elements for both diagnostic purposes and for setting up data for a standalone burst.

When the sequencer in the control logic 214 is running (typically for bursts of up to several microseconds) successive locations from the Sequence Control Ram 204 are accessed and executed until a stop bit is encountered. All microword fields are decoded during the 10 nsec cycle with the resulting data selection appearing at the Bragg cell latches 220 by the end of that cycle. The desired register or latch outputs are enabled by the microcode via control logic 214 and lines 224 to allow only the selected data on the internal bus. The Detector data is latched in the comparators during each clock period and presented as stable data to the barrel shifter inputs. There is a one clock pipeline delay between data arriving at the detector 210 and being available for input through the fast feedback path in the next data flash. During execution VME access is disabled except to the CSR registers in the VME interface 224.

The Start SLM load field of the 96 bit microword of the sequence control RAM 204 initiates loading of the control logic mask from the control operator matrix RAM 206 into the second Bragg cell (340, FIG. 20). The address of the control logic mask address in control operator matrix RAM 206 is given in the SLM start address field and is loaded into counter 205, FIG. 26. The wait for SLM loaded field "60" delays clocking the Sequence control Ram address until the SLM "end of primitive" bit is found set in the control word from SLM mask RAM 206. This combination allows simultaneous loading of the next control SLM mask while performing computations using control SLM masks that are propagating through the Bragg cell 340 (FIG. 20). The barrel shifter 222 is controlled by the 7 bit Barrel shifter offset field 32:28 is pre-calculated to compensate for position of the control SLM and to position the resulting data to the desired byte position for building up the result of a calculation. Thus, any control operator matrix known at microcode assembly time to be in the Bragg cell can be utilized wherever it happens to be.

The VME interface block 224 provides total visibility from the host system 200 to the internal state of the OPtical Hardware System (OPHS) 201. When the OPHS 201 is stopped all RAMS and registers in the OPHS 201 are directly addressable via a uniquely assigned address from the Host 200. The VME transaction decode supports 32 bit parallel transfers from the processor on long word boundaries (A0:A1 are ignored). The address lines A2:A3 select which 32 bit segment of a longer microword is to be accessed for reading or writing. All RAMS on the OPHS 201 are allocated 16 contiguous bytes of VME address space where unused words or bits return unspecified values. This standard also causes microcode listings to increment cleanly in the second digit. The control status register (CSR) 215 at each level is always Read/Write accessible and is used to determine the run/stop status of the OPH and to read the address stopped at. The CSR 215 can be written with the stop bit set to stop the OPH 201 or with the GO bit and an address set to start execution at the specified microword address.

Buffers and latches 207, 224, 226, 228, 230 (Inter Bus isolation). These buffers allow interconnection of the different buses according to the major RUN/VME mode of operation and the particular data flow desired. Thus, by using tri-state register outputs and buffers for necessary isolation multiple different data flows can be selected by the microcode.

During Embodiment II execution an OR operation would flash high true (light=1) data with 16 A bits and 16 B input bits. The result is merged into the destination register, 2 bytes at a time, thus requiring two flashes for the full 32 bits. An XOR would select both high and negated values a byte at a time from both A and B and requires an additional pass through the system to merge the two resulting minterms into each result bits. Thus, the data selection hardware should provide the A and B outputs as dual rail signals successively for each byte in the source registers.

This process is repeated once for each SPARC primitive or special instruction as specified by a control operator mask sequence so that all logical and arithmetic operations are carried out in the OPH 201.

Embodiment III System Description And Flow

Embodiment III is illustrated in FIG. 29 which provides a burst level performance capable of executing multiple 32 bit SPARC primitives between host-optics interactions. The Host 300 then loads the next sequence of SPARC machine code like data and updates or saves any registers accessed by load/store instructions in the SPARC program under interpretation. SPARC code emulation is similar to that of Embodiment II above except that multiple instructions will be executed in a single burst. Emulation throughput will be limited by the requirement of the host 300 to check each SPARC instruction against an internal execution list before passing it on in slightly modified form to the OPH 302. Register window changes due to SAVE and RESTORE operations may require a reshuffle of the data register RAM as well as limit checking for invalid register window numbers.

The Host 300 is preferably a SUN 4/110 which provides a 10 MIPS processor to do all the decoding and interpretation functions that are not done by the Optical Hardware (OH) 302. The Host 300 provides the operator and control interface for the system and spawns off sequences of primitives for the optical hardware 302 to execute. The remaining VME Bus slot on the SUN 4 provides a memory mapped interconnect path between the software running on the SUN under UNIX and the Optical System.

The Host 300 software interacts at several levels providing a smooth transition from diagnostic level hardware checking through the execution of sequences of SLM mask calculations, to chaining through multiple SLM mask sequences so as to calculate multiple SPARC primitives at a burst.

The VME - Optical System Interface Block 304 (initial embodiment I) is similar to block 128 described in connection with Embodiment I and block 224 described in connection with Embodiment II.

SPARC Primitive RAM 306 is loaded with sequences of high level commands like ADD: reg_5 to Reg_7, and store in Reg_11. The sequence control RAM 308 provides the expansion of each instruction word into the required sequence of SLM primitives. Words having the format 432, FIG. 24, are stored in sequence control RAM 308. Each SPARC command from the SPARC primitive RAM 306 invokes a primitive sequence in the Sequence control RAM 308. The microword 419, FIG. 24) in SPARC primitive RAM 304 contains bits defining the end of an instruction sequence, breakpoints and specification of the actual operand registers to be used by the primitive sequence defined in the sequence control RAM 308 described below.

Status Control Registers 310 and 312 (embodiment I to III) provide Start address, Stop address, and Status (Running/Stopped) to each of the three levels of control in the system. A breakpoint/scope trigger bit at each level of microcode provides an instantaneous snapshot of the system state during a calculation. The SPARC primitive control, set via register 312, allows execution of a burst of multiple SPARC primitive instructions before interaction is necessary. The Sequence control address oin block 322, set via register 310, allows execution of a predefined sequence of SLM flashes with predefined data routing. The SLM control block 329 allows loading a single SLM control mask and flashing with given data.

Working Data Registers 314 provide the equivalent 32 bit registers used by the SPARC processor. All primitive requests take their initial data from these registers and place their final results back in these registers. Thus, multiple SPARC level primitives can be executed in a burst using these registers for input and output. They are loaded with the equivalent SPARC register contents before the start of an Optical Hardware primitive sequence and read by the emulation interpreter when the optical hardware is finished with a burst.

Register source and destination latch 316 latches the contents of the working data registers 314 used by the high level primitives so that the lower level description of each primitive is not tied to any particular register and can thus be invoked multiple times without changing imbedded register descriptions.

Data selection and polarity Logic 318 selects the appropriate portions of the selected working data registers 314 and provides a high true or low true or dual rail representation of those bits to the data Bragg cell SLM control logic 320. This allows the execution of primitives which would otherwise require a much larger control SLM.

Sequence control RAM 308 is loaded at system startup with the microwords that designate sequences of SLM primitives (control masks) require to execute each SPARC primitive. These are either invoked in a sequence by the SPARC primitive command words from SPARC primitive RAM 306 or one at a time under direct host 300 control. Preferably microwords of 80 bits in length will be employed using 20 1024×4 fast static memory chips.

Control address program counter 322 determines the address of the SLM sequence to be executed and is loaded in one of two modes: 1) At the beginning of each SPARC primitive in a sequence with the SPARC Primitive I.D. (effectively the starting address of a sequence in Control Ram); or 2) Directly from the Host 300 while executing a single SLM primitive sequence under direct host control.

Feedback data register file 324 are multi-ported registers that provide the partial word data insertion capability required by the partial word SLM primitives (typically a byte, half word or full 32 bit word.) The Data is properly positioned for insertion by using an offset applied to the barrel shifter count (for barrel shifter 326) so as to shift to a value of Primitive position counter +/− offset.

SLM primitive memory 328 is similar to RAM 104, FIG. 20, of Embodiment I, and is loaded at system startup with the SLM Masks required to calculate the SLM primitives. These masks range in size from 44×49 for a 1 byte ADD carry to 16×49 for a byte to byte XOR. The
total SLM mask requirement is approximately 300–400×49 depending on the re-use capability provided by electronics for sign extension and shifting.

Primitive position counters 330 are associated with corresponding SLM primitive locations in the Bragg cell (340, FIG. 20) and allow cacheing of SLM's across primitive sequences. Each SLM standard Primitive has a corresponding counter which contains the position of the part of that primitive furthest into the SLM. All other offsets are relative to this master position. An additional counter is reserved for the special SLM primitive type which is linked when desired to those little used SLM primitives that may occasionally be required.

Bragg cell data 320 and SLM control mask logic 332 provide data latching and level conversion from the ECL digital levels to a modulated RF carrier at 325 Mhz+/−150 Mhz for feeding 1) the 49 bragg cell electrodes for the linear data source (338, FIG. 20) and 2) the 49 Bragg cell electrodes for loading SLM control masks (348, FIG. 20).

Optical hardware 334 handles 49 channels of data input by 128 "pixels" deep in the propogation direction for SLM propogation and storage. Thus, SLM primitives are effectively limited to less than 128 terms (14 terms of carry lookahead). Detector ORing is done with a second pass of detector outputs driving the 49 data inputs of the Bragg Cell. For the sake of simpler electronic data routing requirements byte or half word (16 bits) wide primitives are implemented.

Detectors, amplifiers and thresholding 336 can be RCA avalanche photodiode arrays closely coupled to Signetics NE5212 Transimpedance Amplifiers. Each amplifier output is subjected to a binary threshold equivalent to "light" vs "no-light" at the detector inputs using a digital comparator with a software settable threshold adjustment. The parallel latched digital signals are fed to the barrel shifter for positioning to compensate for both the the Bragg cell propagation and to position the data for insertion into the registers at the correct byte position.

The barrel shifter 326 compensates for the movement of the control mask in the Bragg cell 340 thus allowing the data to be accessed at the desired position regardless of the position of the control mask within the Bragg cell. It also provides positioning of the partially calculated results into the appropriate bytes of the feedback data storage registers. For additional hardware details refer to Embodiment II.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

We claim:

1. A general purpose optical computer for operating upon input data words in accordance with instructions specified by a user, wherein each of the input data words have a predetermined plurality of bits and the specified instructions are implementable by forming combinatorial functionals and combinatorial summations of bits selected from the input data words, from previously formed combinatorial functionals and from previously formed combinatorial summations, the general purpose optical computer comprising light source means responsive to a predetermined number of input bits, for providing a plurality of rays of light of predetermined width which propagate along a plurality of associated optical paths, wherein each of the predetermined number of input bits is associated with a different one of the plurality of rays of light, and further wherein the intensity of each of the plurality of rays of light is determined as a function of the logical state of the associated input bit;

detector means positioned in the plurality of optical paths for focusing light which is propagating in each of the plurality of optical paths onto a predetermined point and for detecting the presence or absence of light at the predetermined point, wherein the detector means provide inverted and noninverted outputs of the detected result;

control operator means positioned in the plurality of optical paths between the light source means and the detector means, and responsive to control words, for controlling the propagation of light along each of the plurality of optical paths as a function of the control words, wherein each control word has a plurality of bits at least as great in number as the number of input bits being supplied to the light source means, and each bit of any particular control word controls a different one of the plurality of optical paths; and controller means receiving the input data words and the inverted and on-inverted outputs of the detector means, and responsive to the specified instructions, for supplying the input bits to the light source means and for providing control words to the control operator means, to cause the combinatorial functionals and combinatorial summations which implement the specified instruction to be formed at the outputs of the detector means, wherein the input bits are selected from among the bits of the input data words, the previously formed combinatorial functionals and the previously formed combinatorial summations;

wherein the control words, which cause combinatorial functionals to be formed, cause selected ones of the selected input bits to be logically ORed with one another, the result of which is detected by the detector means, inverted and provided as an inverted output of the detector means, to represent the logical AND of the complement of the selected input bits to thereby provide the combinatorial functionals for the specified instruction, and further wherein the control words, which cause combinatorial summations to be formed, cause selected ones of the selected input bits to be logically ORed with one another, the result of which is detected by the detector means and provided as a noninverted output of the detector means to provide the combinatorial summations for the specified instruction.

2. The apparatus of claim 1, wherein the light source means comprise a source of light;

means positioned with respect to the source of light and responsive to the input bits for modulating the light from the source of light so that the plurality of rays of light are provided, the intensity of each being determined by the logical state of an associated bit from the input data; and lens means for projecting the modulated plurality of rays of light onto the operator means.

3. The apparatus of claim 2, wherein the operator means comprise means responsive to the control words and positioned in the plurality of optical paths for further controlling the propagation of the modulated plurality of light rays as a function of the logical state of the bits of the control word.

4. The apparatus of claim 2, wherein the means for modulating the light from the source of light includes a Bragg cell having a transducer stack dimension;

a first pair of telecentric imaging lenses; and a second pair of telecentric imaging lenses positioned with respect to the first pair of telecentric imaging lenses and the Bragg cell to form a planar image of the light from the source of light onto the Bragg cell along its transducer stack dimension.

5. The apparatus of claim 4, wherein the plurality of optical paths are positioned about a center optical axis and the Bragg cell has a Bragg angle, and further wherein each of the first pair of telecentric imaging lenses have a lens axis, and each of the second pair of telecentric imaging lenses has a lens axis which is positioned along the center optical axis of the optical paths, wherein the first and second pairs of telecentric imaging lenses are positioned to form a light wedge which has a center and which is incident on the Bragg cell, and further wherein the lens axes of the first pair of telecentric imaging lenses are positioned off of the center axis of the optical paths such that the center of the light wedge is incident on the Bragg cell at the Bragg angle.

6. The apparatus of claim 1, wherein the controller means comprise means responsive to the instruction supplied by the user for defining a sequence of control words which form combinatorial functionals, combinatorial summations, and designate bits from among the input data words, the previously formed combinatorial functionals, and the previously formed combinatorial summations to be operated upon by the combinatorial functionals and combinatorial summations, which when executed will implement the instruction; and means responsive to the control words and to the bits designated for supplying the control words for forming the combinatorial functionals and combinatorial summations to the operator means, and for supplying the designated bits to the light source means.

7. The apparatus of claim 6, wherein the means for defining a sequence of control words comprise memory means for storing a plurality of sequences of control words and data designations at predetermined addresses, each of the plurality of sequences corresponding to a different possible computational primitive;

a host processor which is responsive to the instruction from the user for defining the addresses of a series of primitives in the memory means which when executed will implement the instruction from the user; and means responsive to the primitive address from the host processor for addressing the memory means to read out the sequence of control words for each of the primitives in the series of primitives which implement the instruction from the user.

8. The apparatus of claim 1, wherein the plurality of associated optical paths are arranges so that each of the plurality of rays of light provided by the light source means is broadcast across its associated optical path to form rows of light across the control operator means, wherein the intensity of the light in each row is determined as a function of the logical state of the associated input bit;

wherein the control operator means is positioned across the plurality of associated optical paths, and the control operator means has a plurality of light propagation control regions arranged in columns and rows, with each row of the light propagation control regions being associated with a particular optical path, so that each of the plurality of light propagation control regions in any particular row control the propagation of a corresponding portion of an associated broadcast light ray which is propagating along the associated optical path, and wherein the plurality of light propagation control regions in any particular column are each controlled by bits from a particular control word;

and further wherein the detector means focus light propagating through each column of the light propagation control regions onto a different predetermined point and detects the presence or absence of light at each of the different predetermined points.

9. The apparatus of claim 8, wherein a plurality of control words are identified by the controller means for the specified instruction, and further wherein each of the bits of the plurality of control words is simultaneously applied to different ones of the columns of light propagation control regions of the control operator means, so that a plurality of combinatorial functionals are simultaneously formed at the detector means.

10. The apparatus of claim 1, wherein the plurality of associated optical paths are arranged so that each of the plurality of rays of light provided by the light source means is broadcast across its associated optical path to form rows of light across the control operator means, wherein the intensity of the light in each row is determined as a function of the logical state of the associated input bit;

wherein the control operator means is positioned across the plurality of associated optical paths, and the control operator means has a plurality of light propagation control regions arranged in columns and rows, with each row of the light propagation control regions being associated with a particular optical path, so that each of the plurality of light propagation control regions in any particular row controls the propagation of a corresponding portion of an associated broadcast light ray which is propagating along the associated optical path;

and wherein the state of each of the plurality of light propagation control regions in any particular column is preselected to correspond to a preselected control word;

and further wherein the detector means focus light from each column of the light propagation control regions onto a different predetermined point and detects the presence or absence of light at each of the different predetermined points.

11. The apparatus of claim 10, wherein the control operator means is an optical mask.

12. The apparatus of claim 1, wherein the plurality of light rays provided by the light source means illuminate the control operator means in a row and column format; and further wherein the input bits supplied to the light source means are in the form of a plurality of input word supplied time sequentially so that each of the input words propagate through the light source means to sequentially control successive columns of the illumination of the control operator means by the light source means;

wherein the control operator means is positioned across the plurality of associated optical paths, and has a plurality of light propagation control regions arranged in columns and rows, with each row of the light propagation control regions being associated with a particular optical path, so that each of the plurality of light propagation control regions in any particular row controls the propagation of a corresponding one of the plurality of light rays propagating along the associated optical path, and wherein the state of each of the plurality of light propagation control regions in any particular column are controlled by the logical state of any associated control word;

and further wherein the detector means focus light from each column of the light propagation control regions onto a different predetermined point, detects the presence or absence of light at each of the different predetermined points, and provides an output for each of the different predetermined points indicative of whether light is present or absent.

13. The apparatus of claim 12, further wherein the associated control words which control each column of light propagation control regions in the control operator means are supplied simultaneously to provide a fixed control operator plane in the control operator means.

14. The apparatus of claim 12, further wherein the controller means supplies control words to the control operator means time sequentially so that each of the control words propagate through the control operator means to sequentially control successive columns of light propagation control regions in the control operator means.

15. The apparatus of claim 14, wherein the control operator means is a spatial light modulator.

16. The apparatus of claim 12, further including means responsive to the outputs provided by the detector means for combining and shifting outputs from the detector means for each of the different predetermined points.

17. The apparatus of claim 16, wherein combining and shifting means comprise a plurality of storage means each having an input and an output for storing data applied to the input;

a plurality of logic means for coupling each of the plurality of storage means to one another in a serial path, and each of which is responsive to a different one of the plurality of outputs of the detector means and to an output of a different one of the plurality of storage means for providing an output which is the logical OR thereof.

18. The apparatus of claim 16, wherein the light source means comprise
a source of light;
spatial light modulator means having a planar shape for controlling the propagation of light therethrough in a row and column pattern in response to the plurality of control words;
means for imaging the light from the source of light onto the spatial light modulator means in parallel beams.

* * * * *